US 9,838,607 B2

(12) United States Patent
Feinberg et al.

(10) Patent No.: US 9,838,607 B2
(45) Date of Patent: Dec. 5, 2017

(54) PASSIVE OPTICAL ELECTRONIC CAMERA VIEWFINDER APPARATUS

(71) Applicant: mPerpetuo, Inc., Palo Alto, CA (US)

(72) Inventors: Eugene Feinberg, Palo Alto, CA (US); Ashwini Choudhary, Palo Alto, CA (US); Eran Steinberg, San Francisco, CA (US)

(73) Assignee: mPerpetuo, Inc., San Jose, CA (US)

( * ) Notice: Subject to any disclaimer, the term of this patent is extended or adjusted under 35 U.S.C. 154(b) by 0 days.

(21) Appl. No.: 15/131,374

(22) Filed: Apr. 18, 2016

(65) Prior Publication Data

US 2016/0309092 A1  Oct. 20, 2016

Related U.S. Application Data

(60) Provisional application No. 62/149,406, filed on Apr. 17, 2015.

(51) Int. Cl.
| | |
|---|---|
| *H04N 5/222* | (2006.01) |
| *G09G 5/00* | (2006.01) |
| *H04N 5/232* | (2006.01) |
| *H04N 5/225* | (2006.01) |
| *G03B 13/06* | (2006.01) |
| *G03B 17/04* | (2006.01) |

(52) U.S. Cl.
CPC ......... *H04N 5/23293* (2013.01); *G03B 13/06* (2013.01); *G03B 17/04* (2013.01); *H04N 5/2252* (2013.01); *H04N 5/23216* (2013.01)

(58) Field of Classification Search
CPC .............. G06F 3/04845; G06F 3/0488; G06F 3/04842; G06F 2203/04803; G06F 3/1423; G06F 2203/04805; G06F 1/1652; G06F 3/147; H04N 5/23293; H04N 5/23216; G09G 2354/00; G02B 27/0172; G07F 17/3213

See application file for complete search history.

(56) References Cited

U.S. PATENT DOCUMENTS

| | | | |
|---|---|---|---|
| 4,600,077 | A | 7/1986 | Drever |
| 7,580,627 | B2 | 8/2009 | Kamei |
| 9,609,236 | B2 | 3/2017 | Baltz et al. |

(Continued)

FOREIGN PATENT DOCUMENTS

| | | |
|---|---|---|
| JP | 2015-171116 A | 9/2015 |
| WO | 2016/168838 A2 | 10/2016 |
| WO | 2016/168838 A3 | 11/2016 |

OTHER PUBLICATIONS

Non-Final Rejection, dated Mar. 8, 2017, for U.S. Appl. No. 15/131,547, filed Apr. 18, 2016.

(Continued)

*Primary Examiner* — Trung Diep
(74) *Attorney, Agent, or Firm* — SF Bay Area Patents, LLC; Andrew V. Smith

(57) ABSTRACT

A digital camera includes an optical assembly and image sensor for capturing still and/or video images and displaying the images on a rear display screen. The camera includes a magnifying viewfinder that is coupled to the housing and is movable between a stowed position out of the way of the display screen and an active position for viewing a subset of display screen pixels with magnification.

154 Claims, 33 Drawing Sheets

(56) References Cited

U.S. PATENT DOCUMENTS

| | | | |
|---|---|---|---|
| 2001/0055488 A1* | 12/2001 | Shono | H04N 5/2251 396/429 |
| 2002/0158812 A1* | 10/2002 | Pallakoff | H04M 1/0214 345/5 |
| 2003/0001807 A1 | 1/2003 | Debiez et al. | |
| 2005/0046739 A1 | 3/2005 | Voss et al. | |
| 2005/0134723 A1 | 6/2005 | Lee | |
| 2006/0187322 A1 | 8/2006 | Janson, Jr. et al. | |
| 2007/0189763 A1 | 8/2007 | Kojima et al. | |
| 2008/0088729 A1 | 4/2008 | Ochi | |
| 2008/0102888 A1* | 5/2008 | Sellgren | H04M 1/0218 455/556.1 |
| 2008/0298792 A1 | 12/2008 | Clark | |
| 2008/0298793 A1 | 12/2008 | Clark | |
| 2009/0257207 A1 | 10/2009 | Wang | |
| 2010/0039350 A1* | 2/2010 | Wakefield | G06F 1/1616 345/1.3 |
| 2010/0066888 A1* | 3/2010 | Nakai | G03B 7/26 348/333.01 |
| 2010/0073507 A1 | 3/2010 | Honjo | |
| 2010/0329302 A1 | 12/2010 | Nakagawa | |
| 2011/0050916 A1 | 3/2011 | Otsuka | |
| 2011/0129207 A1 | 6/2011 | King | |
| 2011/0228115 A1 | 9/2011 | Ben-Ezra | |
| 2011/0267432 A1 | 11/2011 | Kumakura | |
| 2012/0086846 A1 | 4/2012 | Fuh | |
| 2012/0106944 A1 | 5/2012 | Johnson | |
| 2012/0128175 A1 | 5/2012 | Visser | |
| 2012/0224716 A1 | 9/2012 | Ohtsuka | |
| 2012/0270598 A1 | 10/2012 | Okuda | |
| 2013/0222668 A1 | 8/2013 | Anderson | |
| 2013/0343572 A1 | 12/2013 | Lee | |
| 2014/0226055 A1 | 8/2014 | Schmidt et al. | |
| 2015/0077581 A1 | 3/2015 | Baltz | |
| 2015/0091801 A1 | 4/2015 | Asbjornsen | |
| 2015/0171116 A1 | 6/2015 | Okazaki et al. | |
| 2015/0334291 A1 | 11/2015 | Cho | |
| 2015/0334292 A1 | 11/2015 | Tartz | |
| 2016/0057363 A1 | 2/2016 | Posa | |
| 2016/0165111 A1 | 6/2016 | Uemura | |
| 2016/0286241 A1 | 9/2016 | Ridge | |
| 2016/0309063 A1 | 10/2016 | Choudhary et al. | |
| 2016/0309069 A1 | 10/2016 | Steinberg et al. | |
| 2016/0309076 A1 | 10/2016 | Steinberg et al. | |

OTHER PUBLICATIONS

PCT Invitation to Pay Additional Fees and, Where Applicable, Protest Fee, for PCT Application No. PCT/US16/28145, International Filing Date: Apr. 18, 2016; form PCT/ISA/206 dated Jul. 8, 2016, 2 pages.

PCT Notification of Transmittal of the International Search Report and the Written Opinion of the International Searching Authority, or the Declaration, for PCT Application No. PCT/US16/28145, report dated Sep. 28, 2016, 15 pages.

PCT patent application No. PCT/US16/28145, International Filing Date: Apr. 18, 2016, entitled: A Digital Camera.

U.S. Appl. No. 15/131,407, filed Apr. 18, 2016, entitled: A Method of Controlling a Camera Using a Touch Slider.

U.S. Appl. No. 15/131,434, filed Apr. 18, 2016, entitled: A Digital Camera Accessory Providing a Secondary Image Capture Device ("SICD").

U.S. Appl. No. 15/131,529, filed Apr. 18, 2016, entitled: A Lighting System for a Camera Including Multiple LEDS.

U.S. Appl. No. 15/131,547, filed Apr. 18, 2016, entitled: An Audio System for a Digital Camera.

'The hotshoe-mount ClearViewer' (ClearViewer) Feb. 15, 2015 (Feb. 15, 2015) [webpage] accessed Jun. 15, 2016 at <https://web.archive.org/web/20150215160440/http://www.clearviewer.com/hotshoe.html; 1 Page.

Patent Abstracts of Japan: JP 2015-171116 A, Publication Date: Sep. 28, 2015, for: Display Device of Camera; 1 Page.

'Canon Patents a Loupe Viewfinder That Flips Over the LCD Screen' Oct. 16, 2015 (Oct. 16, 2015) [article] accessed Jun. 16, 2016 at <http://petapixel.com/2015/10/16/canon-patents-a-loupe-viewfinder-that-flips-over-the-lcd-screen/>; 9 Pages.

Non-Final Rejection, dated May 26, 2017, for U.S. Appl. No. 15/131,529, filed Apr. 18, 2016.

Non-Final Rejection, dated Jul. 18, 2017, for U.S. Appl. No. 15/131,434, filed Apr. 18, 2016.

Non-Final Rejection, dated Aug. 4, 2017, for U.S. Appl. No. 15/131,407, filed Apr. 18, 2016.

Notice of Allowance, dated Aug. 11, 2017, for U.S. Appl. No. 15/131,547, filed Apr. 18, 2016.

\* cited by examiner

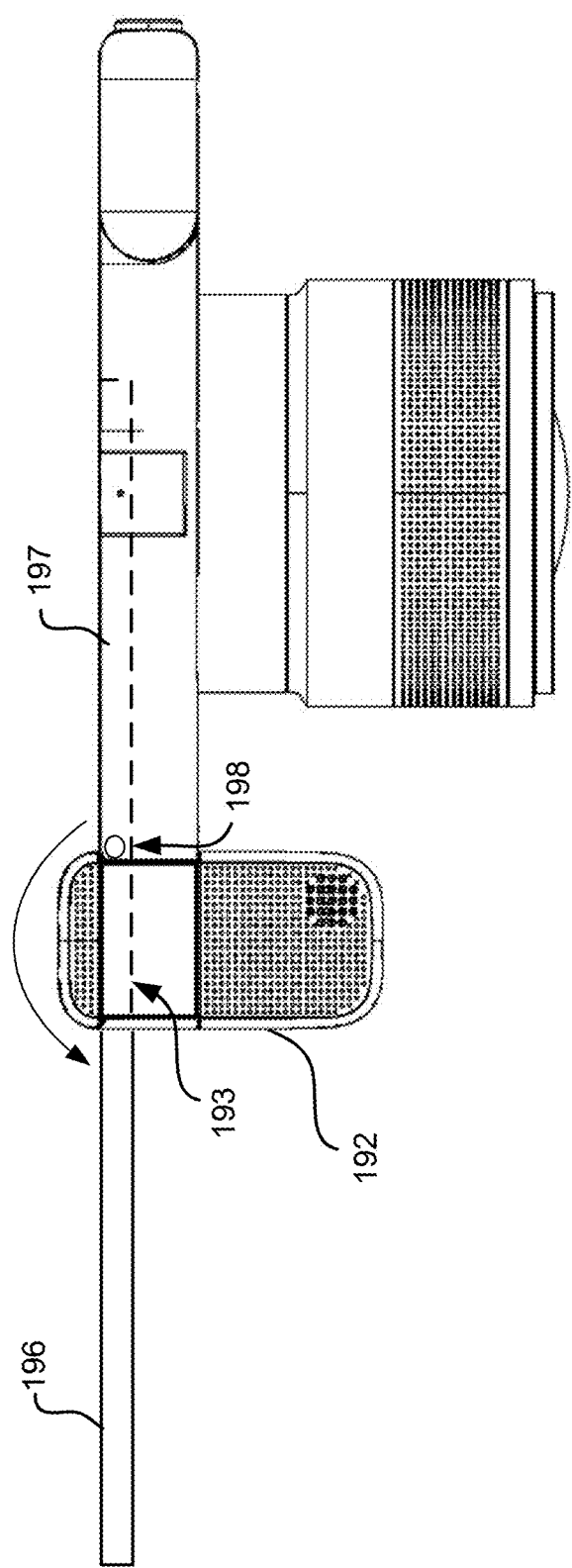

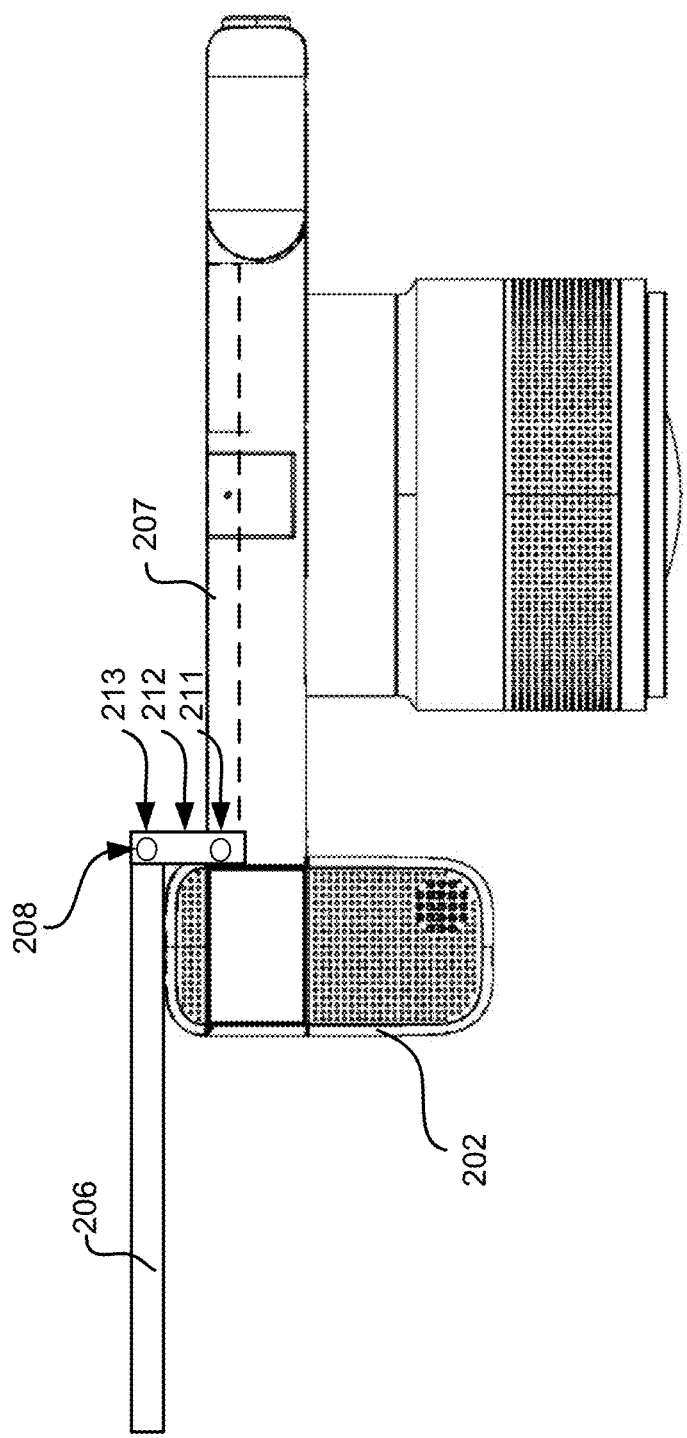

Share

PASSIVE OPTICAL ELECTRONIC CAMERA VIEWFINDER APPARATUS

PRIORITY AND RELATED APPLICATIONS

This application claims priority to U.S. provisional patent application Ser. No. 62/149,406, filed Apr. 17, 2015. This application is related to U.S. provisional patent applications Nos. 62/149,433, 62/149,452, and 62/149,475. This application is one of a group of related, contemporaneously-filed patent applications, entitled A PASSIVE OPTICAL ELECTRONIC CAMERA VIEWFINDER APPARATUS application Ser. No. 15/131,374; A METHOD OF CONTROLLING A CAMERA USING A TOUCH SLIDER, application Ser. No. 15/131,407; A DIGITAL CAMERA ACCESSORY PROVIDING A SECONDARY IMAGE CAPTURE DEVICE ("SICD"), application Ser. No. 15/131,434; A LIGHTING SYSTEM FOR A CAMERA INCLUDING MULTIPLE LEDS, application Ser. No. 15/131,529; and AN AUDIO SYSTEM FOR A DIGITAL CAMERA; application Ser. No. 15/131,547. Each of these priority and related applications is incorporated by reference.

BACKGROUND

All cameras these days have a screen on the back for framing and viewing photos, but only some possess a viewfinder. Viewfinders allow you to shoot in bright sunlight—a potentially major factor depending on how much outdoor shooting you plan to do. They also use somewhat less power than LCD screens.

All SLRs possess a viewfinder, while only a minority of compact cameras and mirrorless cameras include this feature. There are two major types of viewfinders: optical and electronic.

There are two types of viewfinders: optical (OVF) and electronic (EVF). Electronic viewfinders use a tiny electronic display much like the larger LCD screen on the back of all cameras, whereas optical viewfinders use mirrors and prisms to represent the view of a scene.

An advantage of electronic viewfinders is you get to see exactly what the camera's sensor sees and your view of a scene is never obstructed when taking a photo (your view is momentarily blocked when taking photos on DSLR cameras). Some cameras also augment the EVF display in various ways, such as by highlighting areas in focus ('peaking' autofocus), simulating the motion blur you'll see if you take a photo and automatically boosting brightness when shooting very dark scenes.

Since the image in an optical viewfinder relies on the actual light passing through a camera rather than a digital representation, they offer a few unique benefits. Optical viewfinders provide much better clarity, better dynamic range (roughly, ability to resolve scenes with extreme differences in brightness) and an instantaneous view of the action lacking the delay found in some EVF systems. With some exceptions, typically optical viewfinders are found on SLRs, while viewfinders on compact and mirrorless cameras are of the EVF variety.

Conventional camera viewfinders provide images directly to the eye of a camera user using a separate optical system disposed to the side or above the optical path provided by the main camera lens and image sensor. Modern mobile devices and DSLRs have electronic display screens instead of viewfinders for previewing images. It is desired to have a digital camera that provides a camera user the option to preview images on the display screen or through a viewfinder that neither compromises display nor device width and height. It is also desired to have a viewfinder that works in harmony with the display screen of the camera and not against it.

A hot shoe on a camera body typically provides support and electrical contact for an electronic flash attachment. In the past, an incandescent flash lamp or bulb coupled to a hot shoe provided a sole illumination source for capturing DSLR images with sufficient brightness to avoid long exposures and/or wide apertures that often produce images that are motion blurred or lack focal sharpness. It is desired to have a camera that includes an illumination system with greater directional, temporal and/or spectral versatility than that provided by a single xenon or krypton broadband flash source. It is further desired for a hot shoe mechanism to have greater utility to a camera user than a single flash option.

Adjusting precapture settings and postcapture editing on typical DSLRs and mobile camera-enabled devices involve the inconvenience of taking one hand off the camera to make touch screen or button actuated adjustments to imaging parameters that tend to temporarily destabilize the camera as an image capture device or as an viewer. It is desired to have a camera that allows camera users to smoothly and conveniently adjust precapture settings and perform postcapture editing.

Digital cameras are often equipped with video capture capability. The sound capture with typical video imaging on mobile devices and DSLRs is usually poor, particularly when imaging videos in crowded, noisy environments. It is desired to have enhanced audio quality for videos captured with a handheld or otherwise mobile digital cameras.

BRIEF DESCRIPTION OF THE SEVERAL VIEWS OF THE DRAWING

FIG. 16B schematically illustrates a top view of a digital camera with a 180° rotatable tilt-out display screen in accordance with certain embodiments.

FIG. 16C schematically illustrates a top view of another digital camera with a 180° rotatable tilt-out display screen including a biaxial hinge coupling in accordance with certain embodiments.

DETAILED DESCRIPTIONS OF THE EMBODIMENTS

Figure 1A:
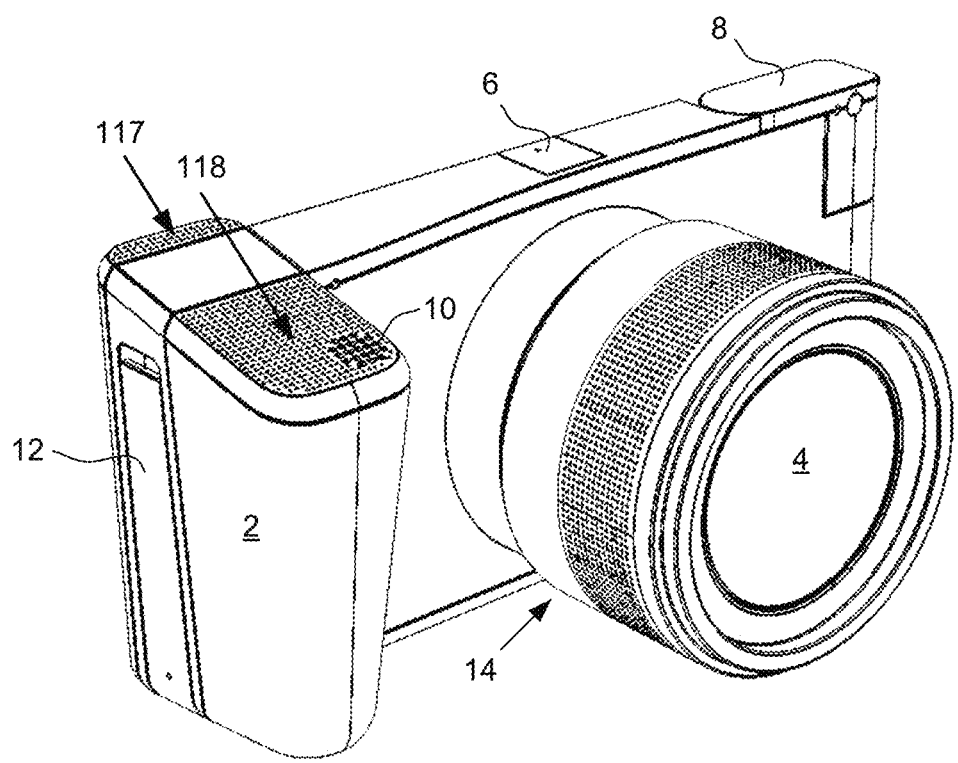
FIG. 1A schematically illustrates a front perspective view of a first digital camera in accordance with certain embodiments.

FIG. 1A schematically illustrates a front perspective view of a first digital camera in accordance with certain embodiments. The digital camera shown in FIG. 1A includes a grip 2, a lens 4, a hot shoe 6 and a view finder 8. Although not shown in FIG. 1A, the camera may be equipped with flash illumination, and several example embodiments of digital cameras with flash are provided below (e.g., see FIG. 2E, FIGS. 11A-11C and FIGS. 12A-12B).

The grip 2 includes a capacitive touch sensor 10 and battery compartment 12. The capacitive touch sensor 10 may be used for scrolling through a menu of processing functions or for moving a cursor on a display screen (not shown, but see FIG. 1B) or for another function that is typically available to a user by way of a mouse or keypad of a computer or other processor-based device. The capacitive touch sensor 10 may be used as an image capture button that may have both full press shutter trigger and half press settings adjustment functionality.

The lens 4 may be replaceable with one or more other lenses having different optical properties. The lens 4 may be movable relative to an image sensor of the digital camera. The lens 4 may be one of multiple lenses contained within a lens holder 14. The lens 4 may be movable relative to one or more other lenses contained within the lens holder 14, and multiple lenses may be movable together relative to the image sensor.

The hot shoe 6 includes a mechanical and/or electrical coupling interface for a peripheral such as a secondary flash or a secondary image capture device or SICD. The secondary flash or SICD may be directly coupled to the digital camera housing at the hot shoe interface 6. A Bluetooth or other wireless coupling interface may be included at the hot shoe 6 or otherwise within the digital camera for coupling the camera to a secondary display, secondary or primary flash or SICD, or secondary image processing or file sharing device.

The viewfinder 8 is shown in a stowed or inactive position. The viewfinder 8 of FIG. 1A is configured to be moveable, e.g., rotatable, between active and inactive positions.

Figure 1B:
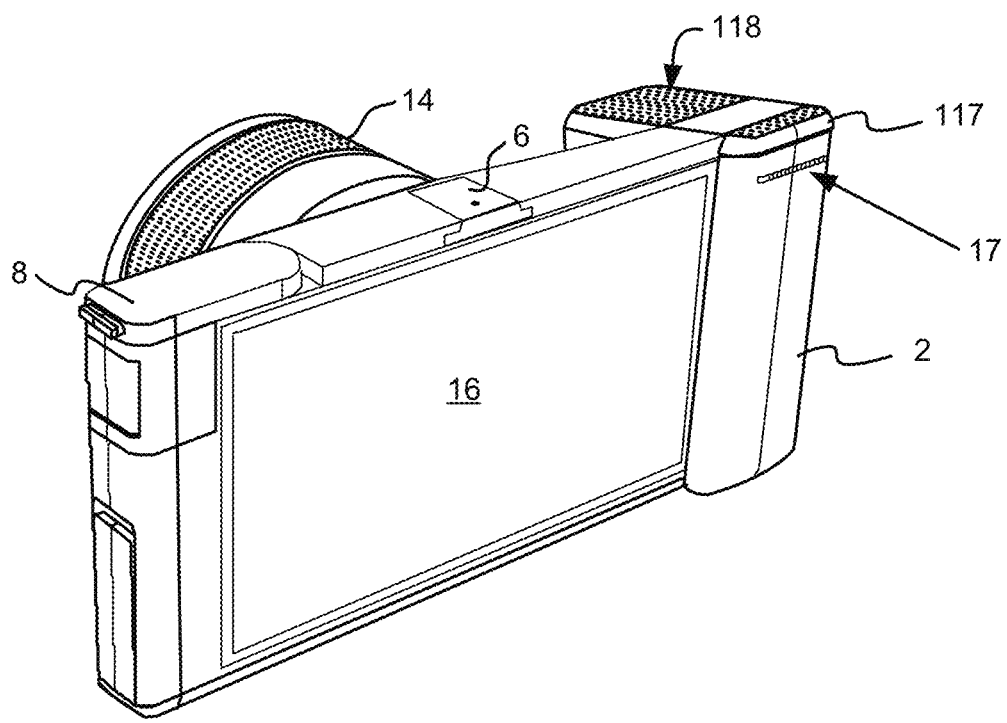
FIG. 1B schematically illustrates a back perspective view of the first digital camera in accordance with certain embodiments.

FIG. 1B schematically illustrates a back perspective view of the first digital camera of FIG. 1A in accordance with certain embodiments. An example of a display 16 is illustrated in FIG. 1B. The viewfinder 8 is shown in the inactive position such that no portion of the display 16 is overlapped by the stowed viewfinder 8. FIG. 1B also shows a linear slider 17 that may be utilized for scrolling, adjusting pre-capture settings or post-capture image attribute levels, or other image editing, storing or sharing, or cursor movements on display 16, or combinations of these and other mouse or touchpad functions.

Figure 1C:
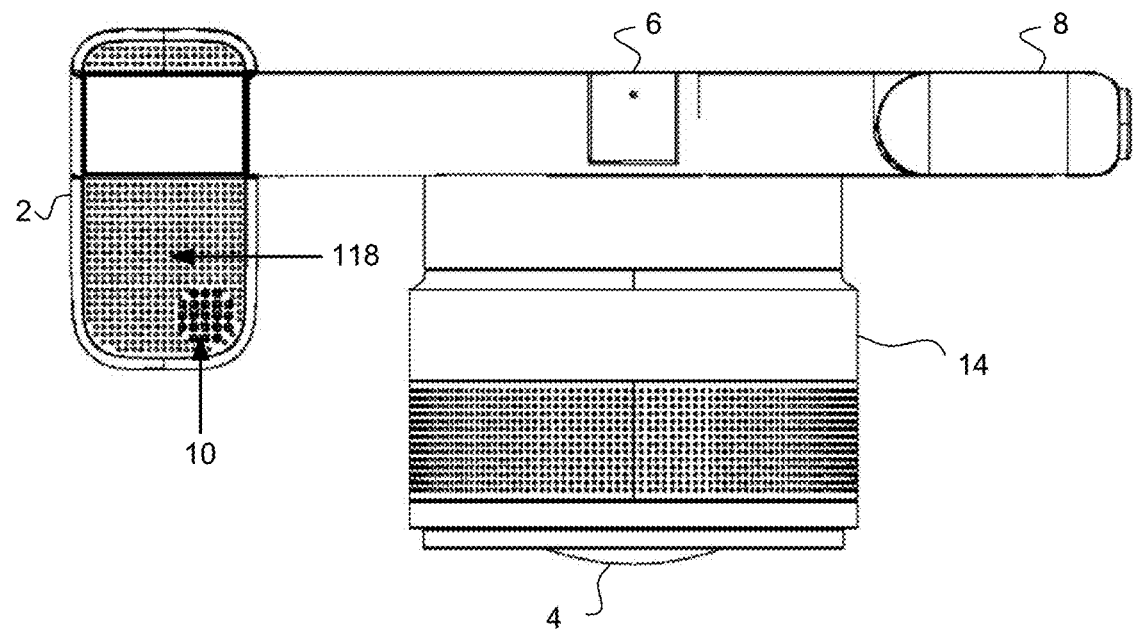
FIG. 1C schematically illustrates a top view of the first digital camera in accordance with certain embodiments.

FIG. 1C schematically illustrates a top view of the first digital camera of FIGS. 1A-1B in accordance with certain embodiments. FIG. 1C shows the grip 2 with capacitive touch sensor 10, lens 4 and lens holder 14 coupled to the digital camera body, the hot shoe 6 and stowed viewfinder 8, each as previously introduced in FIGS. 1A-1B.

Figure 1D:
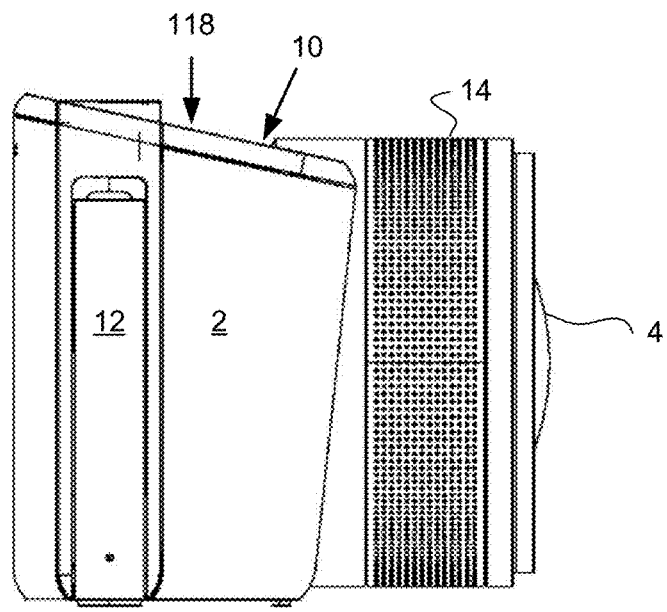
FIG. 1D schematically illustrates a right side view of the first digital camera in accordance with certain embodiments.

FIG. 1D schematically illustrates a right side view of the first digital camera in accordance with certain embodiments. FIG. 1D shows the grip 2 with battery compartment 12, and the lens 4 and lens holder 14 coupled to the digital camera body, each as previously introduced in FIGS. 1A-1B.

Figure 1E:
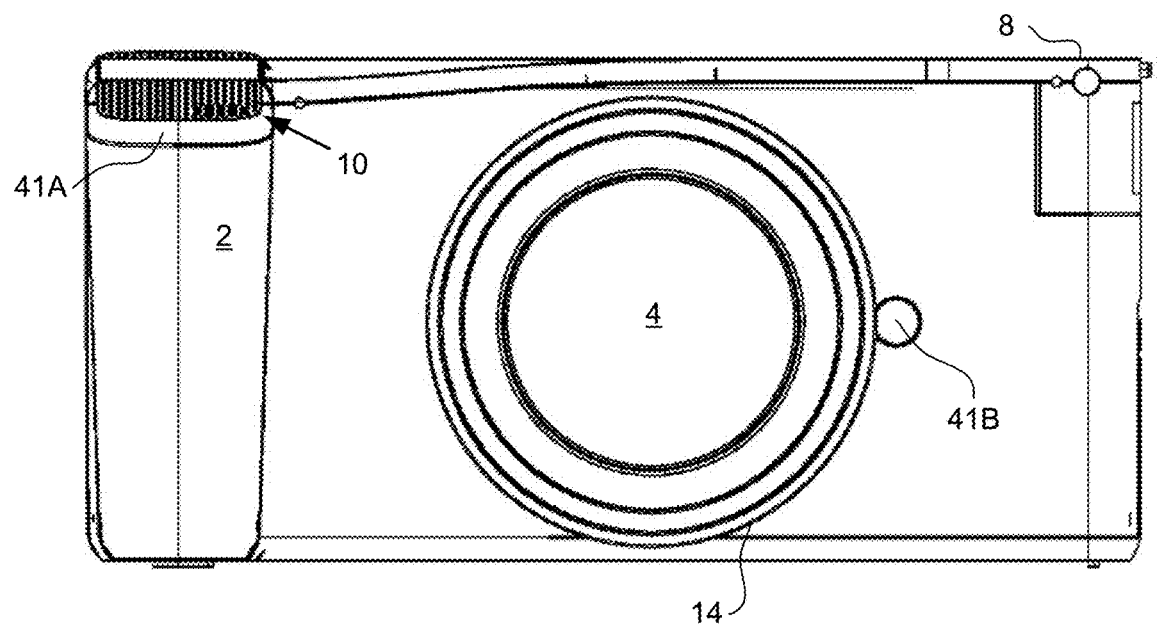
FIG. 1E schematically illustrates a front view of the first digital camera in accordance with certain embodiments.

FIG. 1E schematically illustrates a front view of the first digital camera in accordance with certain embodiments. FIG. 1E shows the grip 2 with capacitive touch sensor 10, lens 4 and lens holder 14 coupled to the digital camera body, and stowed viewfinder 8, each as previously introduced in FIGS. 1A-1B. A flash light source 41A is schematically illustrated as being disposed on the front surface of the grip 2. A microphone 41B is schematically illustrated in the front view of FIG. 1E just on the right side of the lens holder. There may be one or two or more additional light sources and/or one or two or more additional microphones in certain embodiments, respectively, to provide enhanced spectral, temporal, spatial and/or directional lighting versatility and/or to provide stereo audio in portrait and/or landscape and/or one or more other camera orientations.

Figure 1F:
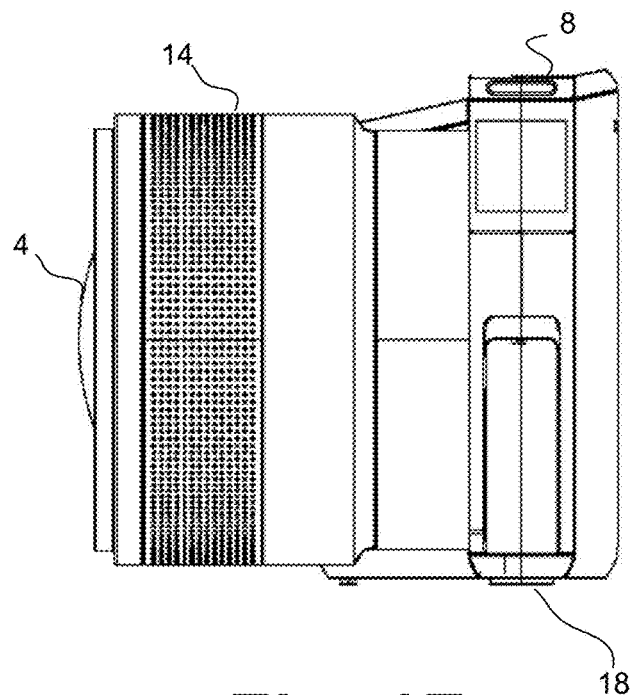
FIG. 1F schematically illustrates a left side view of the first digital camera in accordance with certain embodiments.

FIG. 1F schematically illustrates a left side view of the first digital camera in accordance with certain embodiments. FIG. 1F shows the lens 4 and lens holder 14 coupled to the digital camera body, the stowed viewfinder 8 and an access door 18 to a compartment for, e.g., a neck strap and/or electronic components of the digital camera.

Figure 1G:
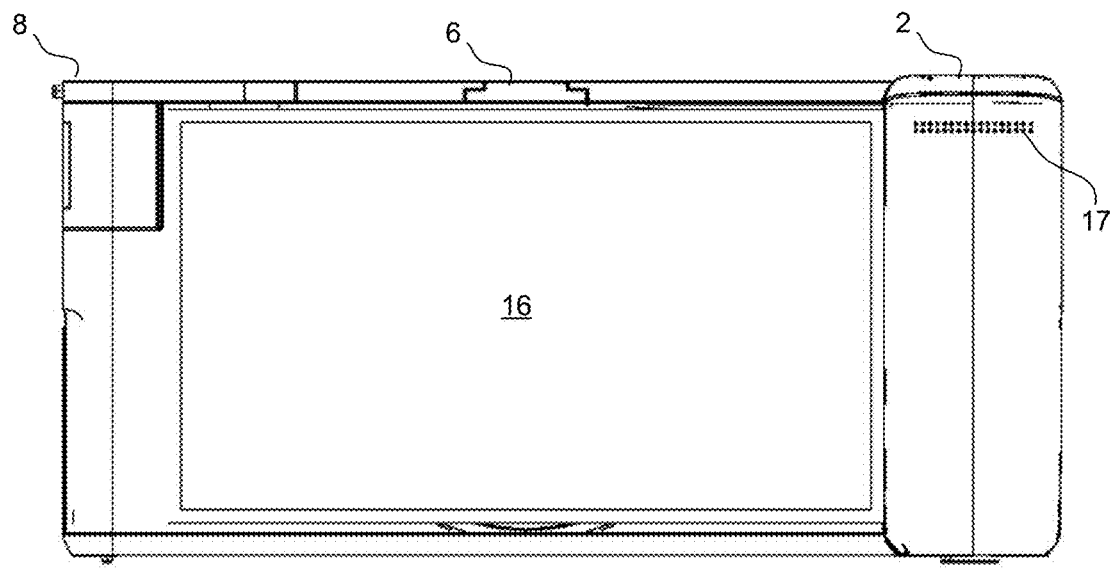
FIG. 1G schematically illustrates a back view of the first digital camera in accordance with certain embodiments.

FIG. 1G schematically illustrates a back view of the first digital camera in accordance with certain embodiments. FIG. 1G shows the grip 2, the hot shoe 6, the stowed viewfinder 8, the display 16 and the linear slider 17, each as previously introduced in FIGS. 1A-1B.

Figure 1H:
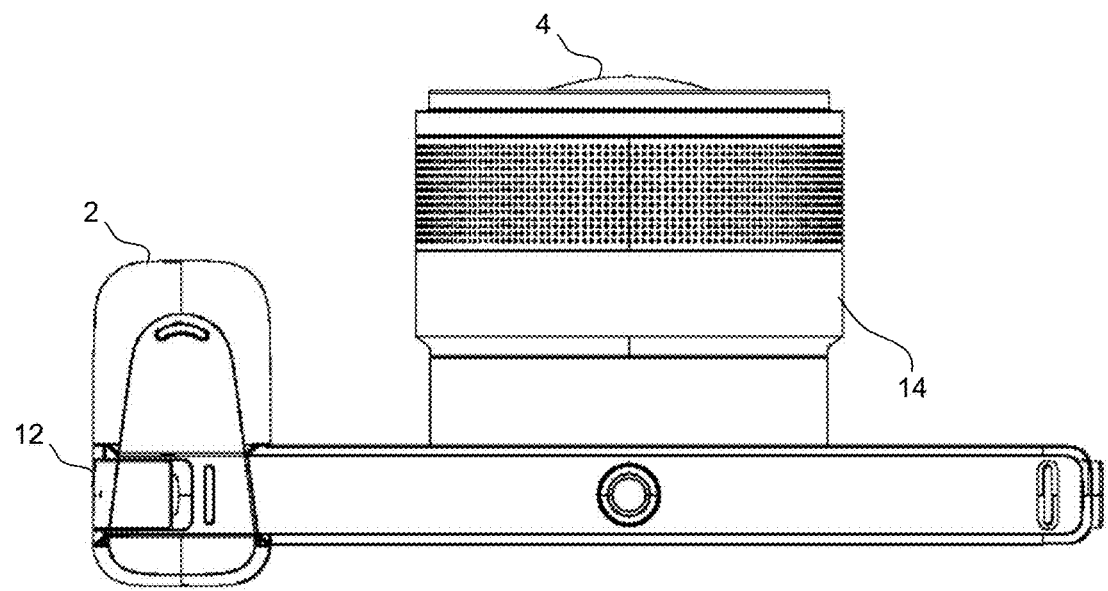
FIG. 1H schematically illustrates a bottom view of the first digital camera in accordance with certain embodiments.

FIG. 1H schematically illustrates a bottom view of the first digital camera in accordance with certain embodiments. FIG. 1H shows the grip 2 with battery compartment 12, and the lens 4 and lens holder 14 coupled to the digital camera body, each as previously introduced in FIGS. 1A-1B.

Figure 2A:
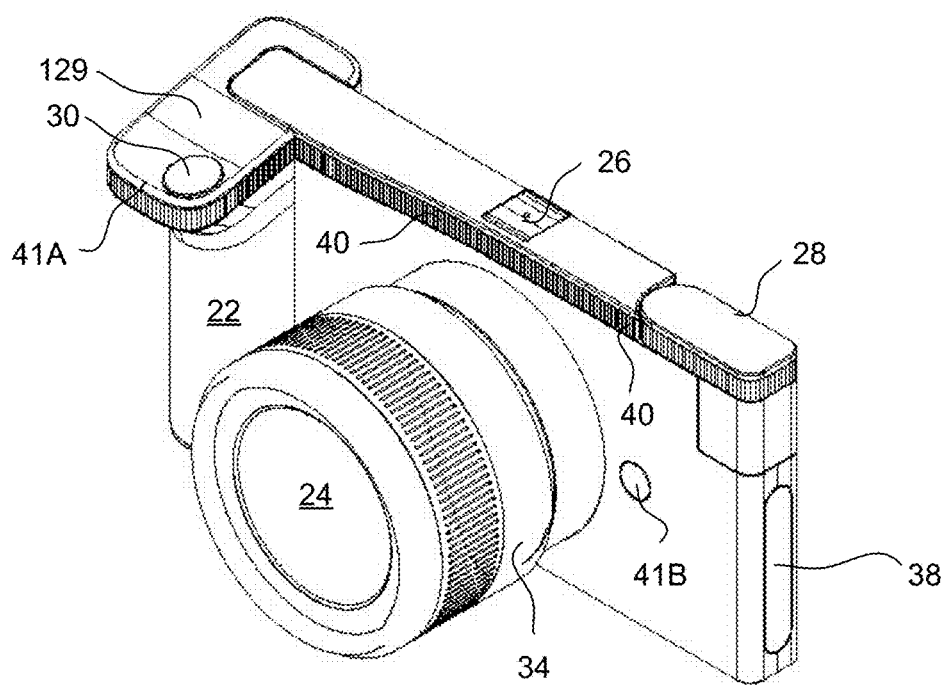
FIG. 2A schematically illustrates a front perspective view of a second digital camera in accordance with certain embodiments.

FIG. 2A schematically illustrates a front perspective view of a second digital camera in accordance with certain embodiments. The digital camera shown in FIG. 2A includes a grip 22, a lens assembly 24 including one or more lenses contained within a lens holder 34, a hot shoe 26 for coupling a primary or secondary flash or for mechanical, electrical and/or signal coupling a secondary image capture device to the digital camera for providing spectral, temporal, spatial and/or directional image capture versatility, and a view finder 28 in stowed position that is rotatable for viewing a subset of rear display screen pixels with magnification provided by a viewfinder lens assembly including one or more magnifying lenses that may provide proportional or anamorphic magnification.

The grip 22 includes a capacitive touch sensor 30 or image capture button 30, and a battery compartment 32. The capacitive touch sensor 30 may be used for scrolling through a menu of processing functions or for moving a cursor on a display screen (not shown, but see FIG. 2B) or for another function that is typically available to a user by way of a mouse or keypad of a computer or other processor-based device. The capacitive touch sensor 30 may be used as an image capture button that may have both full press shutter trigger and half press settings adjustment functionality. The button 30 may function solely as a half-press and full-press image capture button, while a capacitive touch sensor or touchscreen rear display may be configured to handled mouse-like user inputs.

The lens 24 may be replaceable with one or more other lenses having different optical properties. The lens 24 may be movable relative to an image sensor of the digital camera. The lens 24 may be one of multiple lenses contained within a lens holder 34. The lens 24 may be movable relative to one or more other lenses contained within the lens holder 34, and multiple lenses may be movable together relative to the image sensor.

The hot shoe 26 includes a mechanical and/or electrical coupling interface for a peripheral such as a secondary flash or a secondary image capture device or SICD. The secondary flash or SICD may be directly coupled to the digital camera housing at the hot shoe interface 26. A Bluetooth or other wireless coupling interface may be included at the hot shoe 26 or otherwise within the digital camera for coupling the camera to a secondary display, secondary or primary flash or SICD, or secondary image processing or file sharing device.

The viewfinder 28 is shown in a stowed or inactive position. The viewfinder 28 of FIG. 2A is configured to be moveable, e.g., rotatable, between active and inactive positions. FIG. 2A also shows an access door 38 to a compartment for, e.g., a neck strap and/or electronic components of the digital camera.

A Fresnel lens 40 is also shown in FIG. 2A. Although not shown, one or more flash illumination sources are provided behind the Fresnel lens 40. A pair of LED flash illumination sources may be disposed behind the Fresnel lens 40 on the far left and far right sides of the front surface of the camera housing. Three, four, or five or more LEDs may be disposed behind the Fresnel lens 40. There may be a LED disposed behind a Fresnel lens portion that is shown at the front of the viewfinder 28 in the stowed position, which can be used for illumination when the viewfinder 28 is disposed in the stowed position during image capture. The one or more flash illumination sources may include one or more LEDs as described below with reference to FIGS. 11A-11C, and/or xenon, krypton or other incandescent bulbs or lamps, and/or other broadband and/or narrowband visible and/or infrared light sources. The Fresnel lens 40 may be continuous, as shown in the example of FIG. 2A, or each LED may be disposed behind a proportionately-sized Fresnel lenslet. One or more microphones may be disposed between the LEDs behind audio grill portions disposed between the Fresnel lenslets.

A pop-up flash 129 is also illustrated in FIG. 2A as being in its recessed position within a cavity define in the top of the grip 22. One or more flash illumination sources may be disposed on the lens holder 34 or on a lens holder attachment that may be rotatable.

Figure 2B:
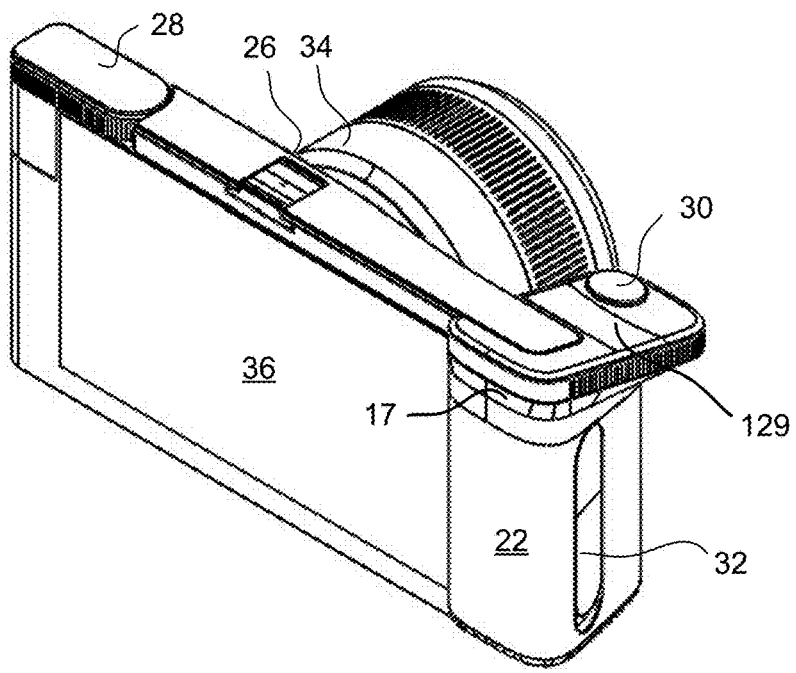
FIG. 2B schematically illustrates a back perspective view of the second digital camera in accordance with certain embodiments.

FIG. 2B schematically illustrates a back perspective view of the second digital camera of FIG. 2A in accordance with certain embodiments. An example of a display 36 is illustrated in FIG. 2B. The viewfinder 28 is shown in the inactive position such that no portion of the display 36 is overlapped by the stowed viewfinder 28. Although not shown in FIG. 2A or FIG. 2B, a linear slider may be provided for scrolling, adjusting pre-capture settings or post-capture image attribute levels, or other image editing, storing or sharing, or cursor movements on display 36, or combinations of these and other mouse or touchpad functions.

Figure 2C:
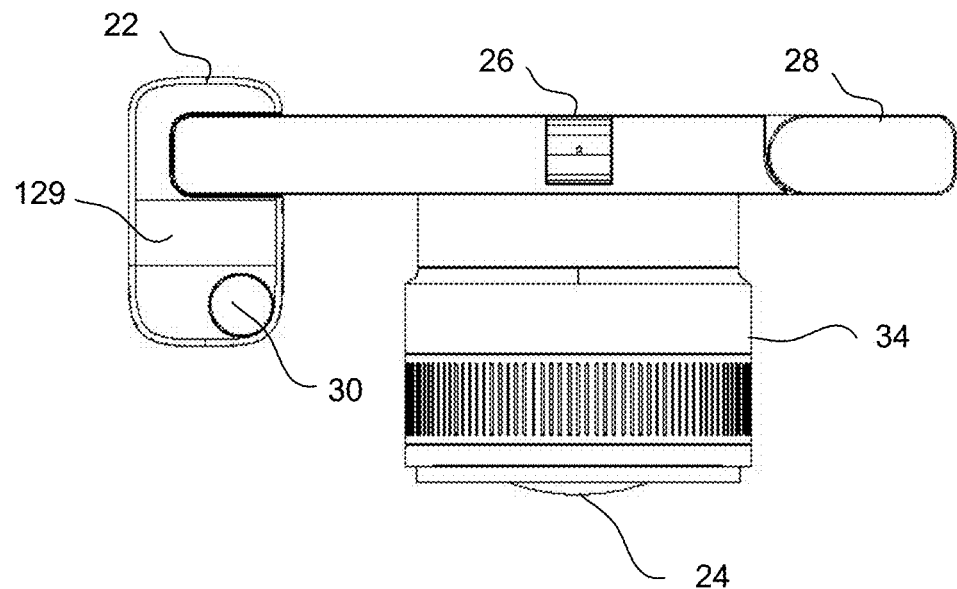
FIG. 2C schematically illustrates a top view of the second digital camera in accordance with certain embodiments.

FIG. 2C schematically illustrates a top view of the second digital camera in accordance with certain embodiments. FIG. 2C shows the grip 22 with capacitive touch sensor 30 and/or image capture button 30, lens 24 and lens holder 34 coupled to the digital camera body, the hot shoe 26 and stowed viewfinder 28, each as previously introduced in FIGS. 2A-2B.

Figure 2D:
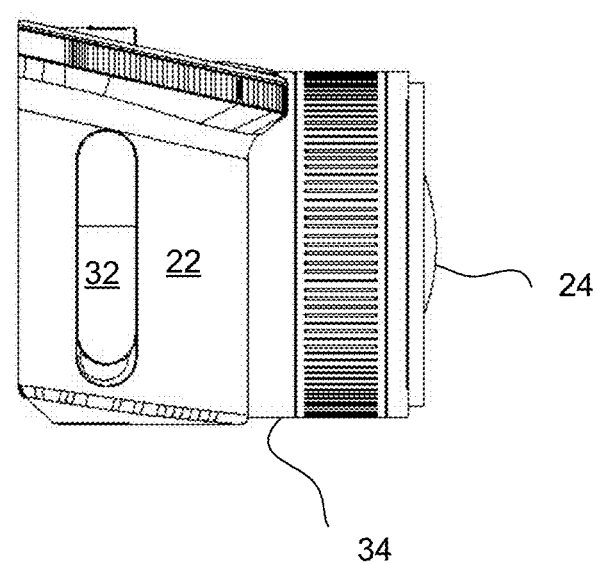
FIG. 2D schematically illustrates a right side view of the second digital camera in accordance with certain embodiments.

FIG. 2D schematically illustrates a right side view of the second digital camera in accordance with certain embodiments. FIG. 2D shows the grip 22 and battery compartment 32, and the lens 24 and lens holder 34 coupled to the digital camera body, each as previously introduced in FIGS. 2A-2B.

Figure 2E:
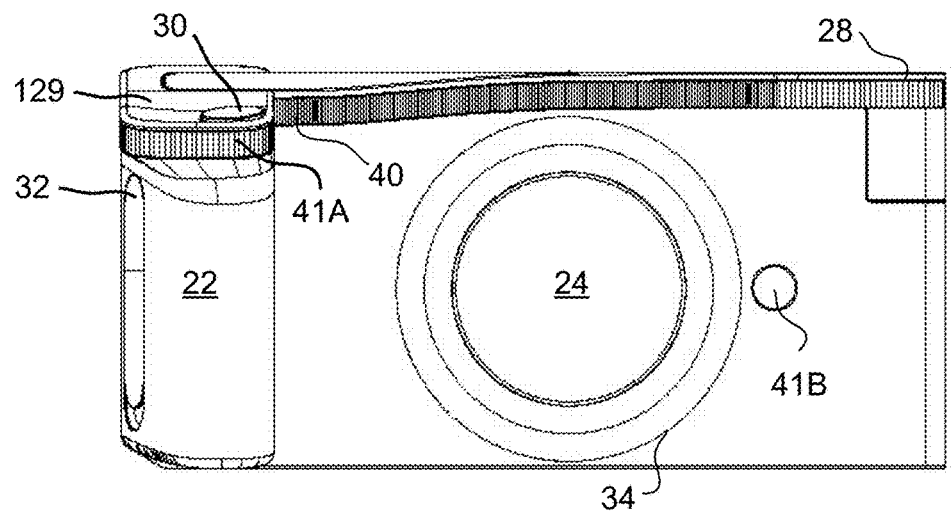
FIG. 2E schematically illustrates a front view of the second digital camera in accordance with certain embodiments.

FIG. 2E schematically illustrates a front view of the second digital camera in accordance with certain embodiments. FIG. 2E shows the grip 22 with capacitive touch sensor 30 and/or image capture button 30 and battery compartment 32, lens 24 and lens holder 34 coupled to the digital camera body, the Fresnel lens 40 and stowed viewfinder 28, one or more LED light sources 41A disposed behind Fresnel lens 40, one or more microphones 41B that may form a triangle in the plane of the front surface of the camera, each as previously introduced in FIGS. 2A-2B, and as described in further examples herein.

Figure 2F:
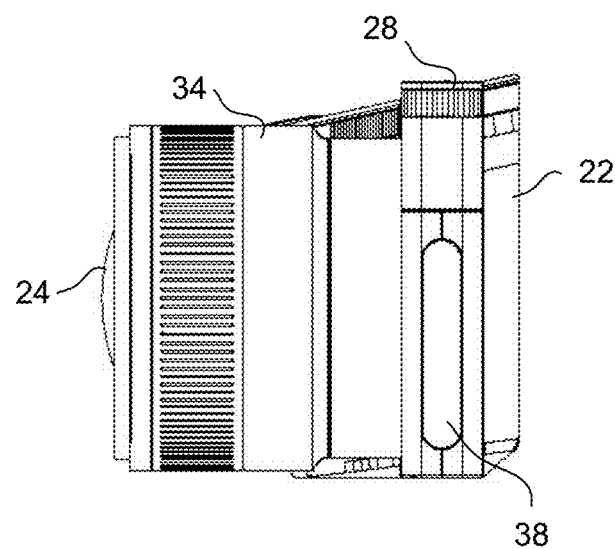
FIG. 2F schematically illustrates a left side view of the second digital camera in accordance with certain embodiments.

FIG. 2F schematically illustrates a left side view of the second digital camera in accordance with certain embodiments. FIG. 2F shows a back part of the grip 22, lens 24 and lens holder 34 coupled to the digital camera body, the stowed viewfinder 28 and compartment access door 38, each as previously introduced in FIGS. 2A-2B.

Figure 2G:
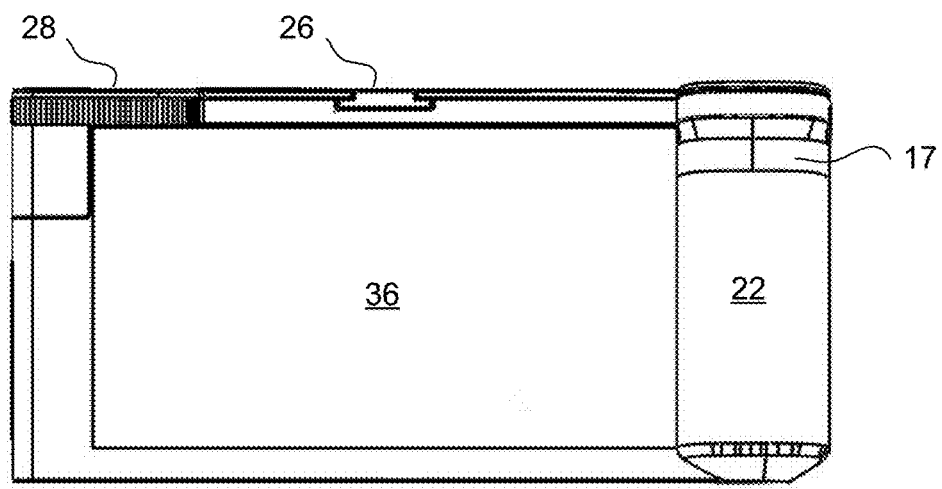
FIG. 2G schematically illustrates a back view of the second digital camera in accordance with certain embodiments.

FIG. 2G schematically illustrates a back view of the second digital camera in accordance with certain embodiments. FIG. 2G shows the grip 22, the hot shoe 26, the stowed viewfinder 28, and the digital camera display 36, each as previously introduced in FIGS. 2A-2B.

Figure 2H:
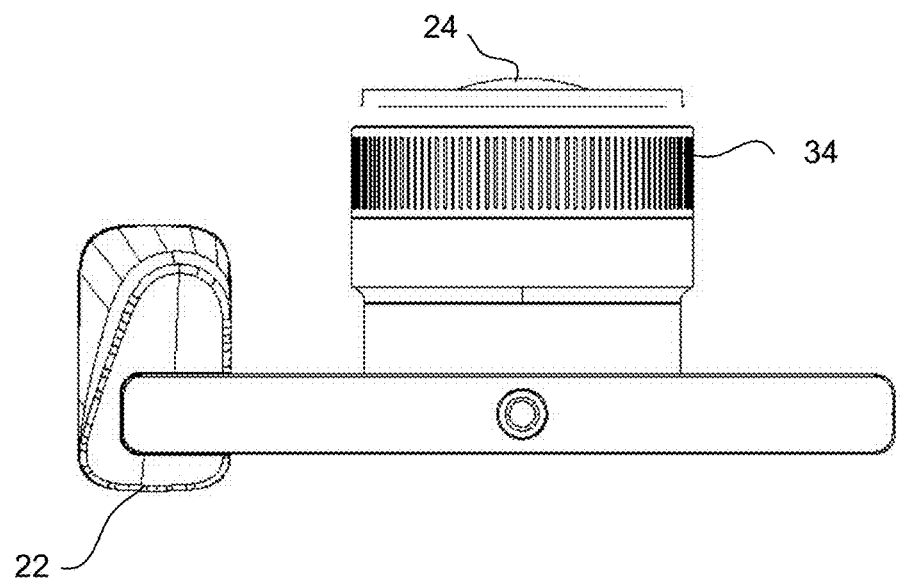
FIG. 2H schematically illustrates a bottom view of the second digital camera in accordance with certain embodiments.

FIG. 2H schematically illustrates a bottom view of the second digital camera in accordance with certain embodiments. FIG. 2H shows the grip 22, and the lens 24 and lens holder 34 coupled to the digital camera body, each as previously introduced in FIGS. 2A-2B.

Viewfinder

A digital camera is provided that includes an image sensor within a camera housing, an optical assembly including one or more lenses for forming images on the image sensor, a rear display screen for viewing the images and a viewfinder including a magnifying lens that is movable between a stowed position and an active position for viewing a subset of display screen pixels with magnification.

In certain embodiments, the camera housing defines a cutout for receiving the viewfinder in the stowed position.

The viewfinder may be rotatable between the stowed and active positions. The rotation axis of the viewfinder may be approximately normal to an optical axis of the optical assembly of the digital camera. The stowed position may be at the top, side or bottom of the housing non-overlapping the display screen, while the active position of the viewfinder may be at the rear of the housing overlapping a subset of display screen pixels that contain an image. The rotation axis may in certain embodiments be approximately parallel to an optical axis of the optical assembly of the digital camera, such that the viewfinder is non-overlapping the display screen in the stowed position and is rotatable to overlap a subset of display screen pixels in the active position.

The viewfinder may be translatable between the stowed and active positions in certain embodiments. The viewfinder may in one example include one or more coupling protrusions that fit into one or more respective grooves defined the housing, such that the coupling protrusions can move along the grooves to facilitate the translation of the viewfinder over the display screen for use and back to the side of the display screen when stowed.

The viewfinder may include an eyebrow rest. The viewfinder may include a cup-shaped and/or flexible eye socket interface alternative to or in addition to the eyebrow rest.

A proximity sensor may be disposed near the viewfinder window for triggering one or more camera functions based on proximity of the camera user to the viewfinder. For example, the camera may be programmed to display images on a larger portion of the display screen when the camera user is not proximate to the viewfinder in the active position than when the camera user is proximate to the viewfinder in the active position. The camera may be programmed to display images on a subset of display screen pixels overlapped by the viewfinder when the user is proximate to the viewfinder and to display different images or UI objects on a different subset of the display screen that is not overlapped by the viewfinder when the viewfinder is in the active position and the user is not proximate to the viewfinder. When the user is detected to be proximate to the viewfinder, the non-overlapped pixels may be darkened electronically and/or mechanically.

The camera may include one or more proximity sensors near the viewfinder or on the grip or otherwise disposed to sense proximity of the user to the camera. The camera is programmed in certain embodiments to begin a start-up process when the camera user becomes proximate to the camera or a certain portion of the camera.

The camera may be programmed to display images on a larger portion of the display screen when the viewfinder is in the stowed position than when the viewfinder is in the active position. Advantageously, a subset of display screen pixels that are overlapped by the viewfinder in the active position are not overlapped by the viewfinder in the stowed position. The viewfinder and display screen of a digital camera in accordance with certain embodiments are advantageously utilized together to provide an optimal camera experience for a user.

A blinder may open out of the viewfinder or camera housing in certain embodiments to block light from an adjacent portion of the display screen from interfering with the viewing of images through the viewfinder. The viewfinder may have a fixed wall that forms an acute angle with a plane of a rear display screen as in the example of FIGS. 4A-4B to black the adjacent display screen pixels when the viewfinder is in active position. The adjacent screen portion may in certain embodiments be electronically darkened.

In certain embodiments, the lens assembly 24 contained within the lens holder 34 images a scene on an image sensor (not shown) which may be displayed on the full rear display screen or substantially entire rear display screen when the viewfinder is stowed and which may be presented on a subset of display screen pixels when overlapped by the viewfinder in active mode. The camera may be alternatively configured to capture images at a portion of the display screen. The focal plane of the camera may be moved between the image sensor plane and the plane of the display screen by adjusting a lens position and/or an image sensor position and/or by adjusting a mirror position or half-mirrored optical splitter. In these embodiments, the viewfinder is configured with a magnifying glass as a loupe for viewing images captured at the image sensor and presented on the subset of display screen pixels or captured directly on the subset of display screen pixels.

The viewfinder may include one or more movable optics for adjusting to an eyesight characteristic of a user. A geometric area or shape of the subset of display screen pixels utilized in active viewfinder mode may be adjustable in certain embodiments. The viewfinder may include one or more movable optics for adjusting magnification in accordance with image size or resolution or to view objects or other subsets of pixels within an image. Alternatively, a magnification of the viewfinder may be adjustable by selecting among multiple available lenses having different magnifications.

A resolution of an image provided at a subset of display screen pixels for viewing through the viewfinder is adjustable in certain embodiments.

The camera may be configured to automatically provide a viewfinder image at an overlapping subset of display screen pixels when the viewfinder is placed in the active position and to automatically provide a full screen image when the viewfinder is stowed.

The viewfinder may include a hinge coupling for rotating the viewfinder between the active and stowed positions.

The viewfinder may include an attachment coupling for attaching to the camera housing for use in the active position and for detaching from the camera housing to use the full display screen when the viewfinder is not in use. In this embodiment, the viewfinder may be stowed in a compartment defined in the grip or away from the camera. A hot shoe bracket may be utilized for attaching the viewfinder to the camera housing in certain embodiments.

The viewfinder may include a single lens or multiple lenses. In certain embodiments, the viewfinder includes two or more lenses that are configured to permit the user to view images presented at the subset of display screen pixels with anamorphic optical power.

Figure 3:
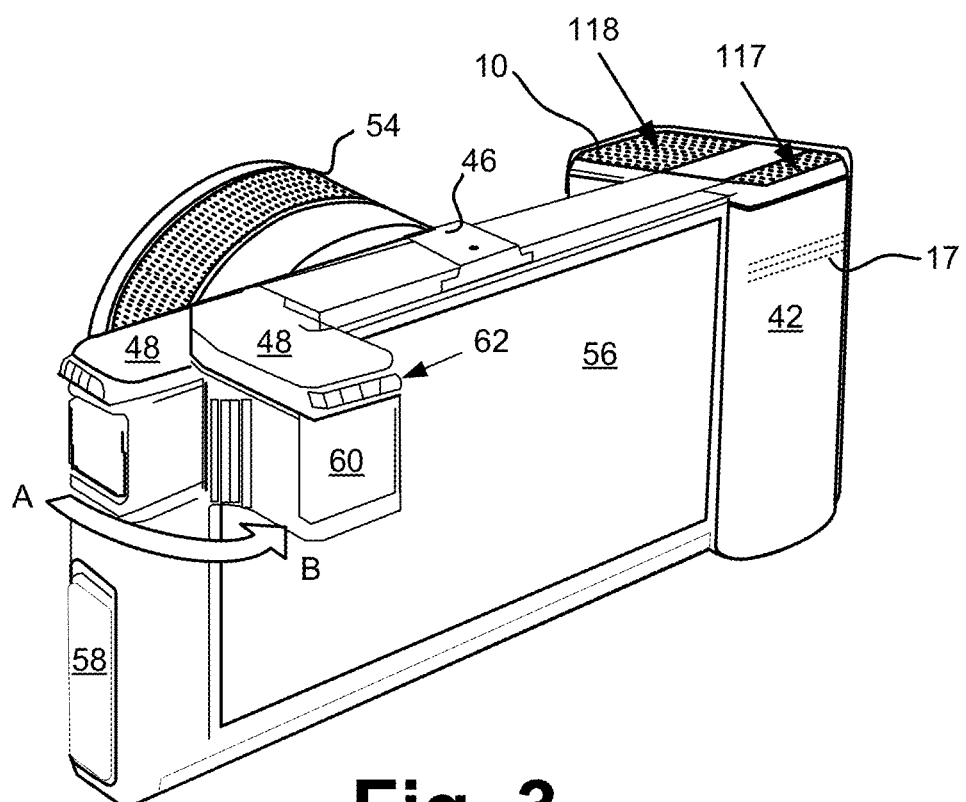
FIG. 3 schematically illustrates a back perspective view of a digital camera with a movable viewfinder in accordance with certain embodiments.

FIG. 3 schematically illustrates a back perspective view of a digital camera with a movable viewfinder in accordance with certain embodiments. FIG. 3 shows a back perspective view of a digital camera that includes a grip 42, hot shoe 46, viewfinder 48, lens holder 54, display 56 and compartment access door 58. The viewfinder 48 is shown in two positions in FIG. 3. In a first stowed or inactive position A, the viewfinder 48 is out of the way of the display 56 and stowed similar to the viewfinder 8 illustrated schematically in FIG. 1A. In a second active position B, the viewfinder 48 is overlapping a portion of the display 56. In the example of FIG. 3, an upper left corner section of the display 56 is overlapped by the viewfinder 48 when in the active position B.

The viewfinder 48 may be moved between positions A and B by rotation about an axis that is approximately normal to the optical axis of the digital camera. The movement of the viewfinder 48 from the stowed position A to the active position B may in certain embodiments trigger a thumbnail to appear on the overlapped portion of the display for viewing through a viewfinder window 60 an approximately same or similar image as may be viewed on the display 56 when the viewfinder 48 is stowed, and as may be captured by full-pressing the image capture button (not shown in FIG. 3, but see element 10 of FIG. 1A and element 30 of FIG. 2A). FIG. 3 also shows an eyebrow rest 62 to assist the user to position and stabilize his or her eye when using the viewfinder 48.

Among the advantages of a digital camera with a viewfinder in accordance with embodiments illustrated in the examples of FIGS. 1A-6B and other figures described herein below, a rear screen 56 of a the digital camera, or a small portion of the screen 56 as illustrated in the example of FIG. 3, may be disposed at an image plane, while the viewfinder 48 may be configured such that the window 60 or a lens inside the window 60 has a significant magnification like a magnifying glass to serve as a loupe for viewing the image on the display 56. The image plane may also be a separate CCD, CMOS or other image detector, such that the image data may be processed through a ISP or other processor and provided as a thumbnail or small image on the screen 56 or portion thereof which is viewable through the viewfinder 48.

The viewfinder 48 can be retracted when the photographer wants to use the viewfinder 48 and moved aside when the user would like a full view of the screen 56. The viewfinder 48 may be adjustable to suit the distinct eyesight of one or more individual viewers.

The viewfinder 48 can use various areas of the screen depending on the resolution that is selected automatically by the camera or manually by a user. The screen 56 can automatically adjust based on detection of when the viewfinder 48 is placed in position to provide the viewfinder image and when the viewfinder is stowed to the side of the screen 56.

The viewfinder 48 may be assembled as part of a digital camera, as shown in FIG. 3, or may be selectably attached and removed as a peripheral device. The attachment of the viewfinder can be performed in certain embodiments by sliding the viewfinder into the hot shoe 46. In the case of attachment of the viewfinder 48 to the hot shoe 46, an image may be provided at the center-top of the screen 56 beneath the hot shoe 46 in the example of FIG. 3 for viewing through viewfinder 48. The position of the hot shoe 46 may be anywhere around the camera periphery and the image may be provided at a screen location proximate or adjacent or convenient to the location of the hot shoe 46. The viewfinder may be configured to be adjustable such that different screen locations may be viewed through it. In one embodiment, the viewfinder includes a hinged extension arm that folds out and may be rotated using a ball bearing coupling to view any or most any or a substantial or significant amount of selected screen portions.

The viewfinder 48 may be selectably stowed at position A or put into position B for use by a hinge mechanism with locking recesses at positions A and B.

The viewfinder 48 and grip 42 may be interchangeable either left and right or right and left to accommodate different dominant eyes of users. The viewfinder 48 in certain embodiments is designed with blinders or polarization filters or baffling or reflectors on the sides so that stray light is prevented from penetrating from the sides to advantageously provide a better contrast ratio.

The viewfinder 48 may have a rubber cup eye socket interface (not shown) to stabilize the user at the viewfinder and reduce stray light. The viewfinder 48 can be adjusted in certain embodiments to multiple different magnifications in certain embodiments, and in embodiments having less versatility in the selection of magnification, one or more image parameters may alternatively be adjustable.

Figure 4A:
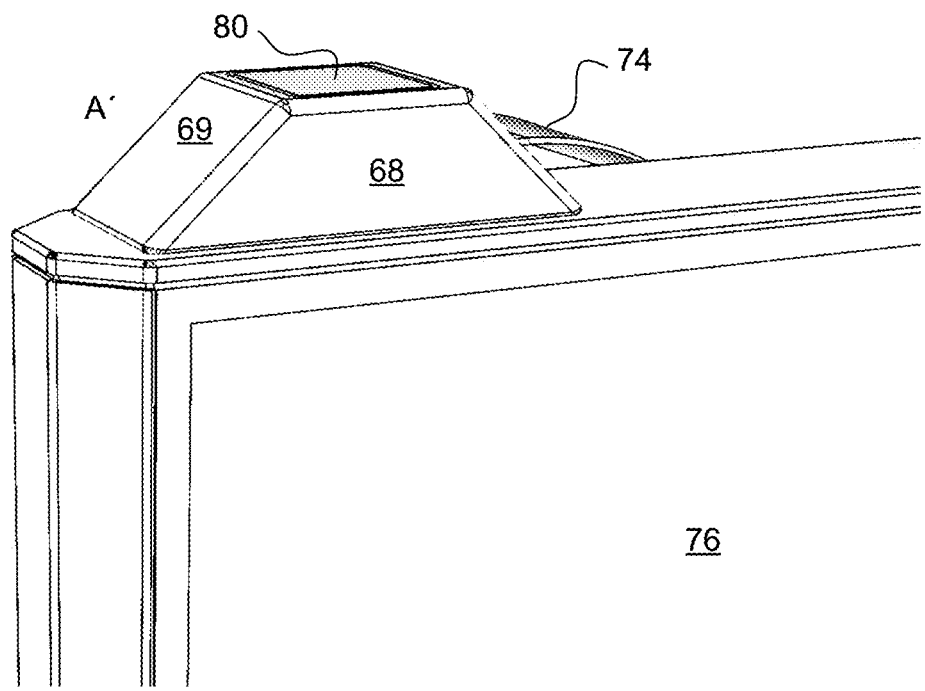
FIGS. 4A-4B schematically illustrate a passive optical electronic camera viewfinder that is movable, respectively, between a first position at the top of the camera when the viewfinder is not in use and a second position partially overlapping the camera display screen for viewing an object through the viewfinder.
Figure 4B:
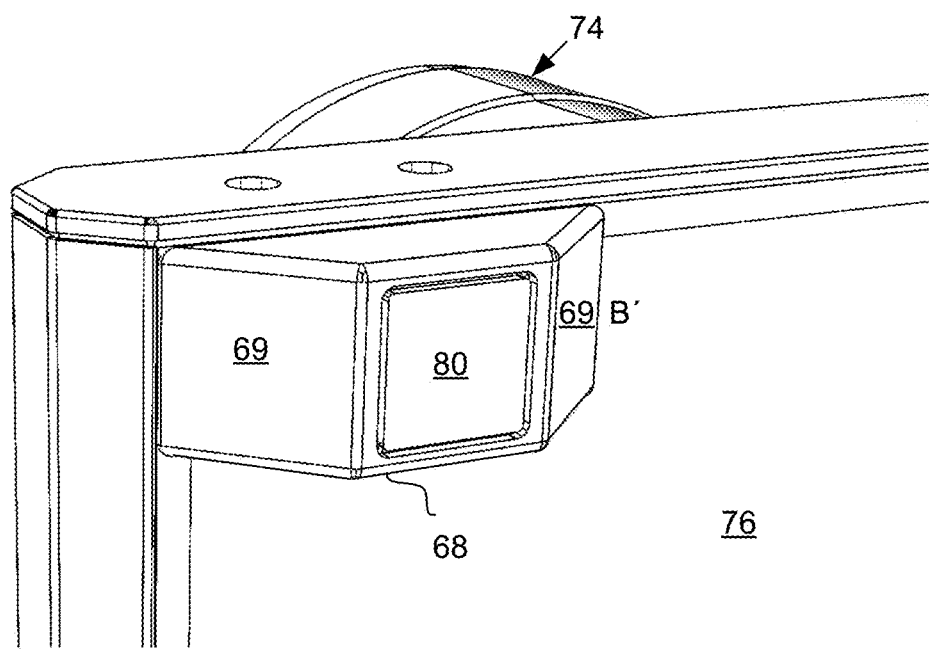

FIG. 4A-4B schematically illustrate a passive optical electronic camera viewfinder 68 coupled to a digital camera that is movable, respectively, between a first position A' at the top of the camera when the viewfinder is not in use and a second position B' partially overlapping the camera display screen 76 for viewing an object through an magnifying optic 80 of the viewfinder 68. For perspective, the lens holder 74 of the digital camera is shown in FIGS. 4A-4B at the front of the camera.

FIGS. 4A-4B illustrate rotation of a viewfinder 68 in accordance with a second example of rotation axis that is normal to the optical axis. The rotation axis for the viewfinder 68 is normal to the rotation axis for the viewfinder 48 of FIG. 3, and both of these rotations axes is normal to the optical axis of the camera. In certain embodiments, the viewfinder 68 may be slidable along the length of the camera side to a selected location. The viewfinder may be slidable along the entire periphery of the camera. The viewfinder may be coupled mechanically and/or magnetically to the camera. The viewfinder may be mechanically coupled to the user and may communicate with the camera by Bluetooth or in another wireless RF or optical manner to synchronize the location of the screen image thumbnail with the location of the loupe.

The viewfinder 68 is enclosed in a housing that includes an optical section and left and right side walls 69 that each form an acute angle with the display screen, i.e., less than 90°, such that the side walls 69 slope gradually away from the optical section blocking respective adjacent display screen areas. In the example of FIGS. 4A-4B, the acute angle may be 60° or 45° or 30° or less. The slope of the left and right side walls 69 of the viewfinder 68 advantageously blocks light from the display screen 76 just to the left and right, respectively, of the eye of a user of the viewfinder. In certain embodiments wherein a left-most edge of the display screen 76 is used in viewfinder mode, the right side wall is sloped and the left side wall is not. Similarly when a right-most display screen subarea is used, the left side wall is sloped while the right side wall is not in certain embodiments. In other embodiments, the bottom and/or top side walls may be sloped, and the side walls may slope away in every direction, and the side walls may be rotatable relative to the optical section of the viewfinder 68 to block a selected portion of the display screen depending on whether the viewfinder 68 is imaging a subset of the display screen at the right side, left side, top, bottom or middle. In certain embodiments, the angle that one or more side walls makes with the display screen may be adjustable, e.g., from 90° to 60° to 30° using a hinge coupling with three locking positions, or using a roll-up blind configuration that may be adjusted to cover a variable portion of the display screen.

Figure 5A:
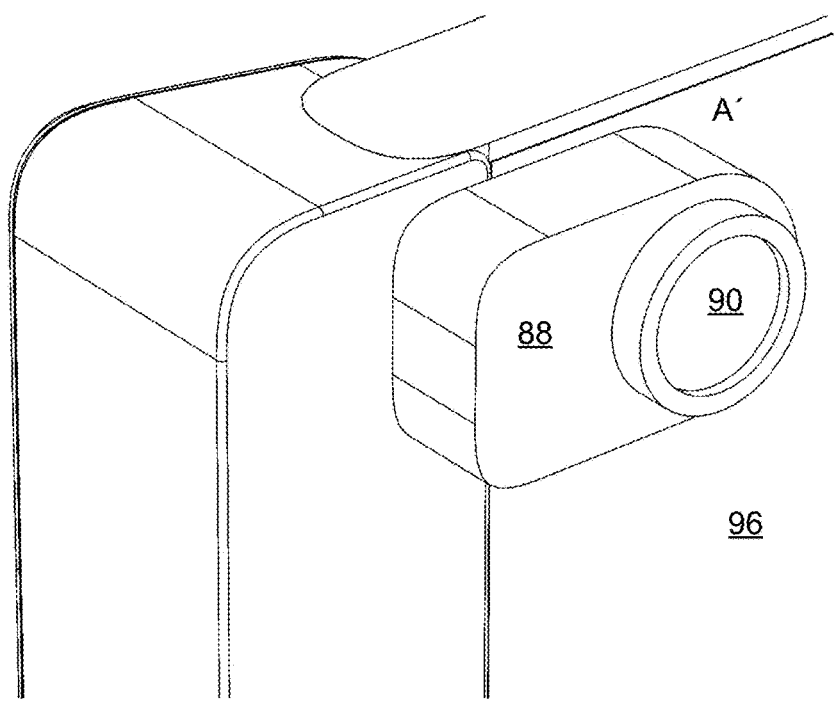
FIGS. 5A-5B schematically illustrate a passive optical electronic camera viewfinder that is movable, respectively, between a first position at the back of the camera to the side and out of the way of the camera display screen when not in use and a second position partially overlapping the camera display screen for viewing an object through the viewfinder.
Figure 5B:
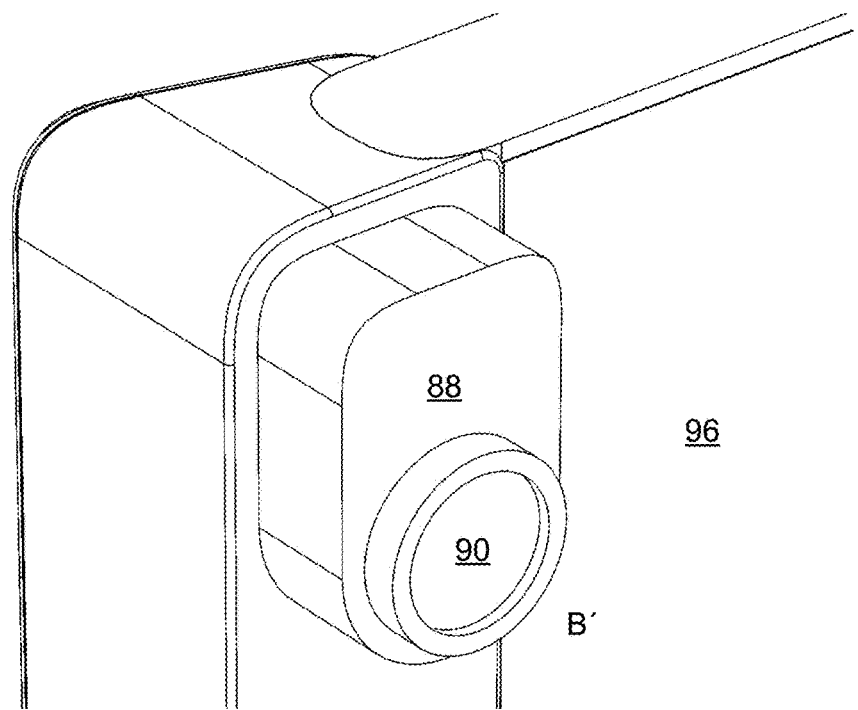

FIGS. 5A-5B schematically illustrate a passive optical electronic camera viewfinder 88 that is movable, respectively, between a first position A'' at the back of the camera to the side and out of the way of the camera display screen 96 when not in use and a second position B'' partially overlapping the camera display screen 96 for viewing an object through the magnification optic 90 of the viewfinder 88. In the example of FIGS. 5A-5B, the viewfinder 88 is rotatable in accordance with a third example rotation axis that is parallel to the optical axis of the digital camera and perpendicular to the rotation axes provided in the first and second examples of FIG. 3 and FIG. 4A-4B, respectively.

Figure 6A:
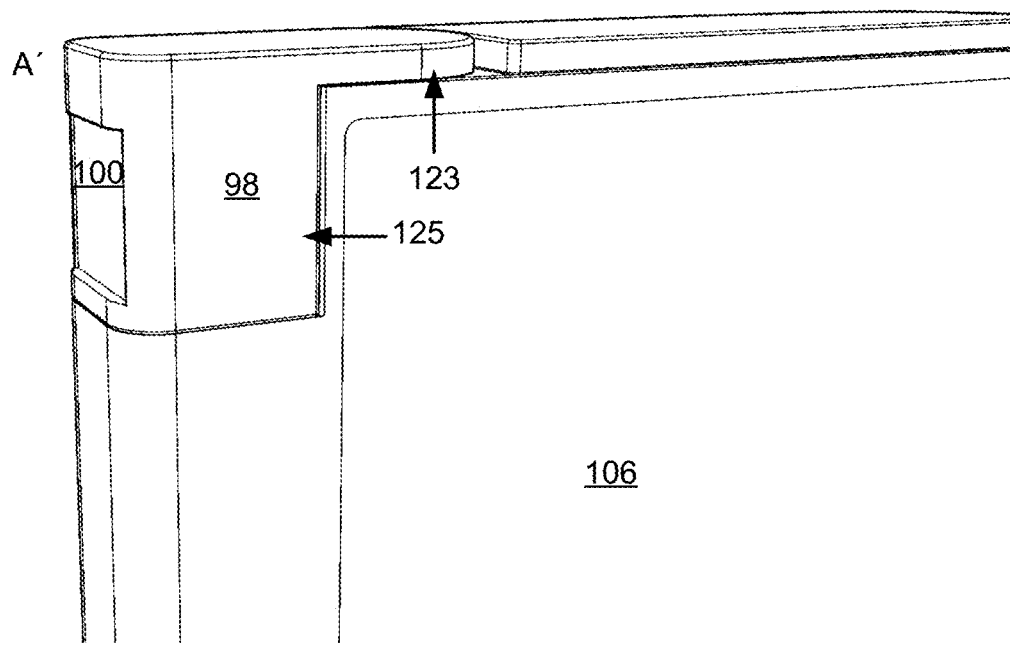
FIGS. 6A-6B schematically illustrate a passive optical electronic camera viewfinder that is movable, respectively, between a first position where it forms a corner of the camera not including the camera display screen when not in use and a second position partially overlapping the camera display screen for viewing an object through the viewfinder.
Figure 6B:
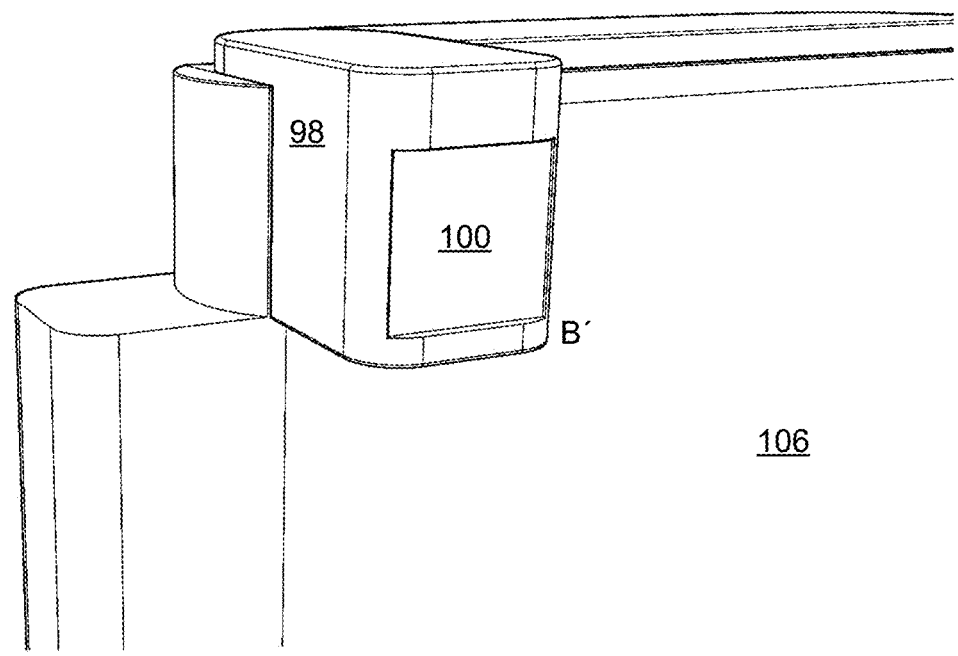

FIGS. 6A-6B schematically illustrate a passive optical electronic camera viewfinder 98 with magnification loupe 100 that is movable, respectively, between a first position A''' where it forms a corner of the camera not including the camera display screen 106 when not in use and a second position B''' partially overlapping the camera display screen 106 for viewing an object through the viewfinder 100. In the example of FIGS. 6A-6B, the viewfinder 98 is rotatable in accordance with the first example rotation axis that is normal to the optical axis of the digital camera and illustrated in FIG. 3.

Figure 7:
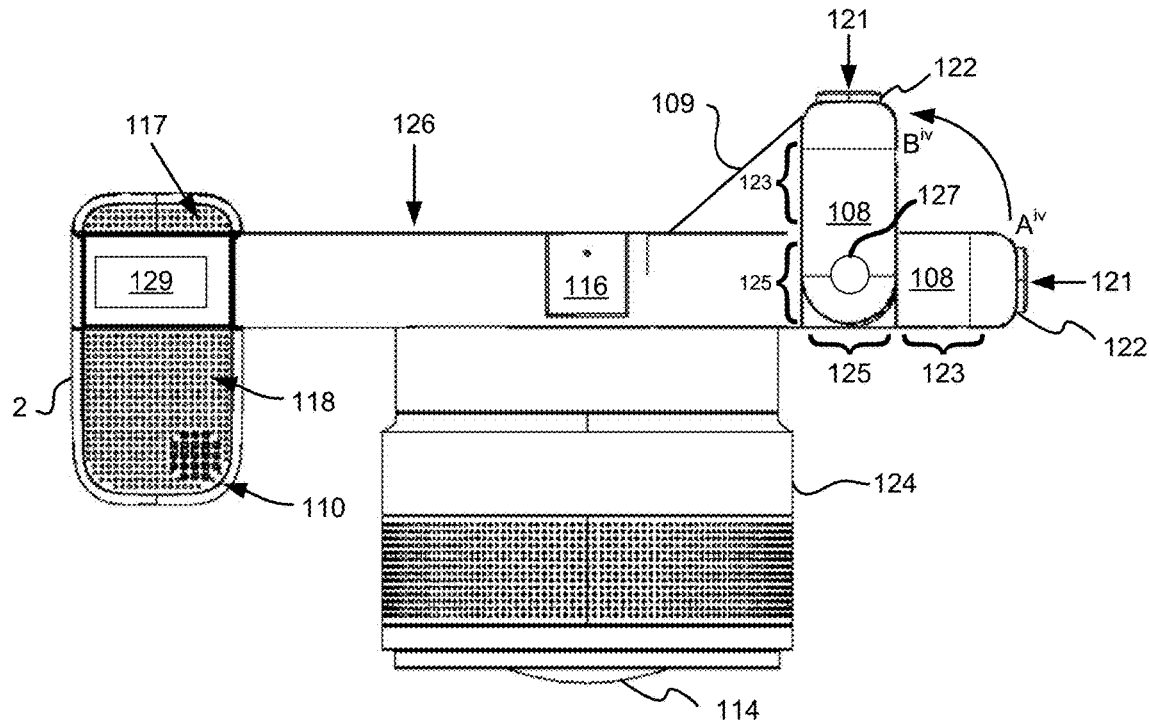
FIG. 7 schematically illustrates a top view of a digital camera that includes a view finder coupled with an optical loupe or viewfinder in accordance with certain embodiments.

FIG. 7 schematically illustrates a top view of a digital camera in accordance with certain embodiments. In FIG. 7, the viewfinder 108 is shown in the stowed position $A^{iv}$ and also in the active position $B^{iv}$ and an arrow is shown to indicate that the viewfinder 108 rotates counter-clockwise in the top view of FIG. 7 between the stowed and active positions. The viewfinder 108 may include a magnifying optical assembly such as a magnifying lens or an optical loupe in certain embodiments. The viewfinder 108 of FIG. 7 includes a blinder 109 that reduces light from the display screen 126 near the viewfinder 108 from bothering the camera user who is trying to use the viewfinder 108 to view, edit, capture or share or otherwise work with images or other computational functions involving viewing objects a display.

The viewfinder 108 includes an optical section 123 and a rotation coupling section 125. The optical section 123 uses a top-left corner of the display screen 126 as an object and an eye of a camera user to view a magnified image displayed within the top-left corner portion of the display screen when the viewfinder 108 is in active position $B^v$. A magnifying lens or lenses are disposed between display screen 126 and the eye of the user in the optical section of the viewfinder 108, although not shown in FIG. 7. A window 121 encloses the viewfinder. In certain embodiments, the window is configured to magnify images to be received at the eye of the user. The rotation coupling bracket section 125 includes a thin protrusion that extends from the top of the viewfinder housing at the optical section 123 at least through a rotation coupling 127 that is disposed in the example of FIG. 7 at the rotation axis 127 of the viewfinder 108.

FIG. 7 also schematically illustrates a grip 2 that includes a pop-up flash 129 that may recess into the grip 2 when not in use and translate out of the top of the grip 2 for use. The top portion of the grip 2 in FIG. 7 also includes a touch slider 118 and image capture button 110. The touch slider 118 may be disposed at any area of the top of the grip in front of the main camera housing. The touch slider 117 may be an included additional area of the same slider 118 or the slider 117 may be separate from or alternative to the slider 118 such as to provide the user with an option or for contemporaneous functionality, e.g., adjusting two image parameters at once each using a different slider.

A second slider 117 may be disposed at a rear area of the top of the grip 2, e.g., to the rear of the main housing. The slider 117 is disposed for finger or thumb actuation, just as the slider 17 of FIGS. 1B and 2B is disposed for thumb actuation at a back surface of the grip 2 and the slider 118 is disposed for finger actuation nearer a front surface of the grip or alternatively on the front surface of the grip. A camera with touch slider may be provided in accordance with various embodiments including a camera with only one slider 17, 117 or 118 or just having use of a slider object on the touch display screen 126 or having a slider on the other side of the camera, or with two sliders 17 and 118, 17 and 117, or 117 and 118, or one of the sliders 118, 17, or 117 and a slider object on a touchscreen display 126, or three of more sliders, and the display screen may have touchscreen capability such that another slider option may be provided anywhere on the display screen.

A camera may include one or more touch sliders 17, 117, 118 and/or a touch screen display object. A touch slider 17, 117, 118 and/or a touch screen display object may be a linear slider when it is sensitive to relative movement along a single directional axis and/or when adjustments to values of parameters are made in proportion to a sliding movement along the single directional axis. A touch slider 17, 117, 118 and/or a touch screen display object may be two dimensional such that multiple linear sliders may be defined each along a different directional axis within the contour of the touch slider 17, 117, 118, or display object.

Figure 8:
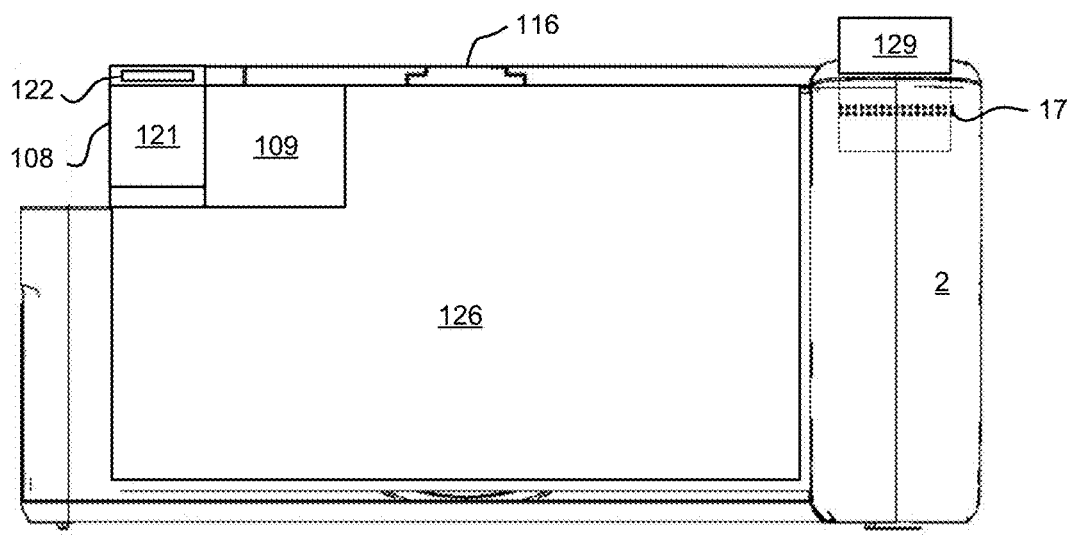
FIG. 8 schematically illustrates a back view of a digital camera that includes a display screen and a capacitive touch sensor zone or slider for scrolling in accordance with certain embodiments.

FIG. 8 schematically illustrates a back view of the digital camera of FIG. 7 including a viewfinder 108 in the active position $B^{iv}$ including a blinder 109 for blocking light emanating from an overlapped portion of the screen 126 when the viewfinder 108 is in the active position $B^{iv}$ and retracting when the viewfinder 108 is in the stowed position $A^{iv}$. The viewfinder 108 of FIG. 8 also includes an optical window 121 and eyebrow rest 122. FIG. 8 also schematically illustrates the display screen 126 and a capacitive touch sensor zone 17 or slider 17 on the back of the grip for scrolling and/or adjusting image parameters displayed on the display screen 126 and/or in the viewfinder 108 in accordance with certain embodiments.

The camera of FIG. 8 includes a hot shoe bracket interface 116 which may include a mechanical, electrical and bi-directional communications interface with a secondary image capture device (SICD) which is described in more detail below with reference to FIGS. 13-14. The camera of FIG. 8 also includes a pop-up flash 129 which is configured to recess into the grip 2 when not in use.

Figure 9:
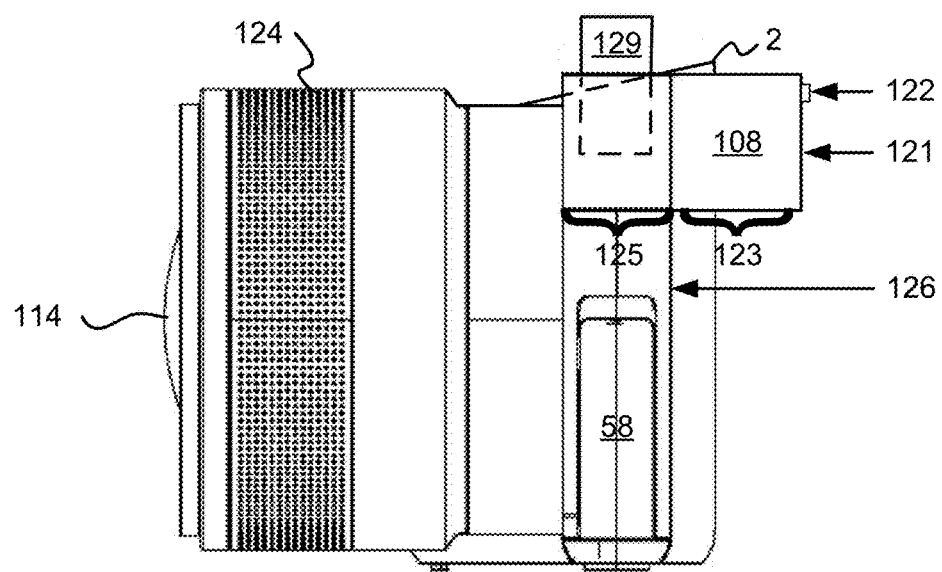
FIG. 9 schematically illustrates a perspective view of a digital camera that includes a grip portion with a built-in pop-up flash, capacitive touch slider and shutter control button in accordance with certain embodiments.

FIG. 9 schematically illustrates a side view of the digital camera of FIGS. 7-8 including a viewfinder 108 in the active position $B^{iv}$ having an optical window 121 and an eyebrow rest 122. The viewfinder 108 includes an optical section 123 for magnifying the top-left portion of the display screen 126 and a rotation coupling section 125 that defines a rotation axis 127 for the viewfinder 108. FIG. 9 also schematically shows a lens 114 and lens holder 124 and battery access 58 for a digital camera in accordance with certain embodiments.

In another embodiment, a digital camera may include a pair of viewfinders, wherein each may be configured in accordance with embodiments described herein. The pair of viewfinders may be spaced apart to overlap different display areas for viewing two different images by the left and right eyes of the user. One or both of the pair of viewfinders may have an adjustable magnification or focus position. Both images may be the same, or the two images may differ slightly in angle to provide a 3D effect. One image may be visible while the other may include infrared light. One image may be captured by the main camera and the other by a secondary image capture device (SICD) coupled to a hot shoe interface 116. The two images may be downloaded or streamed such as may be provided as a video game or virtual simulation.

Linear Slider/Touch Slider

A digital camera is provided that includes an image sensor within a camera housing, an optical assembly including one or more lenses for forming images on the image sensor, a display screen for viewing the images, and a touch slider configured for sensing a relative movement of a finger, thumb or stylus or other tool of a user, or combinations thereof, and adjusting a value of an imaging parameter based on the relative movement.

The touch slider may include or define a linear slider in certain embodiment, such as to adjust a value of an precapture or postcapture image parameter or camera setting. The linear slider may be configured for adjusting a value of an image parameter proportional to the relative movement that it senses along a single defined axis.

A touch slider in accordance with certain embodiments may be sensitive to sliding or other relative movements along one or two directional axes along the surface of the touch slider, which may be planar or curved or a combination thereof. The touch slider may also be sensitive to proximity, taps, changes in pressure and/or other relative movements along a third axis normal to the touch sensor surface.

In certain embodiments, the touch slider is sensitive to sliding movements along one or two directional axes and to taps along a third axis normal to the touch sensor surface. The touch sensor may include a linear slider or may be configured with a linear property. The linear slider may be responsive to motion along a single directional axis, or the linear slider may be used to adjust a parameter in linear proportion to a detected sliding movement, or the linear slider may be geometrically linear, e.g., having a single pixel width, or the linear slider may be configured as a combination of two of these three features or of all three of these features.

In certain embodiments, a top surface of the grip may be pixelated as a touch sensor, and/or a side, back and/or front surface of the grip may include a touch sensor. In certain embodiments, a touch sensor may be included on a lens housing or above or below or to the side of a lens housing at the front of the camera or at the top or side of the camera, or combinations of these.

A touch sensor in accordance with certain embodiments may be one, two or three dimensional in its capacity to sense relative movements and/or proximities which may be communicated to a camera processor as precapture settings or processing commands, or selections of imaging parameters or quantities thereof, or data or other digital inputs.

The touch sensor may serve as a shutter trigger or image capture button when the camera is programmed to interpret a tap, proximity or pressure change at a touch slider as a command to capture an image.

The touch sensor may also be used to adjust a position of focus within a scene to be captured. In certain embodiments, the camera may be programmed to interpret relative movement along a touch sensor as commands to move a focus position within the scene. A relative movement in the plane or normal to the plane of the touch sensor may be viewable on the display as movement of a cursor within the scene or as selection of a autofocus position, respectively, or combinations thereof.

The touch slider may be configured for haptic sensing of relative movement by the camera or by the user, or both.

The touch slider may be configured to sense proximity for selecting a menu item or otherwise executing an object script appearing on the display screen. The touch slider may be configured for scrolling and moving a cursor or other object on the display screen.

A value of an imaging parameter may be adjustable based on a length, speed, shape, and/or distance or other amount discernible from the relative movement sensed by the touch slide. The value may be adjustable in proportion to the length, speed, shape, and/or distance or other amount.

Different parameters may be selectable for adjusting based on a direction of relative movement sensed by the touch sensor. Multiple parameters may be adjustable with a single relative movement sensed by the touch sensor, e.g., when in certain embodiments the camera is programmed to extract non-zero projections of the single relative movement onto each of multiple directional axes. The multiple directional axes may include two perpendicular axes that define a touch slider plane. The touch slider plane may be disposed parallel to a portion of the housing. The multiple directional axes may include a third axis normal to the touch slider plane.

The touch slider may include multiple posts that are independently movable in one or more directions out of the touch slider plane. The multiple posts may be movable relative to the digital camera housing from recessed or otherwise stowed positions to one or more protruded positions when in use. The digital camera may be programmed to track movements of the multiple posts in one or more directions to determine a relative movement of a finger, thumb or stylus and/or other tool of a user.

The touch slider may include a capacitive touch sensor. The touch slider may be configured for haptic activation. The touch slider may be configured for touch screen activation. The touch slider may be spaced from the display screen. The display screen may be disposed at a rear surface of the housing and the touch slider may be disposed at a top, bottom, side or front surface of the housing or on the grip.

Imaging parameters that may be conveniently and smoothly adjusted using the touch slider may include exposure, brightness, contrast, focus distance, depth of field, white balance, digital fill flash and/or focal point.

The camera may be programmed to suggest to a camera user to adjust or check a level of one or more of imaging parameters. These suggestions may be determined based on image analysis or user preferences, or both.

The touch slider may be configured for selecting different imaging parameters by respectively tapping or otherwise touching different regions of the touch slider.

The camera may be configured to provide on the display screen visual information to the user about the relative movement sensed by the touch slider and/or about the adjustment of imaging parameter values using the touch slider. The information may include identification of a specific imaging parameter and a value of the identified parameter. The information may include a suggested direction of change of the value of a parameter and/or a suggested value to adjust to.

The camera may include an ergonomic camera grip at one end of the camera housing. The ergonomic camera grip may be detachably coupled to the camera housing at one end, or formed together with the rest of the camera housing. A chamfered shutter button may be disposed on the grip or exposed through a cavity or recess defined into the grip. The touch slider may be disposed on the grip or exposed through a cavity or recess defined in the grip. Multiple touch sliders may be provided, e.g., at top and rear locations on the grip that are respectively conveniently accessible by an index finger and thumb of a camera user. A touch slider may be located on either side of the camera.

The grip may include a transparent rear window and/or side wall material for viewing a portion of the display screen that the grip overlaps. In certain embodiments, the display screen extends into the grip and is viewable through the transparent material forming the rear window and or side wall of the grip.

Figure 10A:
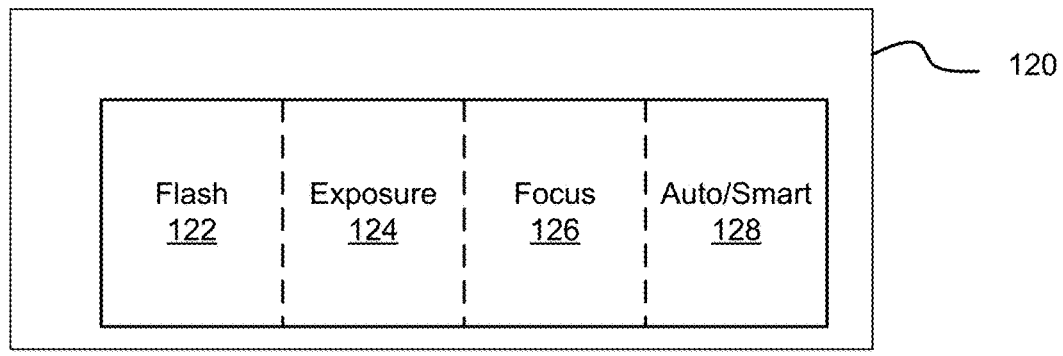
FIGS. 10A-10D schematically illustrate a linear slider for adjusting one or more image capture parameters and/or editing a captured image in accordance with certain embodiments.
Figure 10B:
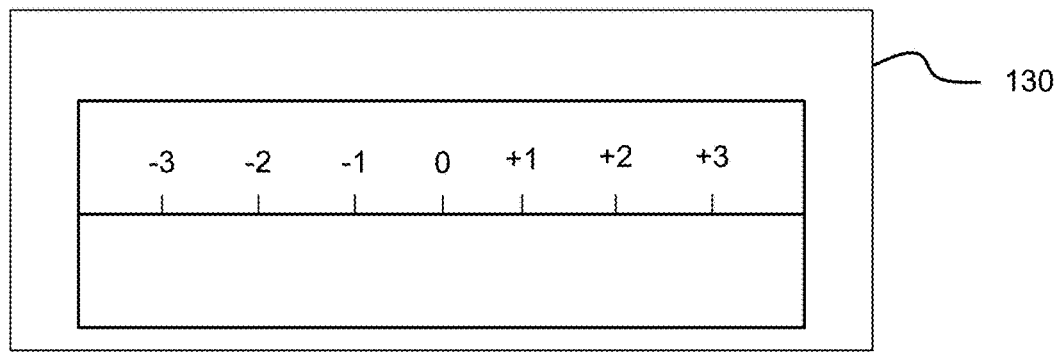
Figure 10C:
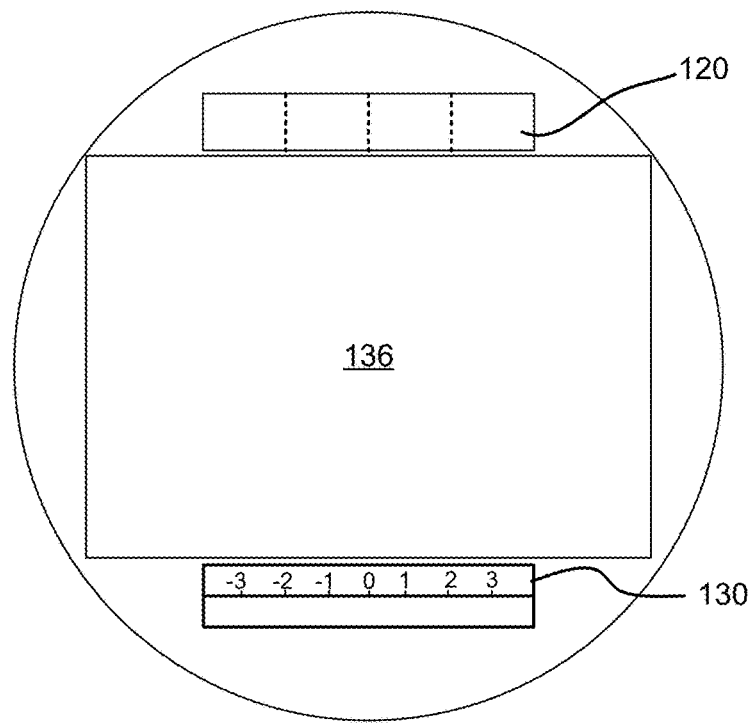

FIGS. 10A-10C schematically illustrate examples of touch slider display objects that, in a first example, a user may view on the display screen 16 while thumb actuating the touch slider 17 of a camera configured in accordance with FIG. 1B or finger actuate a touch slider 118 or 117 as in the example of FIG. 1C, or that, in a second example, a user may both view and touch screen actuate a displayed touch slider object, for selecting and adjusting an imaging parameter in accordance with certain embodiments. Any touch slider 17, 117 and/or 118 other than a touch screen display object slider may include multiple posts or pegs formed together in an array of pixels that may be disposed in an overall touch slider recess or in two or more touch slider region recesses or each post or peg may recess into its own individual post or peg recess when not in use, and then protrude out of the housing when a user decides to use the touch slider 17, 117, and/or 118. In other embodiments, a slider 17, 117, 118 may include a fixed touchpad surface.

The touch slider 120 illustrated schematically in FIG. 10A is divided into four regions: flash 122, exposure 124, focus 126 and auto/smart 128. The number of touch slider regions may be more or less than four and the regions 122, 124, 126, 128 may be disposed in a circular shape or in another curved shape or in a linear or rectangular shaped region, and the sub-regions may be polygonal or curved in shape while the overall touch sensor region may be shaped differently. The touch slider 120 may overlap a preview of an image on the display screen or may be disposed to the side or above or below a preview image on the display screen or there may be separate display screens for the user interface and preview or postcapture images. There may be another region that would forward to a next set of parameters that may be selected to adjust, and there may be as many sliders generated in this manner as there are sets of parameters that may be adjusted. In certain embodiments, a user may initiate an adjustment of flash, exposure or focus or another parameter by tapping the touch slider region designated for the parameter that is to be adjusted. When any of the regions designated flash, exposure or focus is selected by the user by tapping region 122, 124 or 126, respectively, then the touch slider changes to a different touch slider 130 such as that shown in FIG. 10B for adjusting a value of the selected parameter. Tapping the auto/smart region 128 of the touch slider 120 would leave it to the default settings or a programmed process for setting imaging parameters that have not been specifically set by the user.

In certain embodiments, the user can tap one of the numbers shown in the example slider 130 of FIG. 10B to adjust the value of the selected parameter by the indicated amount, e.g., +2 or −1. The user may in certain embodiments use the slider 17 of FIG. 1B or slider 117 or 118 of FIG. 1C or a touch screen display slider object by sliding a finger or thumb in one direction to increase the value of the parameter or in the opposite direction to reduce the value of the parameter. The touch slider display object 130 may alternatively show actual values of the parameter that may be selected directly by tapping the slider or by finger thumb sliding left or right to respectively decrease or increase the value of the parameter by an amount proportional to the sliding distance or other quantity that may be detected or computed for the finger or thumb movement such as slide speed or downward pressure.

FIG. 10C illustrates a view through a viewfinder, e.g., viewfinder 48 of FIG. 3 or viewfinder 108 of FIGS. 7-9. An image 136 appears in the viewfinder illustrated in the example of FIG. 10C. A touch slider display object 120 is shown just above the image 136 in FIG. 10C, and a touch slider display object 130 is shown just below the image 136. In other embodiments, one touch slider 120 or 130 would appear at a time, respectively, for selecting a parameter to adjust or for adjusting a selected parameter. The touch slider 118 of FIG. 1C, or slider 17 of FIG. 1B, or slider 117 of FIG. 1C, or combinations thereof, may be divided functionally into two or more regions, including a region operating in accordance with touch slider 120 and a region operating in accordance with touch slider 130. In another example, one slider 118 may operate in accordance with touch slider 120, while another slider 17 may operate in accordance with touch slider 130.

Figure 10D:
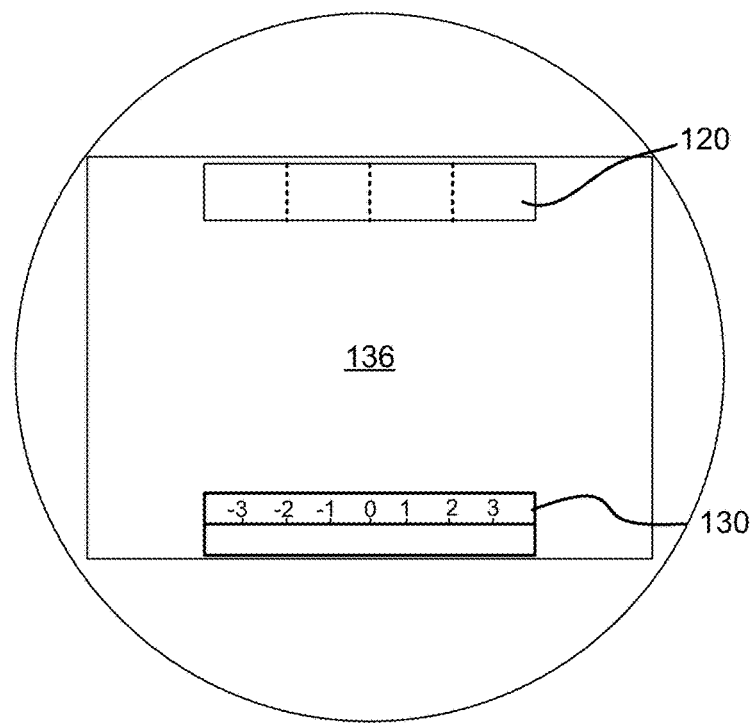

FIG. 10D illustrates another view through a viewfinder, e.g., viewfinder 48 of FIG. 3 or viewfinder 108 of FIGS. 7-9. An image 136 appears in the viewfinder illustrated in the example of FIG. 10D. A touch slider display object 120 is shown near the top overlapping the image 136 in FIG. 10D and a touch slider display object 130 is shown near the bottom also overlapping the image 136. In certain embodiments, there may be three touch slider display objects, e.g., one for focus, aperture and/or depth of field, one for brightness or exposure, and one for motion blur or shutter duration control. Various numbers of touch slider display objects may be provided each corresponding to a different parameter that is amenable to manual user pre-capture or post-capture control. The objects 120, 130 in the example of FIG. 10D may be translucent so that the image can be seen even where the display object 120, 130 also occupies a same display screen portion. In other embodiments, one touch slider 120 or 130 would appear at a time, respectively, e.g., for first selecting a parameter to adjust and for next adjusting the selected parameter or for first adjusting a first parameter and for next adjusting a second parameter (then a third parameter, etc.). The touch slider 118 of FIG. 1C, or slider 17 of FIG. 1B, or slider 117 of FIG. 1C, or combinations thereof, may be divided functionally into two or more regions, including a region operating in accordance with touch slider 120 and a region operating in accordance with touch slider 130. In another example, one slider 118 may operate in accordance with touch slider 120, while another slider 17 may operate in accordance with touch slider 130.

The touch sliders 120, 130 may be embodied in an array of touch sensitive elements coupled onto a digital camera housing or exposed through a cavity or recess in a digital camera housing, or provided as an object on a touch sensitive digital camera display screen, or combinations thereof. In certain embodiments, a camera processor is programmed to interpret a touching, tapping or sensed proximity of a finger, thumb or stylus or other tool of a user, or some combination thereof, to a specific region of the touch slider as a user command to initiate a process for adjusting a value of a specific imaging parameter. Alternatively, a length or duration of a sliding movement or double tap time, or a tap pressure, or a sliding movement between specific regions, or another sensed movement or characteristic of a sensed movement, such as an area of a closed path, may be assigned to a specific imaging parameter.

Imaging parameters may include precapture settings for the digital camera such as an intensity of flash or other light source illumination, a selection of one or more of multiple available flash choices such as a xenon or krypton flash and one or more LEDs, and/or a duration or sequence or direction or spectral range or divergence or whether to use a Fresnel lens, or a length of exposure, or aperture size, or selection of a single or multiple still image capture, or one of multiple video capture modes, or a specific audio capture mode such as selecting from multiple available microphones, wavelength ranges to include or exclude, microphone direction, stereo balance or other available audio options, or a parameter that may be adjusted by altering a configuration of the optics of the camera, e.g., a focus or zoom setting may be adjusted by moving a lens relative to the image sensor, or magnification of a viewfinder may be adjusted by moving a magnifying lens within the viewfinder, or a parameter of a captured image such as exposure, contrast, brightness, focus distance, depth of field, white balance, digital fill flash or focal point.

In the example of FIG. 10A, which is simplified for illustrative purposes, an elongated slider 120 has been separated into four regions along its length. The four regions of the slider 120 in FIG. 10A are labeled flash, exposure, focus and smart/auto mode. The user may tap the exposure region, e.g., and a touch slider object 130 would show exposure values ordered from low to high values within some reasonable number of regions of the touch slider 120. A region may be then tapped which would adjust the exposure to the value provided in that region, or a sliding movement may be used to raise or lower the exposure value by a proportional amount to the distance, speed, pressure, duration or other determinable characteristic of the relative movement sensed by the touch slider 130.

A touch slider may be deemed or referred to as a linear slider in certain embodiments wherein a camera user may adjust a value of a selected imaging parameter in an amount that is proportional to a relative movement along a directional axis defined within the plane of the slider surface such as a sliding distance of a user's finger along an axis defined in the plane of the linear slider. The slider 17 of FIG. 1B and/or the slider 118 and/or the slider 117 of FIG. 1C may have a width as small as a single pixel such that relative movements can only be detected in one direction along a single axis of the slider. Two or more touch sensitive pixels may be provided in certain embodiments along a second directional axis of the slider 117 and/or slider 118 and/or slider 17 such that relative finger or thumb motion may be detected along two axes that define a plane or other contour of the camera housing surface where the slider is located. A slider 117, 118 and/or 17 or a touch screen object slider may have an elongated shape in certain embodiments or a circular, elliptical, square or other polygon or closed shape having some combination of curved and straight segments.

Quantities associated with a third dimension normal to the plane of the slider 117, 118, and/or 17 which is coplanar with the camera housing surface in the examples of FIG. 1B-1C, such as downward force or pressure or proximity, may be utilized by assigning certain commands to them in certain embodiments. A touch slider in accordance with certain embodiments may have the functionality of a mouse, joystick, or game controller or may be limited to a short list of imaging parameters as in the illustrative example of FIG. 10A or something in between. For example, the digital camera may be programmed to process a tap in a same or similar manner as a mouse click and to process a relative movement of a finger or thumb of a user or a stylus or other tool held by a user along the length or within the area of the slider in a same or similar manner as a movement of a mouse.

A touch slider may be located at the top of the camera (see FIG. 1C, slider 118 and slider 117) or the front of the camera, or the rear of the camera (see FIG. 1B, slider 17 and touch screen display 16), and may be located on either side of the camera. The touch slider can be activated using a haptic mechanism such as a touch screen or a touch slider haptic mechanism. The camera may be configured for finger or thumb actuated haptic activation of the touch slider.

An imaging parameter may be adjusted using the touch slider as a single parameter adjustment axis, or correction may be performed using the touch slider as a complex combination of some of the parameters above. The touch slider may be used in conjunction with a duplicate visual display and/or may be functionally divided into two regions: one object on the display and/or one region of the touch slider being configured for selecting a mode of correction and the other object on the display and/or other region of the touch slider being configured for selecting a quantity of correction. In one example, both of the objects illustrated in FIGS. 10A and 10B may be provided together at the same time and/or side by side on the camera display and/or the touch sliders 17, 117 and/or 118 illustrated schematically in the examples of FIGS. 1B and 1C may be functionally separated into a mode selection region and a quantity of correction region (e.g., upper half and lower half or left side and right side). Alternatively, a digital camera in accordance with certain embodiments may include a pair of touch sliders that are functionally distinguished as a mode selection slider and a quantity of correction slider.

LED Lighting

A digital camera is provided that includes an image sensor within a camera housing, an optical assembly including one or more lenses for forming images on the image sensor, a display screen for viewing the images, a processor and multiple LEDs coupled to the housing for providing illumination during image capture.

The multiple LEDs may be spaced apart across the camera length or around the optical assembly of the camera. The multiple LEDs may clustered in groups of two or more LEDs that have different wavelength spectra or different color temperatures.

The camera may be programmed to activate the multiple LEDs at different times. The camera may be programmed to combine image data from images captured at different light angles. The camera may be programmed to combine images to generate a panoramic image or a 3D image.

The camera may be programmed to activate the multiple LEDs for different durations. The camera may be programmed to utilize image data captured using illumination by the multiple LEDs activated at different durations to generate images with one or both of back or front flash effects.

The digital camera may also include one or more non-LED light sources. The camera may be programmed to activate different light sources to generate images with different fill light. The camera may be programmed to automatically determine a desired fill light by capturing and analyzing an image. The desired fill light may be determined based on location of a main light, direction of a shadow, overall color balance, or combinations thereof. The camera may be programmed to determine depth based on a disparity of light sources to generate a 3D image.

The camera may be programmed to create a movement effect by activating the multiple LEDs in sequence while capturing multiple images each with activation of a different LED.

The multiple LEDs may have different divergence characteristics. The multiple LEDs may include a spot light and at least one wider divergence LED.

The camera may have a xenon flash, which may be a pop-up flash that recesses into camera housing when not in use. The camera may be programmed to capture images with short or long lighting or both. The camera may be programmed to provide a level guide that automatically notifies the user that the camera is not level and disappears when camera level is restored.

Figure 11A:
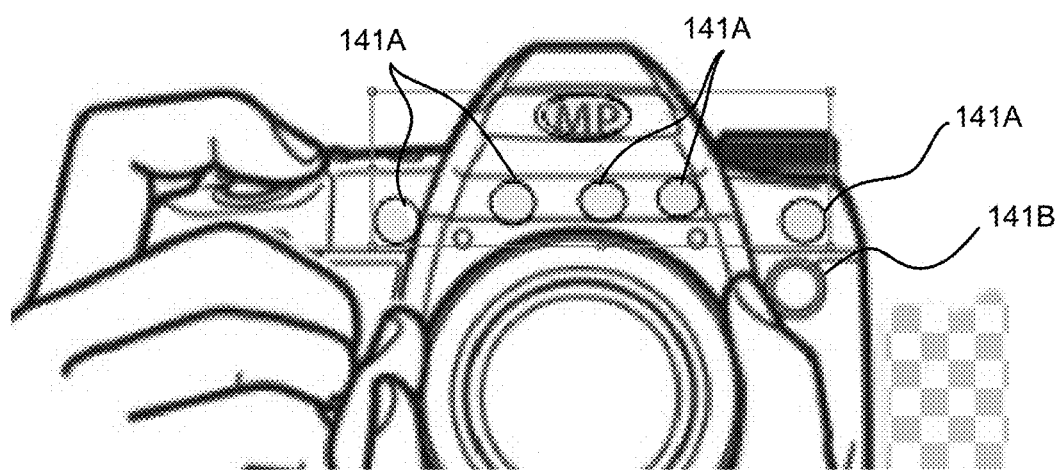
FIGS. 11A-11C schematically illustrate front views of example digital cameras that each include multiple LEDs for illuminating objects to be imaged in accordance with certain embodiments.
Figure 11B:
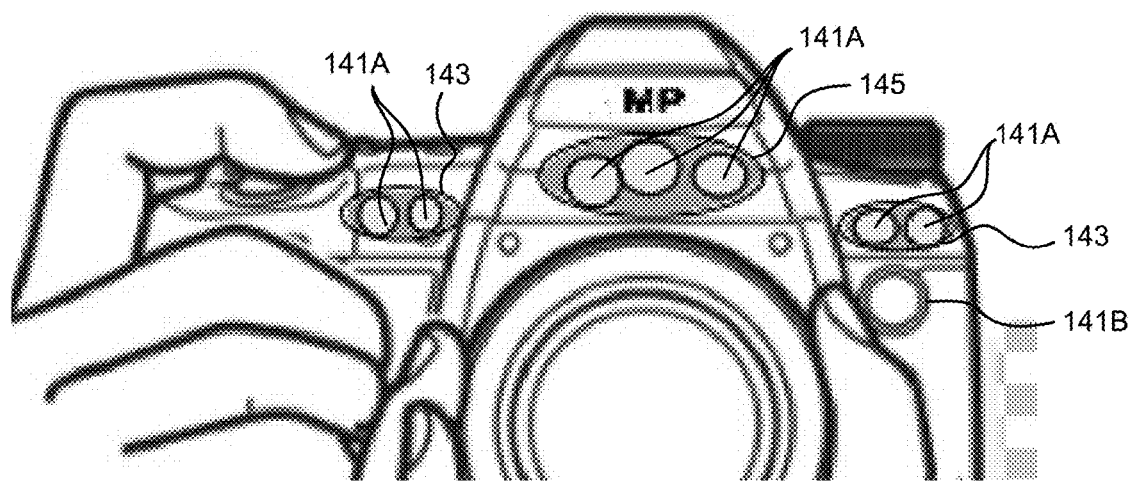
Figure 11C:
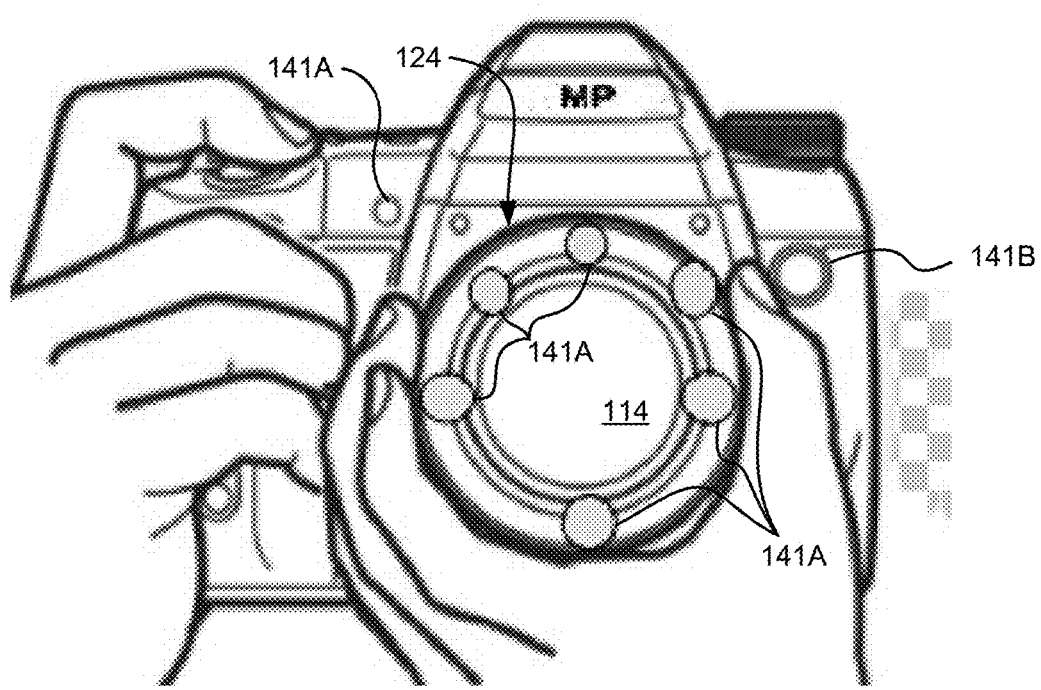

FIGS. 11A-11C schematically illustrate front views of example digital cameras that each include multiple LEDs 141A for illuminating objects to be imaged in accordance with certain embodiments. The example illustration of FIG. 11A shows four LEDs 141A disposed across the front of the camera. In some embodiments, multiple LEDs 141A are disposed across the front of the camera and behind an elongated Fresnel lens as illustrated schematically in the example of FIG. 2E. A camera in accordance with a multiple LED embodiment may include as few as two LEDs 141A that may be built-in to the camera or attachable at a hot shoe bracket or detachable for adjusting a position or angle of illumination during image capture, or remotely controlled by the camera as a peripheral accessory. The LEDs 141A may be relatively disposed in various ways and embodiments of digital cameras herein generally may include no flash LEDs or any number of LEDs as flash illumination components.

A microphone 141B is also shown in the example of FIG. 11A to the right of the lens 114. In certain embodiments, three microphones 141B are disposed in the plane of the front surface of the camera that form a triangle such as a right triangle or otherwise to permit, e.g., stereo audio sound recording when the camera is in different orientations such as landscape and portrait orientations.

The LEDs 141A may be clustered in groups as illustrated schematically in FIG. 11B. In the example of FIG. 11B, two groups 143 of two LEDs 141A are disposed to the left and right of a third group 145 of three LEDs 141A. The LEDs 141A of any of the groups 143, 145 may be selected to complement other LEDs 141A in the group. For example, a group 143, 145 may include LEDs that offer different wavelength spectra, different color temperature, different intensity, different divergence (spot, wide), different duration, or may be positioned at a slightly different angle.

The LEDs 141A of a group 143, 145 may have different delays so that the LEDs 141A flash at slightly offset times. The LEDs 141A of a group 143, 145 may be activated at different times to allow the capture of multiple images each illuminated by one LED flash 141A or a subset of LEDs 141A. In one embodiment, these multiple images may be captured and/or illuminated using various light angles.

The groups 143, 145 may be activated at a same time or at different times or for different durations, e.g., to provide a "back to front flash" effect. A specific selection of LEDs 141A and/or groups 143, 145 of LEDs 141A to use in capturing a specific image may provide specific fill light characteristics for the image.

The camera may be configured to determine depth by using the disparity of the lights, e.g., to generate a 3D image or to adjust focus. A movement effect may be created by activating multiple LEDs 141A in a particular order or sequence while capturing multiple images each with a different LED 141A lighting the scene. The camera may be programmed to automatically determine a desired fill light based on an analysis of preview images. This determination may depend on a location of a main light source such as the sun, an external light or a main camera flash, a direction of shadows, overall color balance, and/or other parameters One or more LEDs 141A may be used in combination with a xenon flash to provide short/long lighting. A xenon flash may be attachable at a hot shoe bracket or built-in such as in the example of the pop-up flash 129 illustrated schematically in FIGS. 7-9.

FIG. 11C schematically illustrates a digital camera with multiple LEDs 141A disposed on the camera lens holder around the optical path of the camera at the periphery of a light collecting area of the lens at the object end of the lens holder. Six LEDs 141A are shown in FIG. 11C disposed on the lens holder 124, although any number of LEDs 141A may be disposed on the lens holder 124 in various embodiments. One or more LEDs 141A may be disposed on the lens holder as in FIG. 11C, while one or more LEDs 141A may be disposed on the camera housing such as in FIG. 11A or FIG. 11B.

LEDs 141A may be disposed within recesses defined in the housing when not in use. When a LED 141A is to be used to provide illumination during image capture, the LED 141A may protrude out of the recess to provide illumination during an image capture and then recede back into the recess. An optional pop-up flash 129 may also be configured to recede into the housing when not in use.

Another digital camera is provided that includes an image sensor within a camera housing, an optical assembly including one or more lenses for forming images on the image sensor, a display screen for viewing the images, a processor and a lens mounted flash coupled to the lens housing for providing illumination during image capture.

The lens mounted flash may be rotatable relative to the lens housing for adjusting a position of the lens mounted flash around the optical path of the digital camera.

The lens mounted flash may include multiple LEDs spaced apart around the optical assembly.

The lens mounted flash and/or the lens housing may be detachable from the digital camera housing.

The lens mounted flash may include one or more non-LED light sources. A Fresnel lens may be disposed between at least one LED and/or non-LED light source and an object end of the optical path of the digital camera.

The lens mounted flash may include multiple spaced apart light sources that are clustered in two or more groups around the optical path of the digital camera.

Multiple LEDs may also be coupled to the digital camera housing for providing additional or alternative illumination during image capture. The multiple LEDs may have different wavelength spectra or different color temperatures. The camera with lens mounted flash may be programmed to activate the multiple LEDs at different times. The camera with lens mounted flash may be programmed to combine image data from images captured at different light angles. The camera with lens mounted flash may be programmed to combine images to generate a panoramic image. The camera with lens mounted flash may be programmed to activate the multiple LEDs for different durations. The camera with lens mounted flash may be programmed to utilize image data captured using illumination by multiple LEDs activated at different durations to generate images with one or both of back or front flash effects.

The camera with lens mounted flash may be programmed to activate different light sources or combinations thereof, to generate images with different fill light. The camera with lens mounted flash may be programmed to automatically determine a desired fill light by capturing and analyzing an image. The desired fill light may be determined based on location of a main light, direction of a shadow, overall color balance, or combinations thereof. The camera with lens mounted flash may be programmed to determine depth based on a disparity of light sources to generate a 3D image.

The camera with lens mounted flash may be programmed to create a movement effect by activating the multiple LEDs in sequence while capturing multiple images each with activation of a different LED.

The multiple LEDs may have different divergence characteristics. The multiple LEDs may include a spot light and at least one wider divergence LED. The camera with lens mounted flash may also include a xenon flash. The camera with lens mounted flash may be programmed to capture images with short or long lighting or both.

Figure 12A:
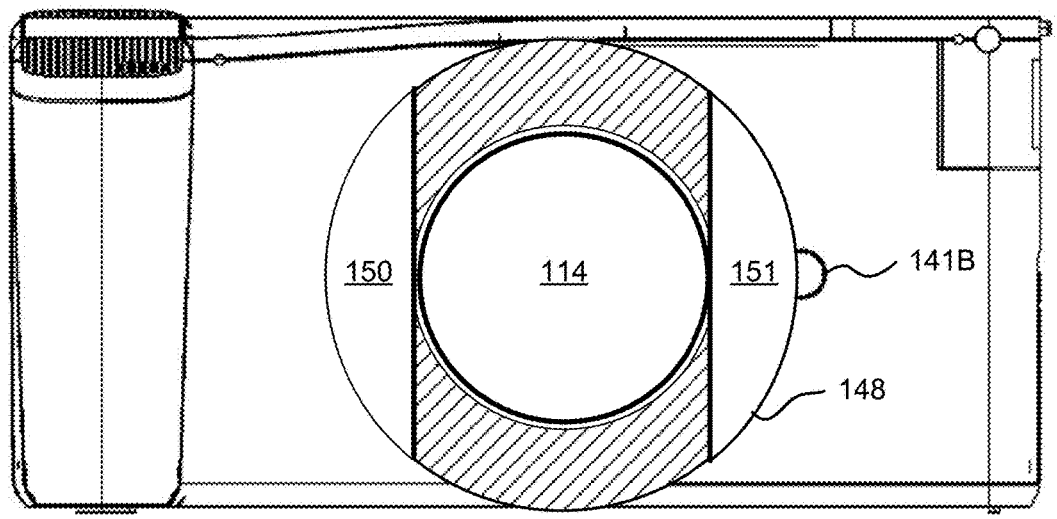
FIGS. 12A-12B schematically illustrate front and top views of a digital camera with a rotatable lens mounted flash in accordance with certain embodiments.
Figure 12B:
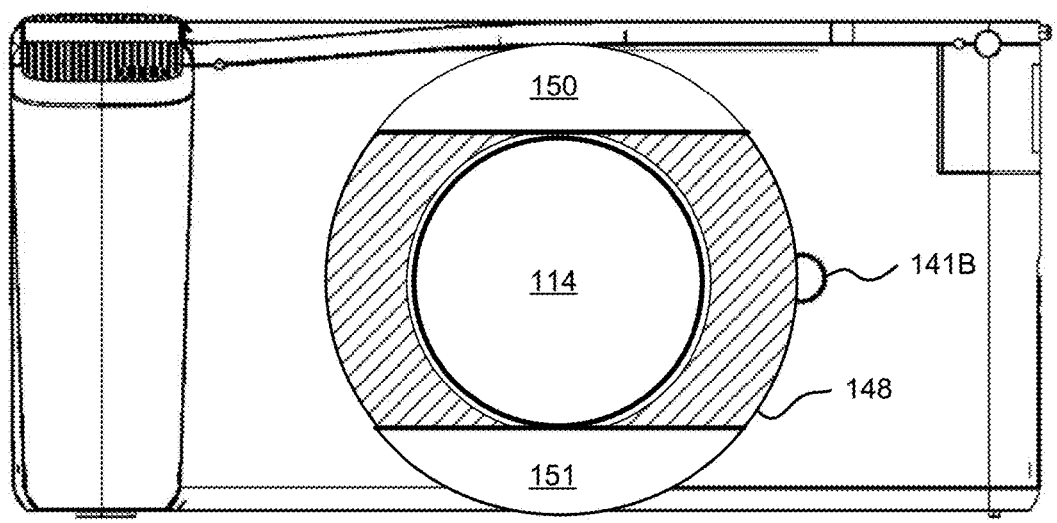

FIG. 12A schematically illustrate front and top views of a digital camera with a rotatable lens mounted flash 148 in accordance with certain embodiments. In the example of FIG. 12A, a pair of LEDs 150 or groups or clusters of LEDs 150 or xenon or other flash sources 150 are disposed on opposite sides of the camera lens. The lens mounted flash may include a different number of flash sources 150 and the flash sources may be differently configured around the lens mounted flash 148. The lens mounted flash may couple to the lens holder like a lens cap. The lens mounted flash 148 is ring shaped such that a circular hole at the center allows light to reach the lens. FIG. 12B schematically illustrates a camera with a lens mounted flash 148 rotated 90° compared with FIG. 12A.

Figure 12C:
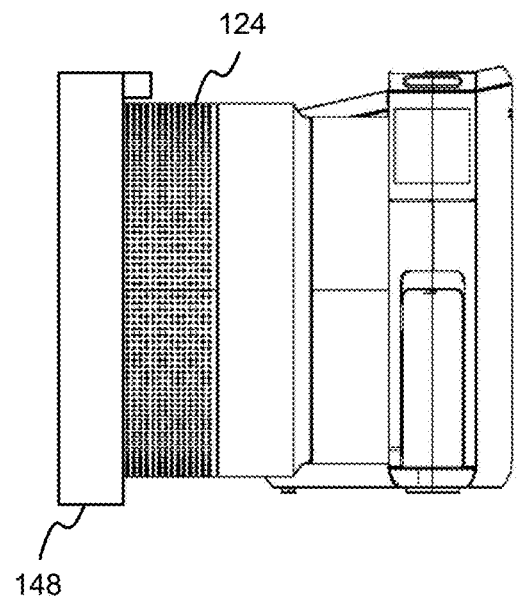
FIG. 12C schematically illustrates another front view of the digital camera of FIGS. 15A-15B with the rotatable lens mounted flash rotated 90° in either direction compared with the orientation of the rotatable lens mounted flash shown in FIG. 12A.
Figure 15A:
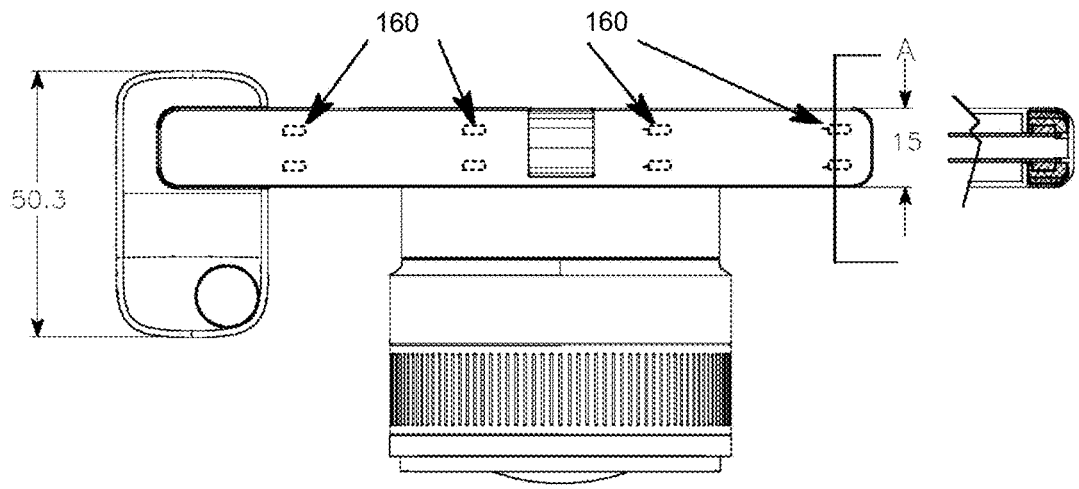
FIG. 15A schematically illustrates a top view of a digital camera that includes multiple microphones for audio recording in accordance with certain embodiments.
Figure 15B:
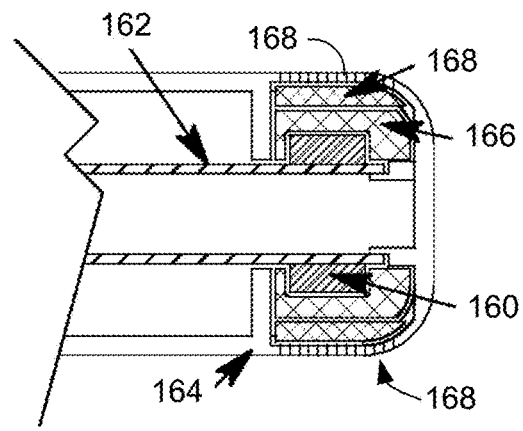
FIG. 15B schematically illustrates a cross sectional top view of a corner of a digital camera that includes a pair of microphones in accordance with certain embodiments.

FIG. 12C schematically illustrates another front view of the digital camera of FIGS. 15A-15B with the rotatable lens mounted flash rotated 90° in either direction compared with the orientation of the rotatable lens mounted flash shown in FIG. 12A.

A microphone 141B is also shown in the example of FIGS. 12A-12C to the right of the lens 114. In certain embodiments, two stereo microphones are disposed on either side of the lens assembly 114. Three microphones 141B may be disposed in the plane of the front surface of the camera that form a triangle such as a right triangle or otherwise to permit, e.g., stereo audio sound recording when the camera is in different orientations such as landscape and portrait orientations.

Secondary Image Capture Device ("SICD")

A digital camera is provided that includes an image sensor within a camera housing, an optical assembly including one or more lenses for forming images on the image sensor, a display screen for viewing the images, a processor and a bracket coupled to the housing that is configured for coupling a second image capture device to the digital camera.

The bracket may be configured for transmitting image data from the second image capture device to the image processor for processing images captured at the second image capture device or for processing images based on image data captured at both the first image sensor and the second image capture device. The processor may be programmed to generate 3D images based on image data received at both the first image sensor and the second image capture device. The processor may be programmed to combine image data from the first image sensor and the second image capture device into an alpha layer.

The processor may be programmed to combine image data from the first image sensor and the second image capture device which may be disposed at different angles of view. The processor may also be programmed to combine image data from the first image sensor and the second image capture device when the second image capture device comprises a telephoto lens to provide better resolution at a center of an image captured at the first image sensor. The processor may also be programmed to combine image data from the first image sensor and the second image capture device when the second image capture device comprises a wide angle lens to provide a surround image.

The bracket may be configured for mechanical, electrical, and signal coupling the second image capture device (SICD) to the digital camera. For example, the SICD may be powered by the main camera battery or a same external power source being utilized by the main camera. The SICD may be responsive to commands received from the main camera processor or touch slider or touch screen user inputs. The SICD may provide image data and other information that the main camera processor may use to process images captured by the main camera at the first image sensor.

The bracket may be configured for coupling with an infrared light source and/or a LED light source. The bracket may be configured as a modified hot shoe interface of the digital camera. For example, in certain embodiments a conventional mechano-electrical hot shoe interface may be modified for uni-directional or bi-directional data communication between the SICD and main camera components such as the main processor, first image sensor and user interface.

A bi-directional communications interface may be configured in certain embodiments for sending information and/or commands to the second image capture device. A bi-directional communications interface may be configured in certain embodiments for remotely controlling the second image capture device or another accessory or external device, or combinations thereof. A bi-directional communications interface may be configured in certain embodiments for receiving information and/or secondary image data from the SICD at the main camera processor.

The bracket may be configured for coupling with an RGB camera or an infrared camera as a SICD. The bracket may be configured for coupling with an infrared camera that is configured for measuring temperature while the processor may be configured to apply heat based on temperatures measured by the infrared camera as an alpha layer to images captured at the first image sensor.

The bracket may be configured for coupling with a second image capture device that is configured to capture a specific wavelength spectrum to accommodate a specific medical imaging application.

The bracket may be configured for coupling with a second image capture device that comprises a light source.

The bracket may be positioned off center to provide image data captured at the second image capture device at different angles of view in two dimensions from the images captured at the first image sensor. Alternatively, a second bracket may be provided.

The bracket may be configured for coupling with a second image capture device comprising one or more directional microphones.

The SICD can in certain embodiments generate a disparity image and use the bi-directional communications interface to send to the main processor enough information for generating a 3D image The bracket may couple with a SICD that is configured to detect far infrared light (FIR) for measuring temperature and applying the heat as an "alpha layer" to the image, e.g., in a medical or manufacturing application. The SICD can be used to capture a variety of specific wavelengths to accommodate specific medical imaging applications.

An SCID may have its own light source or may utilize one or more light sources available on the main camera.

The main camera can either save two images or combine them into an Alpha layer.

The SCID may have a different angle of view than the main camera and may include a telephoto to provide better resolution at the center or a wide angle to provide a surround image.

The SCID may be positioned off center to provide a different angle of view from the main lens.

The SCID may also include a directional microphone.

The interface between the SCID and the main camera may include a bi-directional data interface, which could be used as a communication port for sending information to the accessory from the camera. In certain embodiments, the main processor is programmed for remote controlling other external devices.

Figure 13:
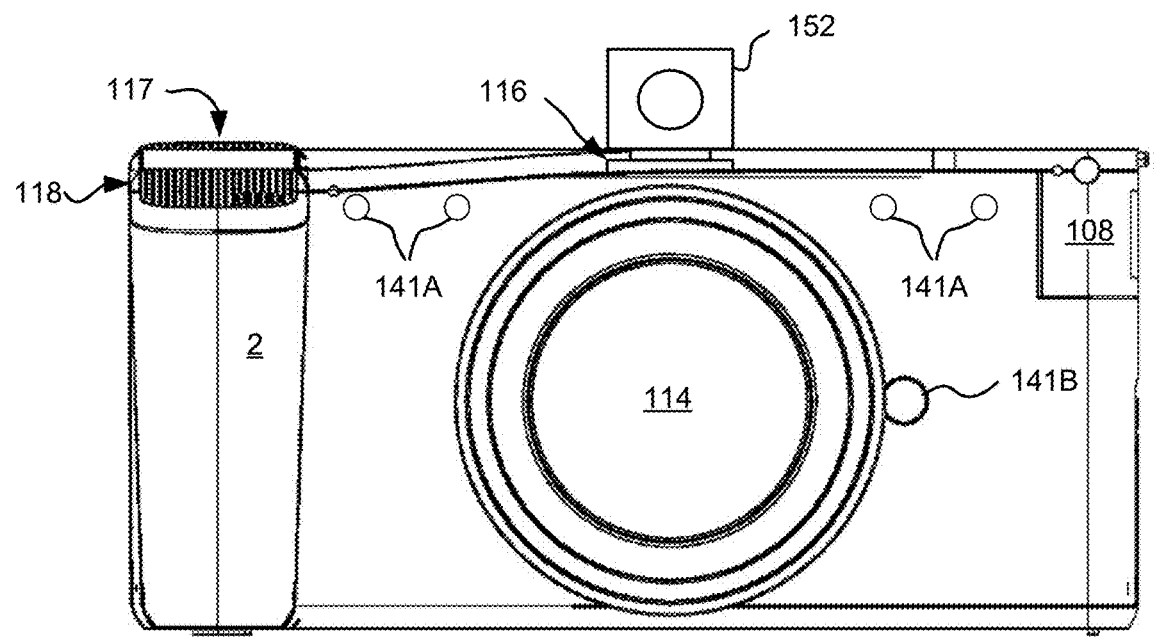
FIG. 13 schematically illustrates a front view of a digital camera that includes a secondary image capture device coupled at a hot shoe location for thermal (IR), 3D or other alternative or secondary illumination and/or imaging.
Figure 14:
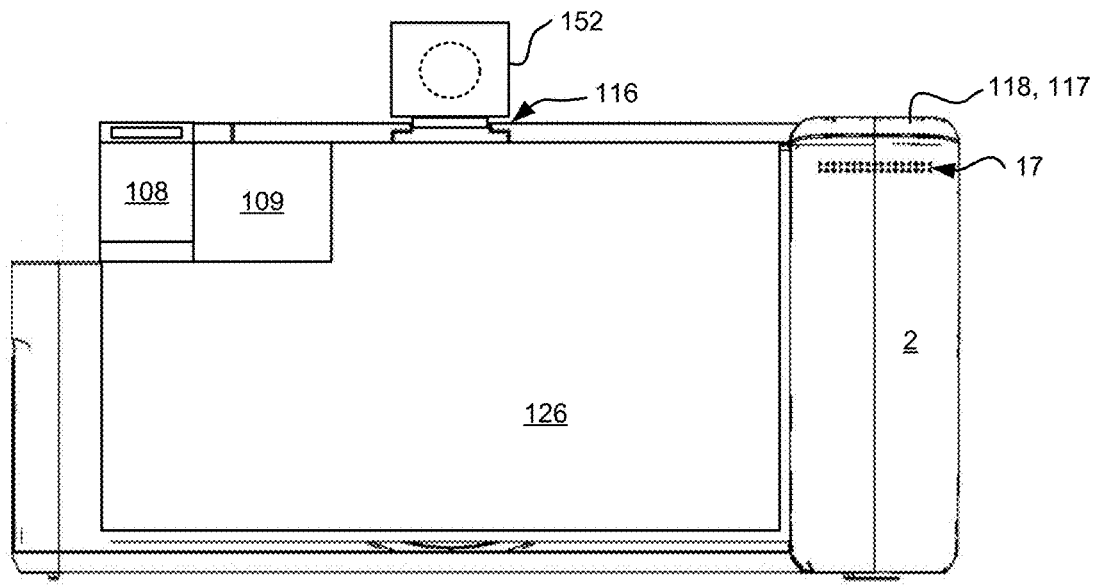
FIG. 14 schematically illustrates a back view of a digital camera that includes a secondary image capture device coupled at a hot shoe location for thermal (IR), 3D or other alternative or secondary illumination and/or imaging.

FIGS. 13 and 14 schematically illustrate front and back views of a digital camera that includes a secondary image capture device 152 coupled at a hot shoe location 116 for thermal (IR), 3D or other alternative or secondary illumination and/or imaging. The camera may also include any other component described with reference to FIGS. 1A-27B. For example, the camera illustrated schematically in the example of FIGS. 13-14 includes an ergonomic grip 2 having linear sliders 117 and 118 disposed at a top surface and a linear slider disposed at a back surface, a rotatable viewfinder 108 with a blinder 109, multiple LEDs 141A, one or more microphones 141B and a display screen 126.

Audio

FIG. 15A schematically illustrates a top view of a digital camera that includes multiple microphones 160 for audio recording in accordance with certain embodiments. Eight microphones are shown in the example of FIG. 15A, including four microphones 160 spread across the front of the camera and four microphones 160 spread across the back surface of the camera. In certain embodiments, one or more additional front facing microphones are disposed near the bottom of the front face of the camera, along with the multiple microphones 160 that are shown in FIG. 15A spaced apart near the top of the front face of the camera, so that the audio system is capable of providing right-left stereo sound recording notwithstanding the orientation of the camera at the time of the recording nor whether the orientation changes during the recording.

FIG. 15B schematically illustrates a cross sectional top view of a corner of a digital camera that includes a pair of microphones in accordance with certain embodiments. The two microphones 160 are coupled on opposite sides of a pc board 162 that is disposed within the camera housing 164. Each microphone 160 is protected by foam 166 and goretex 168 disposed between the microphone 160 and a grill 168.

Figure 15C:
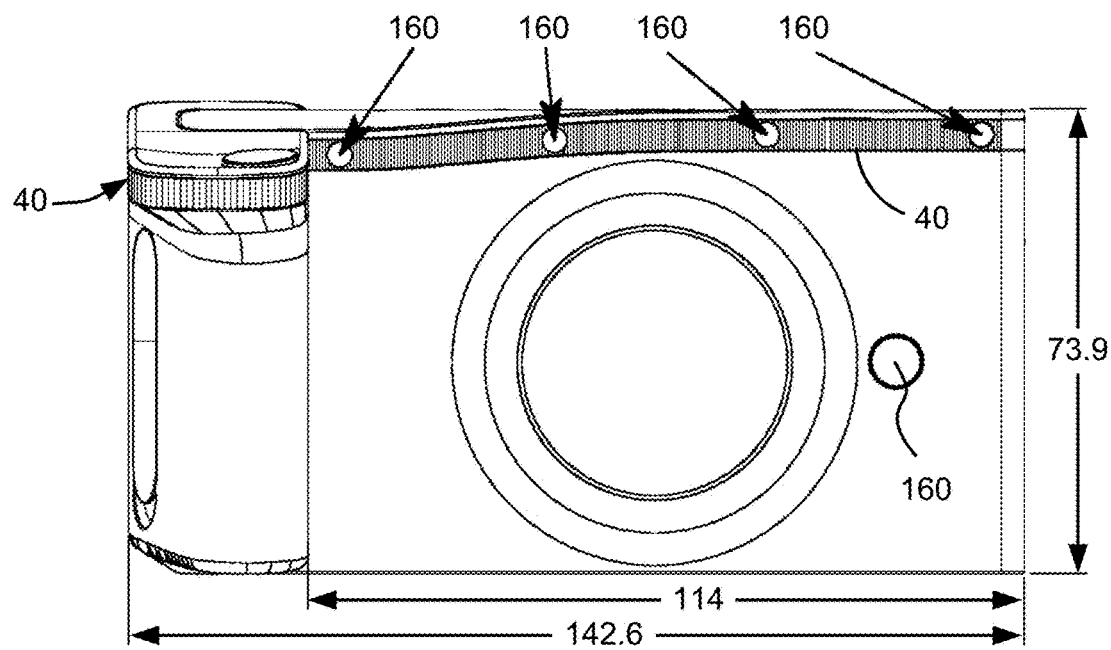
FIG. 15C schematically illustrates a front view of a digital camera that includes multiple microphones in accordance with certain embodiments.

FIG. 15C schematically illustrates a front view of a digital camera that includes multiple microphones 160 in accordance with certain embodiments. Four microphones 160 are disposed in a line across a front of the camera above the lens near the top in the example of FIG. 15C, while a fifth microphone 160 is spaced from the line of four microphones in the vertical direction. The fifth microphone 160 is disposed at four different angles to the four microphones 160 that form the line, such that stereo audio may be provided at four different orientations of the camera. The camera may be dynamically programmed to sense the orientation, e.g., using an accelerometer and/or display analysis, and to select a pair of microphones 160 that may be used to provide the best stereo recording depending on the camera orientation. The four microphones 160 disposed in line are at a same location as the Fresnel lens 40 in the example of FIG. 15C. The Fresnel lens 40 may include cutout areas for permitting the microphones 160 to receive sounds without being directly overlapped by the Fresnel lens 40. A grill 168 such as in the example illustrated in FIG. 15B that is configured for use with a microphone 160 may be disposed at the location of the cutout area of the Fresnel lens 40, or the Fresnel lens 40 may be replaced by grill 168 entirely. One or more LEDs 141A or LED clusters 143, 145 may however be disposed behind the Fresnel lens 40 at one or more locations not occupied by microphones 160.

Figure 15D:
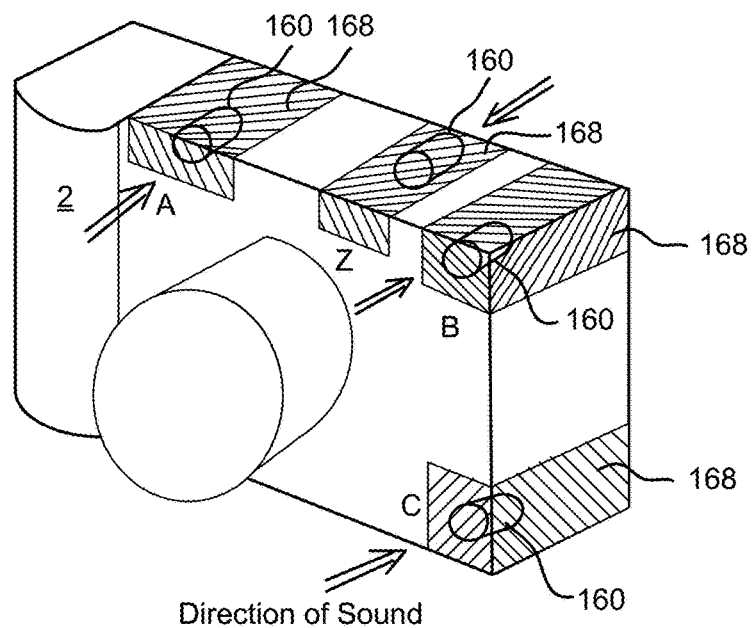
FIG. 15D schematically illustrates a perspective view of a digital camera that includes multiple microphones in accordance certain embodiments.

FIG. 15D schematically illustrates a perspective view of a digital camera that includes multiple microphones 160 in accordance certain embodiments. The example of FIG. 15D includes three microphones 160 that are directed for receiving sounds from the front of the camera and one microphone that is directed for receiving sounds from the rear of the camera. One of the front-facing microphones 160 is located near the grip 2 and near the top of the camera, and may be otherwise disposed within the grip and/or nearer the bottom of the camera.

Another front-facing microphone 160 is disposed at the top-right of the front surface of the camera in the example of FIG. 15D. This microphone 160 may be disposed within a viewfinder 108 such as in the example of FIG. 3 or 7-9, such that the microphone would face front when the viewfinder 108 is stowed and would face to the side when the viewfinder 108 is in use. Alternatively, the microphone 160 may be disposed below and/or to the left of the viewfinder 108 such as to face front notwithstanding the configuration of the viewfinder 108.

A third front-facing microphone 160 is disposed at the bottom-right of the front surface of the camera. The rear-facing microphone 160 is disposed between two front facing microphones 160 near the top of the camera in the example of FIG. 15D. This rear-facing microphone 160 may be located below and/or to the side of a hot shoe bracket 116 as in the example of FIGS. 13-14.

Various embodiments of digital cameras are provided that include multiple microphones aligned with the optical assembly to record sound during image capture. In certain embodiments, the camera includes at least three positioned microphones to generate the horizontal disparity in both portrait and landscape mode. Each pair of spaced microphones is disposed to capture stereo sound and signal processing may be used to further separate the right and left channels by subtracting left information from the right channel and vice versa. Referring to FIG. 15D, for landscape mode, microphones A and B can be used. For portrait mode, microphones B and C may be used. In the event that sound is being recorded with the camera rotated 45° then microphones A and C may be used. Rotating the camera from landscape to portrait may be monitored by an accelerometer. In certain embodiments, the microphone pair being used during a sound recording may be changed one or more times as changes in camera orientation are determined by the accelerometer.

In certain embodiments, the camera may include three front-facing unidirectional microphones, or the A, B and C mics in FIG. 15D, in order to provide a stereo image with low background noise. Unlike omnidirectional microphones, unidirectional microphones do not pick up sound well in their rear direction.

A rear facing directional microphone is also included in certain embodiments, e.g., as illustrated schematically at FIG. 15D. The rear facing mic, or the "Z" mic, may be used to pick up the voice of the camera user or other sound coming from the rear of the camera. The Z microphone can be omnidirectional, or unidirectional or bidirectional. The level of user pickup can be altered in certain embodiments by changing the sensitivity of this rear facing microphone. In certain embodiments, the polarity of microphone Z may be selectively altered from positive to negative to further cancel the sound from the camera user during those times when the camera user does not want their voice recorded. Alternately the sound from the user's voice may simply be subtracted from the other microphones using an algorithm.

A camera in accordance with certain embodiments may include a lens motor and a noise reduction algorithm to reduce the lens motor noise picked up by the microphones. The noise reduction algorithm may be based both on noise cancellation and application of a lens profile as a base filter for a noise removal pattern. The noise removal pattern may be prerecorded for each lens or alternatively loaded form a given database. The profile may be recorded multiple times based on the different lens positioning (focal and focus). The noise reduction algorithm and/or microphone configuration may be configured to reduce or cancel lens motor noise or camera shutter noise or camera handling noise or background voices, wind, street or other environmental noise not intended to be included in captured video, or combinations thereof.

A camera in accordance with certain embodiments may include a lens that can be adjusted from wide angle to narrow angle. In these embodiments, an audio pickup angle may be adjusted in accordance with the image capture angle. As the lens angle changes, the camera is programmed in certain embodiments to adjust a stereo microphone processing application in accordance with the tracked changes in lens viewing angle. Information from the lens may be used to drive beam forming parameters for the microphones in these embodiments.

There are two different basic microphone technologies that are applicable for camera usage. Electrets microphones utilize an older technology developed nearly fifty years ago. MEMS microphones utilize more recent IC technology, becoming popular around 10-years ago. A digital camera in accordance with certain embodiments may include one or more microphones that are configured in accordance with each of these two technologies.

Electret Condenser Microphone (ECM)

Electret microphones differ in many respects from MEMS microphones. An electret microphone may include an insulator that carries a permanent charge. The insulator in electret microphones may be a fluoropolymer or Teflon. Electret microphones may include capacitance or condenser microphones, such that a conductive diaphragm moves with respect to a fixed conductive plate, one of which is the electret. The electret carries an equivalent voltage that biases the diaphragm towards the fixed plate, called a backplate. Sound impinging upon the diaphragm causes the diaphragm to move which in turn causes a change in capacitance, which produces a voltage swing. The impedance of the electret microphone may be high, on the order of a few pf, so a FET may be generally used to convert the high impedance electrical output to a more manageable impedance of around 3-5 kohms. A built-in preamplifier with high voltage output and low output impedance may be included. An output for the electret microphone may be 5-10 mV for 94 dBSPL input, and the built in preamp may raise the output to around 50 mV.

Charging or Poling an Electret

The electret may be charged or polarized. Starting with a clean Teflon film, a net negative charge may be injected into the film using one of several methods. One method may include placing the film in a vacuum chamber and using an electron gun, such as those found in TV picture tube, to shoot electrons into the film in a manner that causes the electrons to evenly penetrate the film, but not so much as to destroy the film. Another method is to place the film between two metal plates and place the assembly into an oven at a temperature enough to soften the film, but not enough to melt it. A voltage potential may be placed across the metal plates, and the assembly may be removed from the oven and allowed to cool, trapping charged particles inside the film. A third method is to use corona charging by placing the film on a ground plane under a high voltage discharge point. The film may then be moved with respect to the discharge point, resulting in an even charge density.

The electret microphone capsules may have a diameter of 3 mm, 4 mm, 6 mm or 10 mm or another selected diameter. The microphone capsule depth can be selected depending upon construction and polar pattern. The 10 mm microphones have lower self-noise than the 4 mm models, while the 3, 4 and 6 mm models conserve space and weight and are used in embodiments of smaller overall camera size than embodiments that utilize the 10 mm microphones.

Electret microphone elements can be directional, e.g., unidirectional and bi-directional. Electret microphones may be 3 mm diameter.

Silicon (MEMS) Microphones

Silicon microphones are a condenser microphones that use a bias voltage, unlike electret microphones. Silicon mic elements may be etched from a single silicon wafer, then assembled with a preamp and power supply, usually into a metal case. As the diaphragm of a silicon mic is very light, there is very low sensitivity to vibration. Because of this construction, silicon mics are omnidirectional and tend to have slightly higher self-noise than the electret mics.

Solder reflow allows for direct PCB mounting of MEMS mics as in the example of FIG. 15B. The MEMS mics are consistent with variations of +/−1 dB. Electrets are consistent with variations of +/−3 dB. MEMS mics may be combined into multiple mic beam forming applications.

Polar Responses of Microphones (Directional Characteristics)

Three polar patterns for electret microphone capsules include omni-directional, uni-directional and bi-directional. MEMS mics are omni-directional. The uni and bi electret mics are sometimes referred to as "noise canceling" as they do reduce the pickup of background noise. An omnidirectional mic picks up sound globally, equally. A unidirectional mic picks up sound mainly from the front hemisphere and a bidirectional picks up sound from the front and rear but rejects sound pickup from the side. An omni mic is not position critical. A uni mic should be aimed at the talker's mouth such that there should be some room or "air" around a uni. The bi-directional, sometimes referred to as a close talking microphone, does a better job than the uni when it comes to reducing the effect of intense background noise, but it is very position sensitive. The frequency response and output of the uni and bi microphone types is dependent upon the distance from the microphone to the user; there is a reduction in low frequency output when compared with the high frequencies as the microphone distance from the sound source increases. The omni frequency response is not dependent upon the distance from the user, only the output is. The cost of an omni is the lowest and the susceptibility to mechanical vibration and wind noise is the least. All microphones can have their sensitivity to wind noise reduced by enclosing them in a ball of foam or fake fur.

Uni and bi microphone capsules usually require a more sophisticated mounting than an omni, and the uni and bi mounting can take up more space or volume than the mounting of an omni capsule. Mobile phones, headsets and better quality speakerphones usually have the microphone mounted in a rubber boot in order to reduce the coupling, sometimes called "terminal coupling loss" between the receiver and the microphone. A boot for a uni or bi capsule includes openings for the front and rear of the microphone capsule, and as a consequence the boot is larger than the boot for an omni capsule.

Wind Noise

Uni-directional and bi-directional electret microphones are more sensitive to wind noise, street noise, crowd noise or other environmental noise than omni microphones, while MEMS microphones are less sensitive to wind, etc. A multiple microphone plus DSP may be used for reduced wind noise. In order to reduce wind noise, acoustical damping material may be placed in the front of the microphone. Such damping materials may be woven or felted materials such as silk, felted wool, foam, woven metallic materials such as those used for hearing aid applications, and sintered materials. A high pass filter will help reduce wind and other noise, such as 6 dB/octave at 300 Hz or 24 dB/Octave at 100 Hz. The filter may be disposed immediately after the microphone output, before any amplification stages.

Stereo Microphones and Stereo Recording

Recording in stereo may involve two or more microphones spaced apart, and mixed down to two channels. The microphone spacing may create a time delay between the microphones, resulting in a "comb filter" effect causing peaks and valleys in the frequency response. A coincident microphone recording technique may use two bi-directional microphone capsules placed at 90 degrees to each other, and contained within the same small case. Two cardioid microphones may be spaced apart. A single cardioid element may be used that faces the front, and a bi-directional element may face the side. This is called M-S, or "mid-side". The directionality can be controlled electrically, without having to move the microphone. Two cardioid elements may be disposed at an angle of 110 degrees. Ambisonic microphones featuring multiple elements may be used for surround sound usage.

Microphone Placement

There are several options for microphone placement:
M-S (mid-side) is an effective stereo mic placement that adds depth to a recording and can be done using coincident mic. The combinations can be omni/bi with the bi at 90-270-degrees, uni/bi with the uni facing forward and the bi at 90/270-degrees, and dual bi with one mic at 0/180-degrees and the other at 90/270 degrees.
X-Y also uses dual microphones. The combinations are dual uni with included angles from 90-degrees to 180 degrees with the mics very close together such that they are nearly touching, and dual bi with one mic at 45/225-degrees and the other mic at 135/315-degrees.
Spaced Apart (right and left) microphones can be omni, uni or bi depending upon a number of factors which include distance, closeness of unwanted sounds, degree of directionality v. depth, and absorbent panels between the mics. Mics may be spaced about 3-inches apart. Three uni elecrets may be used to capture sound from the front of the camera as illustrated at FIG. 15D.

Tilt-Out Display

Figure 16A:
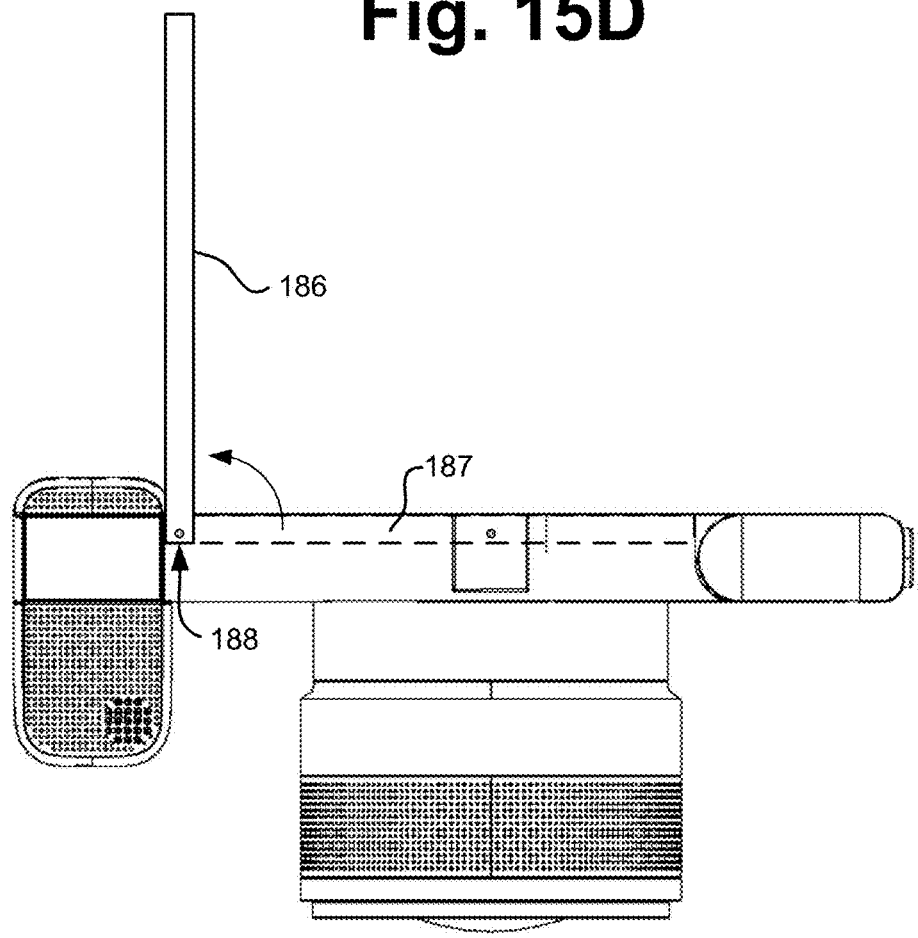
FIG. 16A schematically illustrates a top view of a digital camera with a 90° rotatable tilt-out display screen in accordance with certain embodiments.

FIG. 16A schematically illustrates a top view of a digital camera with a 90° rotatable tilt-out display screen 186 in accordance with certain embodiments. The display screen 186 may be held in a recess 187 as a rear display or rotated as shown in FIG. 16A for viewing at an acute or right angle to the back of the camera. A hinge coupling 188 between one edge of the display screen 186 and the camera housing at one side of the recess 187 permits the rotation, while maintaining signal coupling with the camera. Signal coupling may be maintained wirelessly between the camera and the display screen 186, such that the display screen 186 may detach entirely from the camera while images may continue to be viewed as captured by the camera. The hinge coupling 188 may be mechanical in certain embodiments, while magnetic hinge couplings may be provided for rotation of the display screen 186 about a selected edge and/or detachment from the camera along any or all edges of the display screen 186.

FIG. 16B schematically illustrates a top view of a digital camera with a 180° rotatable tilt-out display screen 196 in accordance with certain embodiments. The camera grip 192 in the example of FIG. 16B may include a recess 193 within which the display screen 196 may be disposed when rotated out fully 180°. The recess 193 in the grip 192 may be formed by removing a detachable rear grip portion that may be replaced for ergonomic handling of the camera during image capture. The detachable rear grip portion may itself rotate out of the way utilizing a hinge coupling or for a hollow grip 192 or hollow rear grip portion, the grip wall may fold out of the way like an accordion blind or slide into the front of the grip 192 like a sliding door. The display screen 196 may include front and back displays coupled together for viewing from the front or back of the camera whether the display screen 196 is rotated out 180° or is secured within the recess 197.

A second display may be disposed beneath the first display such that rotation of the first display by 180° doubles the width and area of the usable display screen. More than two display sections may be rotatable and collapsible in this manner, and external display sections may be attachable to the camera display screen to increase the usable display area.

FIG. 16C schematically illustrates a top view of another digital camera with a 180° rotatable tilt-out display screen 206. The screen is coupled to the camera housing at one end of the recess 207 by a biaxial hinge coupling 208 in accordance with certain embodiments. In this embodiment, the rotation by 180° is accompanied by a translation distance sufficient to permit the display screen 206 to rotate out fully 180° even though a rear portion of the grip 202 extends behind the plane of the display 206 when coupled within the recess 207 defined at the back of the camera. The biaxial hinge coupling 208 includes a first hinge 211 coupled both to the camera and a spacing extension 212. A second hinge 213 is coupled to the spacing extension 212 and the display screen 206 such that the display screen 206 may be translated outward from the camera housing by a length of the spacing extension 212.

Figure 16D:
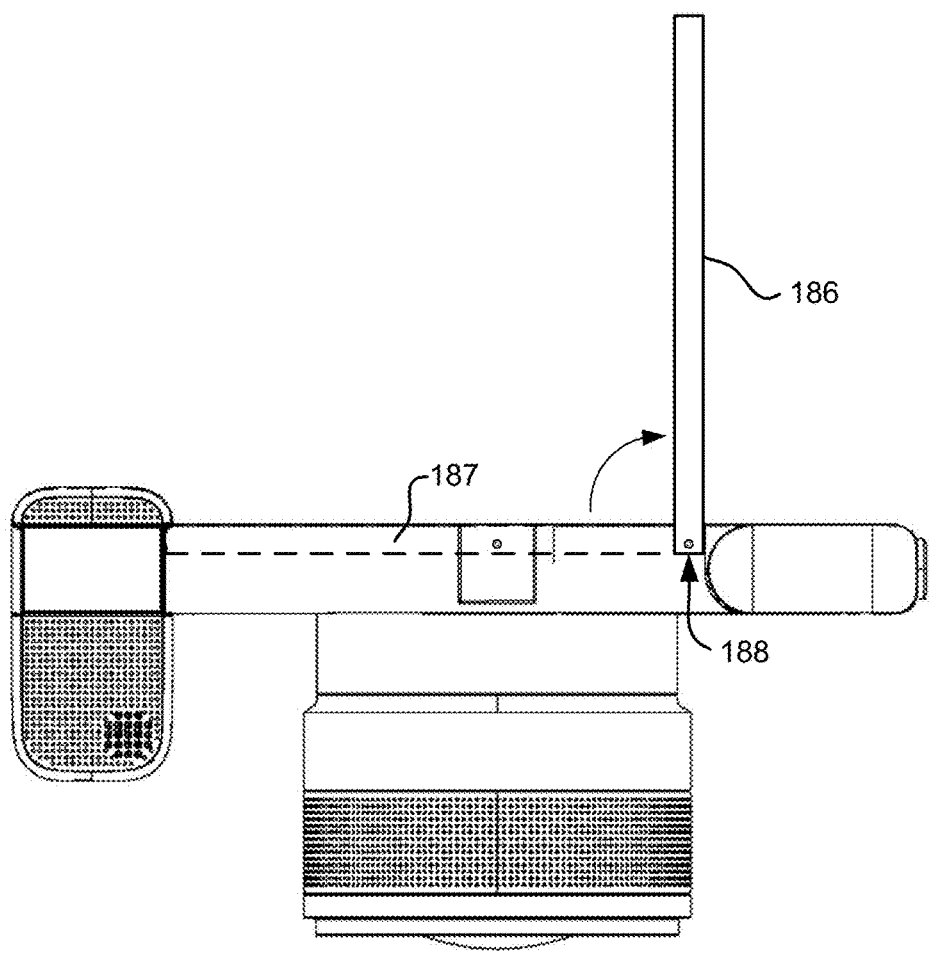
FIG. 16D schematically illustrates a top view of another digital camera with a 90° rotatable tilt-out display screen in accordance with certain embodiments.

FIG. 16D illustrates a tilt out display 186 that rotates out of recess 187 about axis coupling 188 by 90 degrees. The tilt out display of FIG. 16D rotates away from the grip side of the camera. The tilt out display 186 may rotate out to 180 degrees in embodiments that include a biaxial axis coupling 188 with a displacement spacer, e.g., such as that described in the example of FIG. 16C.

Figure 16E:
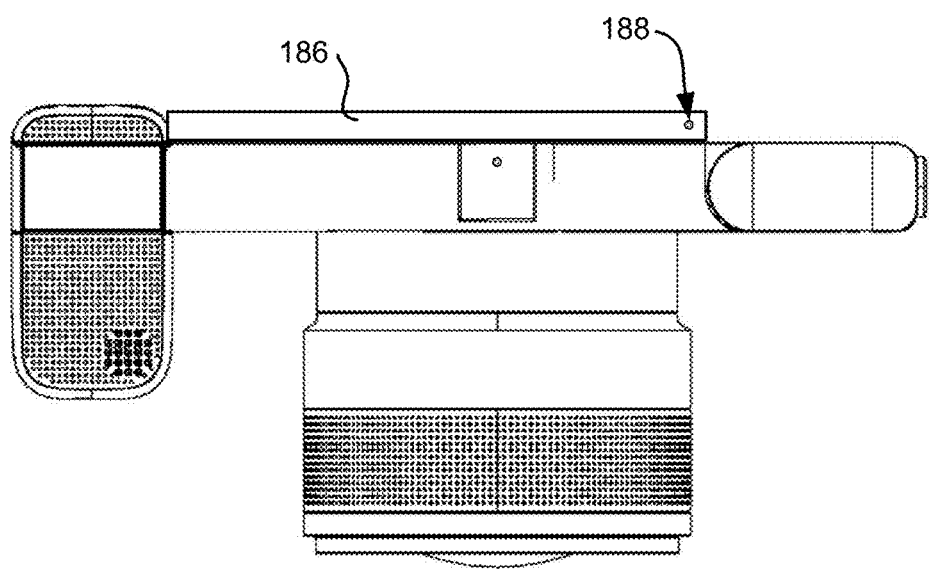
FIG. 16E schematically illustrates a top view of another digital camera with a 180° rotatable tilt-out display screen in accordance with certain embodiments.
Figure 16F:
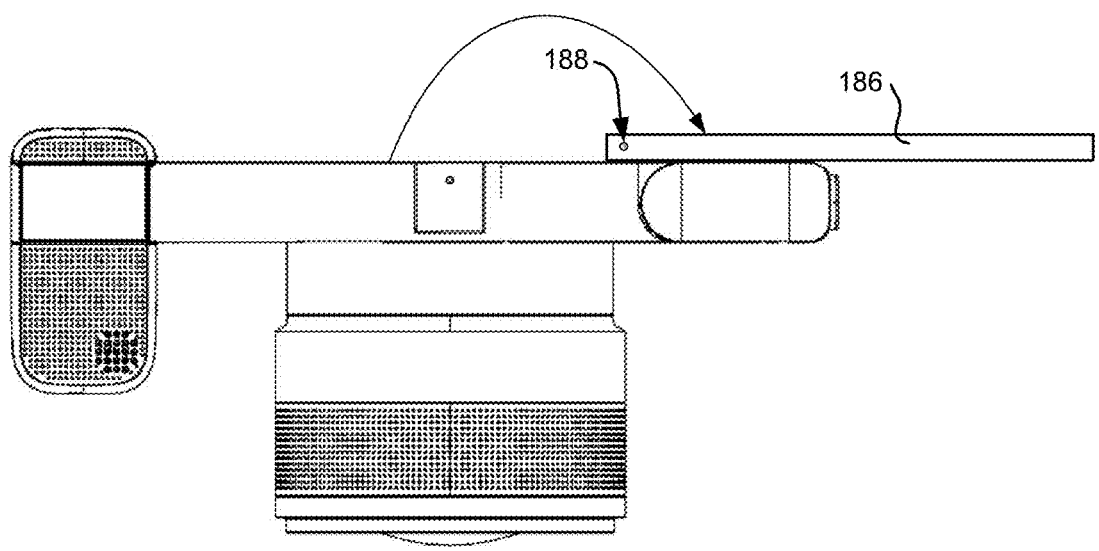
FIG. 16F schematically illustrates another embodiment.

FIGS. 16E-16F illustrate a tilt out display that 186 that rotates away from the back surface of the camera about axis coupling 188 that is disposed to permit 180 degree rotation of the tilt out display screen 186 about a uni-axial hinge coupling 188. A semi-cylindrical cavity (not shown) may be defined to permit a short end of the tilt out display screen 186 to rotate through the rear surface of the camera.

Transparent Grip

Figure 17A:
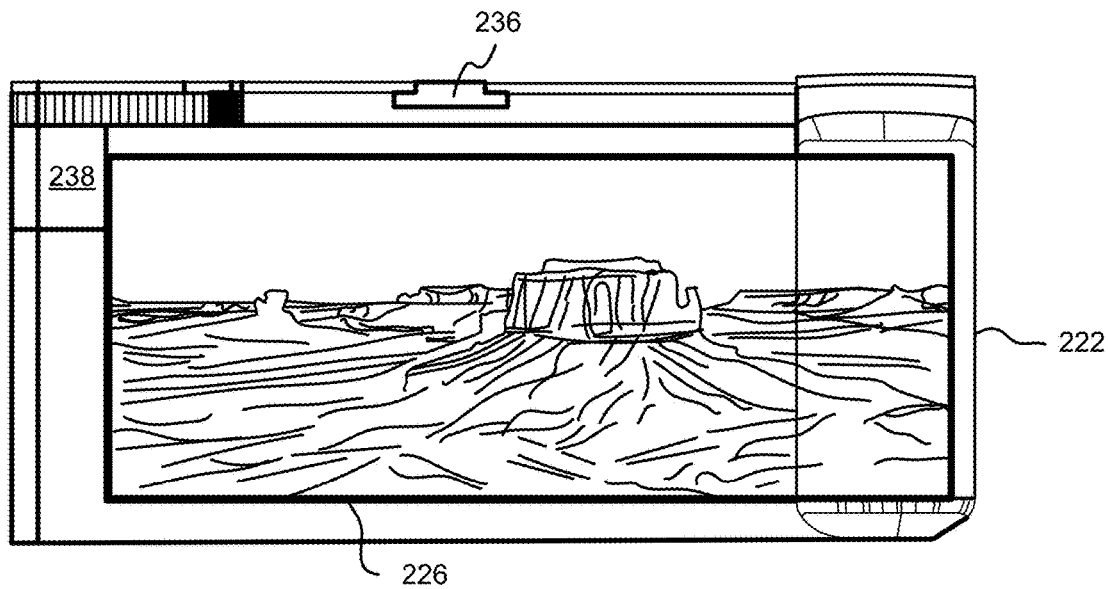
FIGS. 17A-17B schematically illustrate a back perspective view of a digital camera that includes a hot shoe interface for coupling a secondary image capture device, an electronic viewfinder (EVF) and/or an EVF flash accessory, a thermal illumination and/or IR imaging component or an additional flash or other digital camera accessory, and a grip portion that includes a flash, a strap door and a transparent back surface for horizontally extending the camera display screen to overlap the grip portion, in accordance with certain embodiments.
Figure 17B:
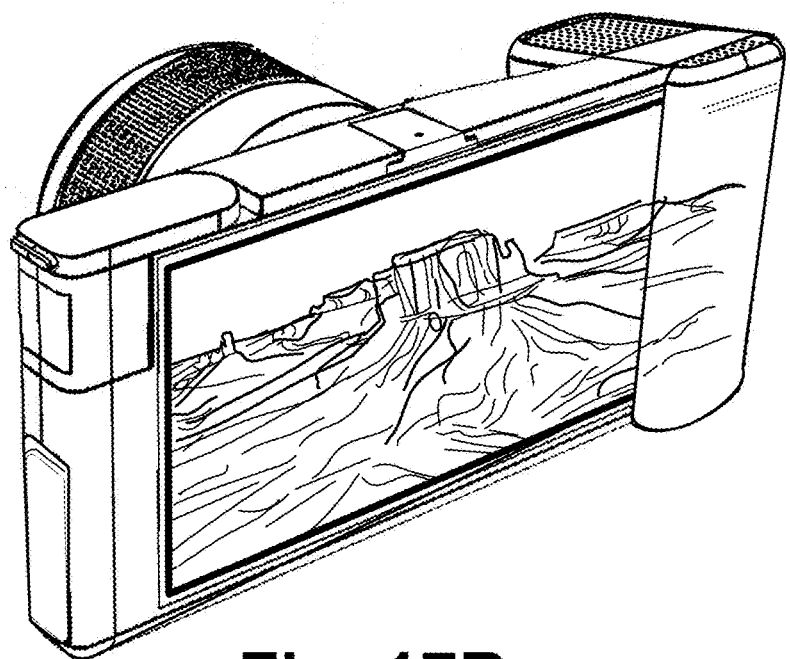

FIGS. 17A-17B schematically illustrates a back view of a digital camera that has a transparent grip 222 and a wide display screen 226 compared with embodiments that include a display screen that has a right edge to the left of an opaque grip in a back view. The display screen 226 in the embodiment of FIG. 17A extends into the grip 222 or under a rear volume or rear wall of the grip 222. The transparent grip 222 may include at least a rear grip portion that is formed from a transparent polymeric material or glass.

An advantageous transparency of the grip 222 may be alternatively provided with a hollow rear grip portion and an accordion blind-type rear grip wall that can be folded open to view the rightmost portion of the display screen 226 or closed to provide an ergonomic grip for capturing images. The rear grip wall may alternatively slide into the front of the grip 222 in certain embodiments.

Alternatively, the grip 222 or rear portion of the grip 222 may have a hinge or slide coupling for rotating or sliding a rear volume of the grip 222 or rear wall of a hollow grip 222 or hollow rear grip portion out of the way for viewing wide screen images or otherwise using the rightmost portion of the display screen 226 that would otherwise be blocked by an opaque grip. The grip 222 or rear volume of the grip 222 may be otherwise entirely detachable, e.g., when the digital camera is to be used as viewer, phone, computer or other mobile device purpose other than capturing images.

The grip portion may be hollow from the screen to the rear wall to define a compartment for storing a camera strap. A pop-up flash may recess into the hollow volume of the grip when not in use.

The digital camera of FIG. 17A also includes a hot shoe interface 236 for coupling a secondary image capture device, flash, a thermal illumination and/or IR imaging camera, a medical imaging camera, an ultrasound imaging device, or another medical tool that may provide medical information when the tool is positioned to contact the skin or otherwise to measure a medically significant quantity, or an additional flash or other digital camera accessory.

An electronic viewfinder 238 is shown in stowed position in FIG. 17A and is configured to be rotatable to an active position overlapping, in this example, a top-left corner of the camera display screen 226. The electronic viewfinder 238 may include an EVF flash accessory in the front (not shown in FIG. 17A) that is configured to provide a flash capability to the camera when the viewfinder 238 is in the stowed position. A touch slider may be provided on top of the grip 222 or as a display object on a touch screen display 226 or on or near the viewfinder 238.

Image Capture and Processing Interface

FIGS. 18-27B schematically illustrate digital cameras that are programmed to capture images that have desired quality characteristics. Precapture settings may be adjusted automatically by the camera based on information gathered from preview images or user input or programming or combinations thereof. Captured images may also be edited or combined to form new or processed images, and sequences of images may be captured as video or to enhance still image quality. An advantageous user interface, image processor and program code embedded on storage media within the digital camera housing facilitate the capture and processing of quality images and video, as well as the display, storage and transmission of those quality images and video. Examples are provided and schematically illustrated in FIGS. 18-27B which images of various objects and user interface tools that may be provided on a rear display screen of a digital camera that is configured in accordance with certain embodiments to receive user input by manipulation of one or more touch sliders, e.g., as illustrated at FIGS. 1B-1C as elements 17, 117, and/or 118 and/or by manipulating a touch screen display.

Figure 18:
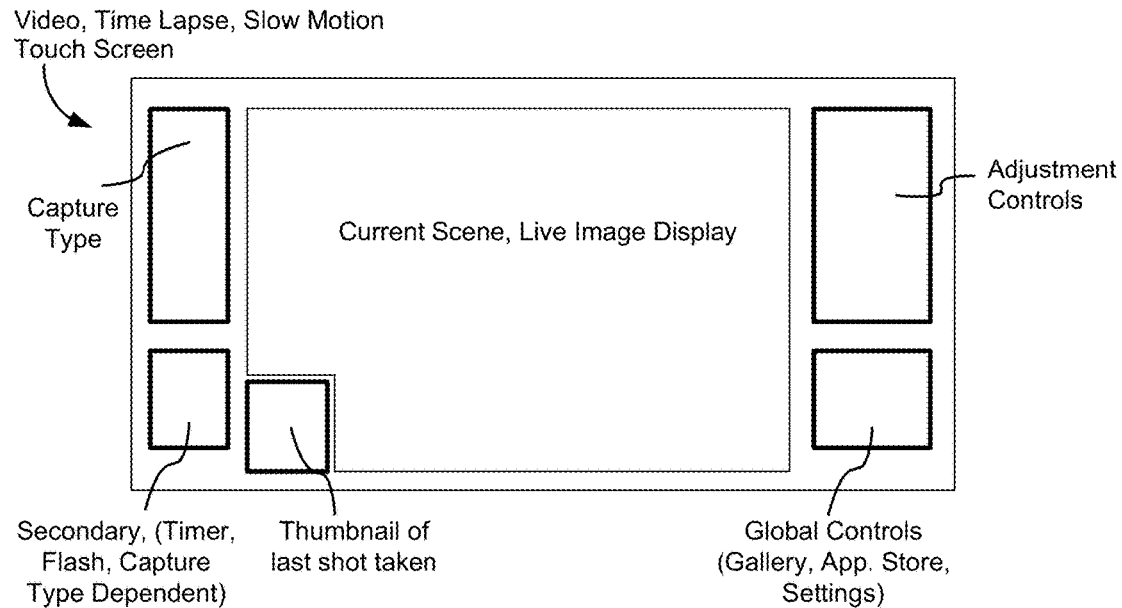
FIG. 18 schematically illustrates a back view of a digital camera that includes a display screen and various buttons for image capture and/or editing control, including buttons for capture type control (e.g., video, time lapse, slow motion), secondary controls such as timer and flash, adjustment controls, global controls such as gallery, app store and settings, and a thumbnail of a previous image capture in accordance with certain embodiments.

FIG. 18 schematically illustrates a back view of a digital camera that includes a display screen and various buttons for image capture and/or editing control, including buttons for capture type control (e.g., video, time lapse, slow motion, panorama, 3D, cinemagraph, 3D audio, moment), secondary controls such as timer and flash, adjustment controls, global controls such as gallery, app store and settings, and a thumbnail of a previous image capture in accordance with certain embodiments.

Figure 19:
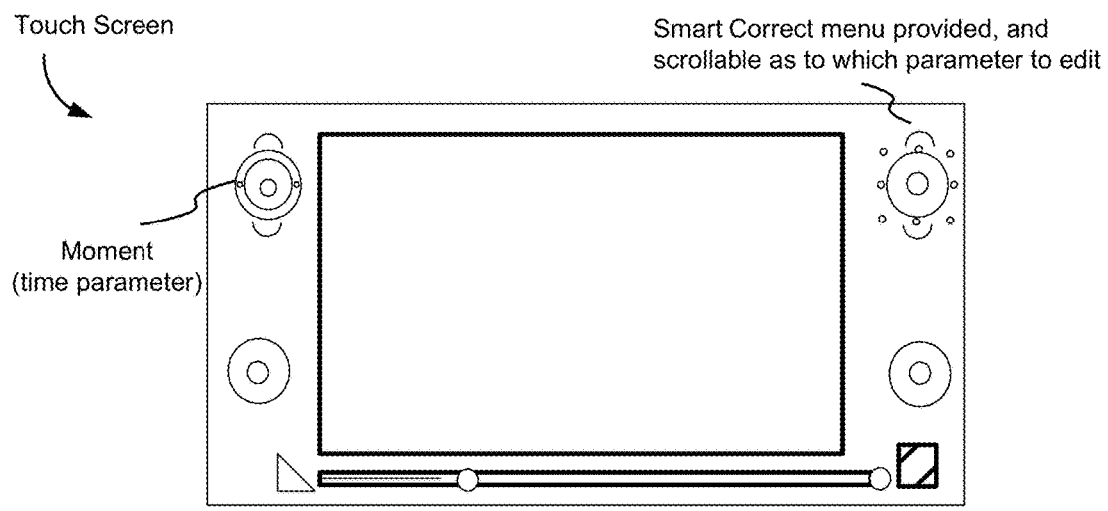
FIG. 19 schematically illustrates a back view of a digital camera that includes a display screen and various buttons for image capture and/or editing control, including buttons for adjusting a time parameter and/or scrolling through a sequence of images, for selecting and editing various parameters using smart menus and a linear slider for adjusting, scrolling or showing a current time parameter disposed between a start time and an end time for the sequence of images, in accordance with certain embodiments.

FIG. 19 schematically illustrates a back view of a digital camera that includes a display screen and various buttons for image capture and/or editing control, including buttons for adjusting a time parameter and/or scrolling through a sequence of images, for selecting and editing various parameters using smart menus and a touch slider or linear slider for selecting an image parameter for adjustment and then adjusting the image parameter, and/or for scrolling or showing a current time parameter disposed between a start time and an end time for the sequence of images. In certain embodiments the slider object changes between parameter selecting and adjusting modes, while in other embodiments, two different slider objects appear on the display in accordance with certain embodiments.

Figure 20:
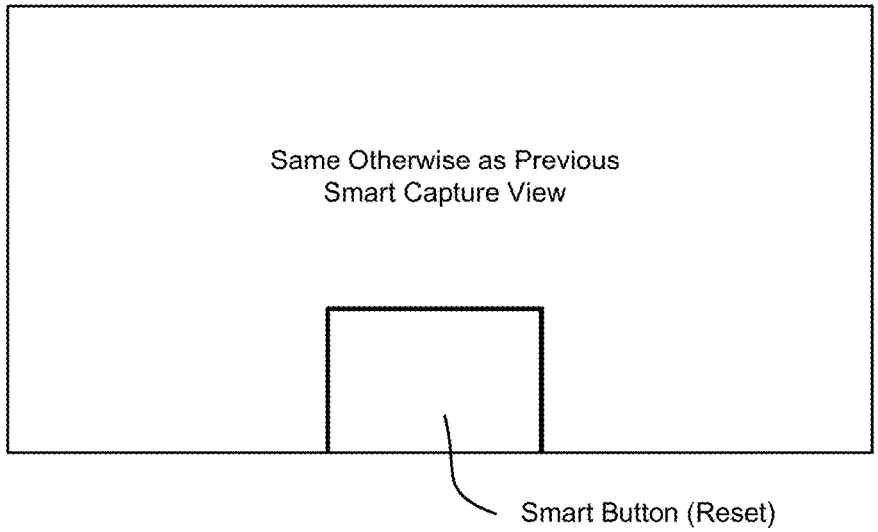
FIG. 20 schematically illustrates a back view of a digital camera that includes a display screen and a smart reset button.

FIG. 20 schematically illustrates a back view of a digital camera that includes a display screen and a smart reset button.

Figure 21:
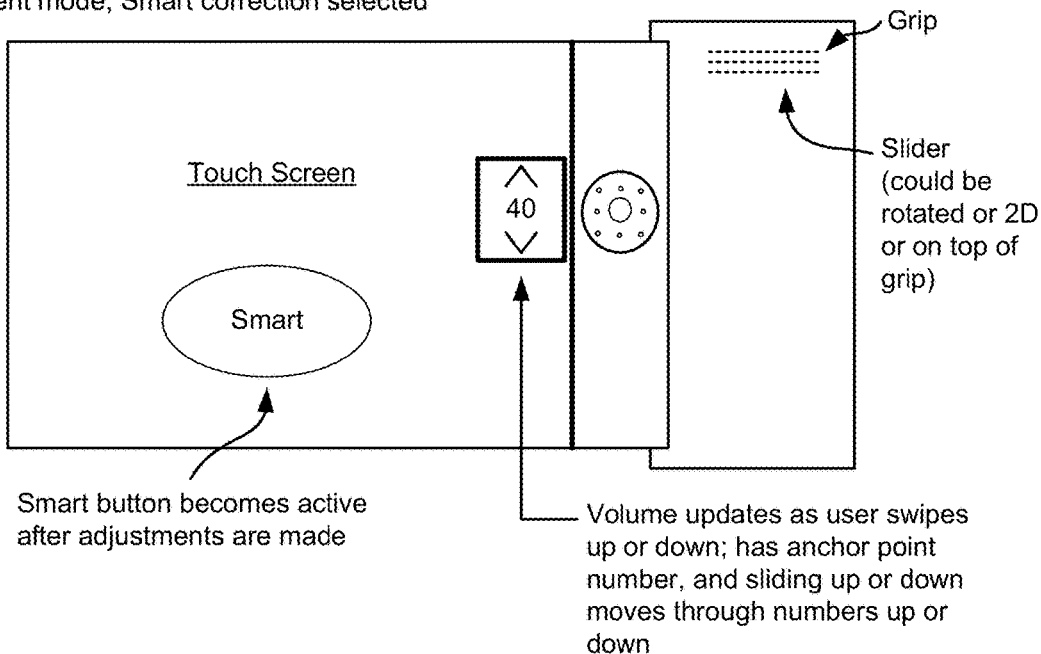
FIG. 21 schematically illustrates a back view of a digital camera that includes a display screen such as a touch screen, a smart button, a value indicator, smart correction and/or scrolling button, and a linear slider for adjusting parameters such as exposure, contrast, fill-flash, face priority and various other image capture and/or editing parameters, in accordance with certain embodiments.

FIG. 21 schematically illustrates a back view of a digital camera that includes a display screen such as a touch screen, a smart button, a value indicator, smart correction and/or scrolling button, and a linear slider or touch slider for adjusting parameters such as exposure, contrast, fill-flash, face priority, brightness, focus, and various other image capture and/or editing parameters, in accordance with certain embodiments. The camera is programmed to provide image quality alerts as a smart capture feature. In certain embodiments, the camera will notify a user that a specific parameter is poor, e.g., the captured image may be too dark or too blurry. One or more thumbnails of recent images or shots captured may have frames of different colors based on image quality, e.g., red for poor, yellow for so-so, and green for good.

Figure 22:
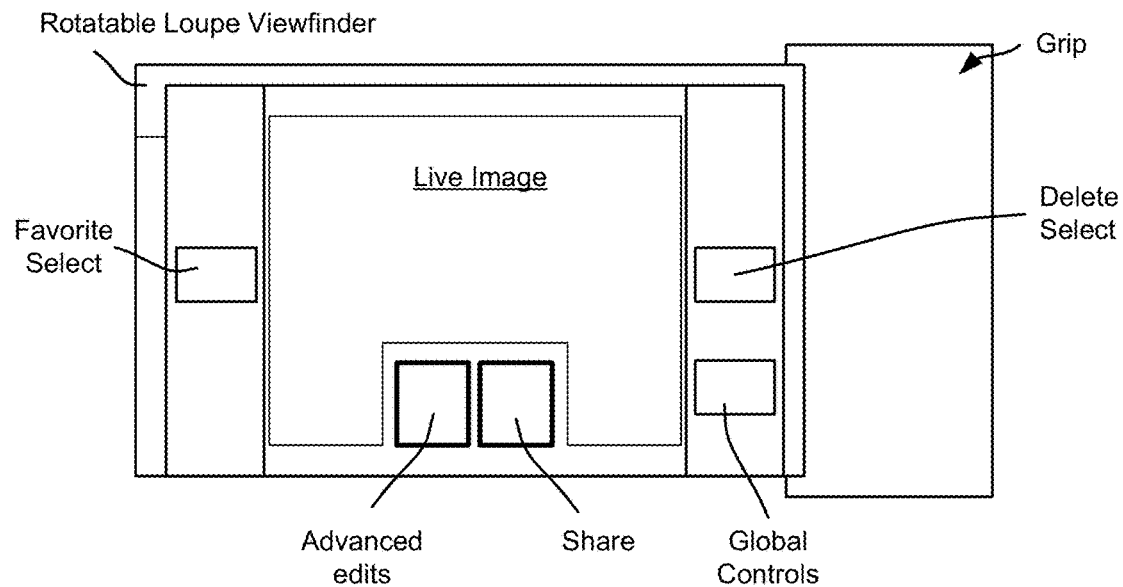
FIG. 22 schematically illustrates a back view of a digital camera that includes a display screen showing a live image, a favorite select button, a delete select button, a global control button, and advanced edits and share buttons, in accordance with certain embodiments.

FIG. 22 schematically illustrates a back view of a digital camera that includes a display screen showing a live image, a favorite select button, a delete select button, a global control button, and advanced edits and share buttons, in accordance with certain embodiments.

Figure 23:
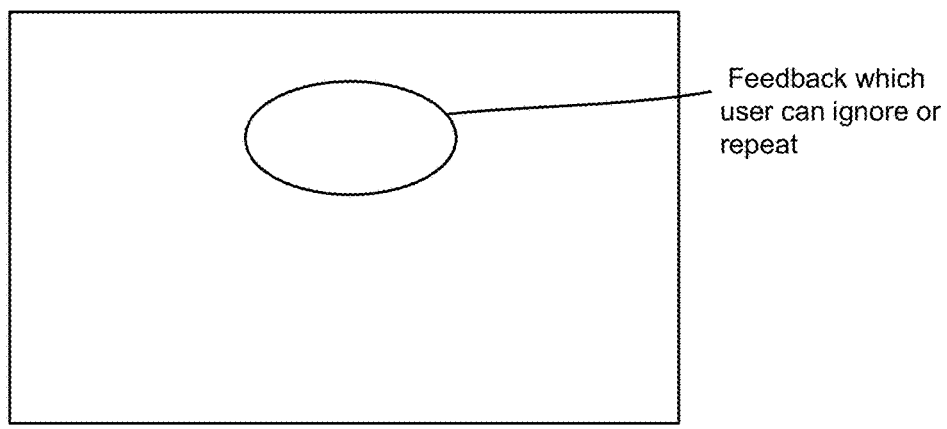
FIG. 23 schematically illustrates a back view of a digital camera that includes a display screen showing a feedback bubble that a user can accept, reject or ignore in accordance with certain embodiments.

FIG. 23 schematically illustrates a back view of a digital camera that includes a display screen showing a feedback bubble that a user can accept, reject or ignore in accordance with certain embodiments.

Figure 24:
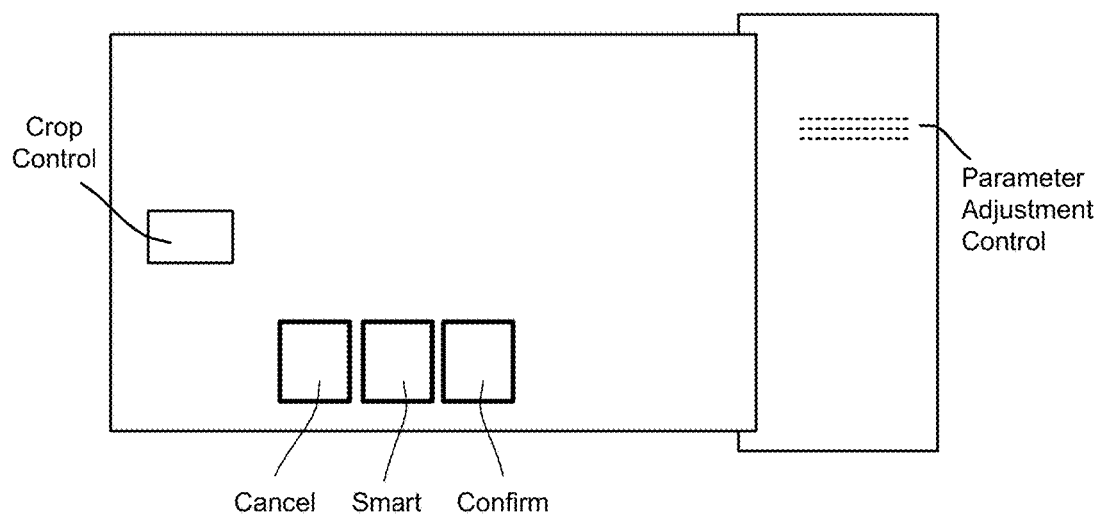
FIG. 24 schematically illustrates a back view of a digital camera that includes a display screen and buttons for crop control and other adjustment controls, and a button for confirming a crop or other adjustment, and cancel and smart buttons, in accordance with certain embodiments.

FIG. 24 schematically illustrates a back view of a digital camera that includes a display screen and buttons for crop control and other adjustment controls, and a button for confirming a crop or other adjustment, and cancel and smart buttons, in accordance with certain embodiments.

Figure 25:
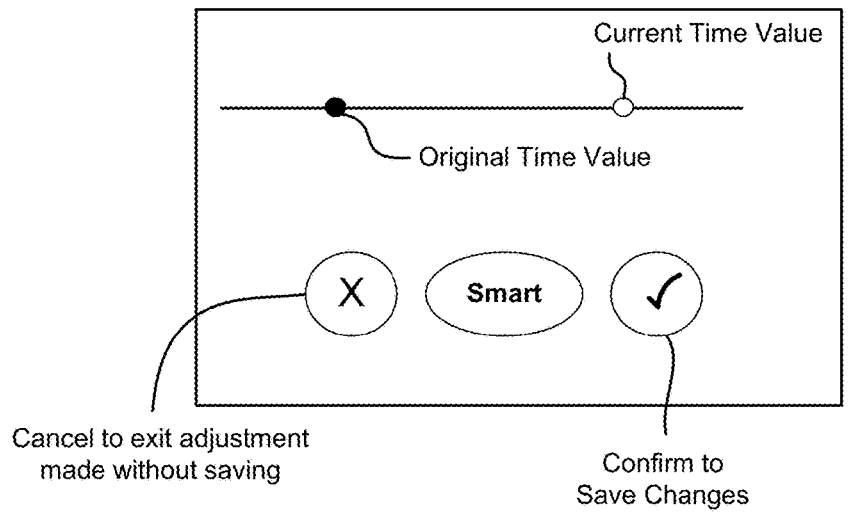
FIG. 25 schematically illustrates a back view of a digital camera that includes a display screen and a timeline with indicators of original and current time values disposed between start and end times, and buttons for canceling to exit adjustment mode without saving and for confirming to save changes, and a smart button, in accordance with certain embodiments.

FIG. 25 schematically illustrates a back view of a digital camera that includes a display screen and a timeline with indicators of original and current time values disposed between start and end times, and buttons for canceling to exit adjustment mode without saving and for confirming to save changes, and a smart button, in accordance with certain embodiments.

Figure 26:
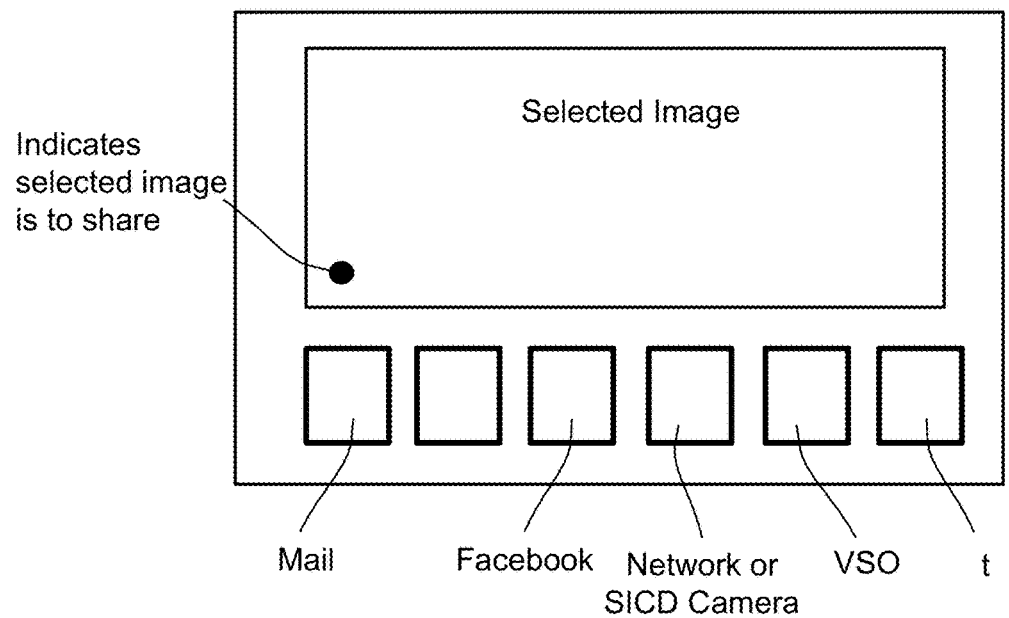
FIG. 26 schematically illustrates a back view of a digital camera that includes a display screen showing a selected image for sharing, and buttons for email, text, facebook, and networked second camera or other device, in accordance with certain embodiments.

FIG. 26 schematically illustrates a back view of a digital camera that includes a display screen showing a selected image for sharing, and buttons for email, text, facebook, and networked second camera or other device, in accordance with certain embodiments.

Figure 27A:
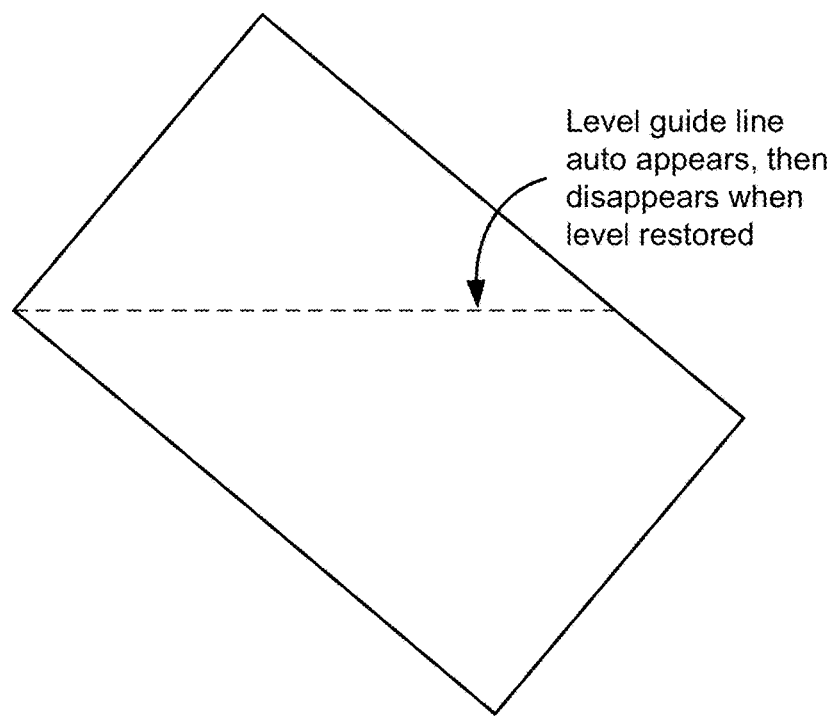
FIGS. 27A-27B schematically illustrate a back view of a digital camera that includes a display screen that shows a level guide that auto appears when the camera is not leveled and disappears when the level is restored in accordance with certain embodiments.
Figure 27B:
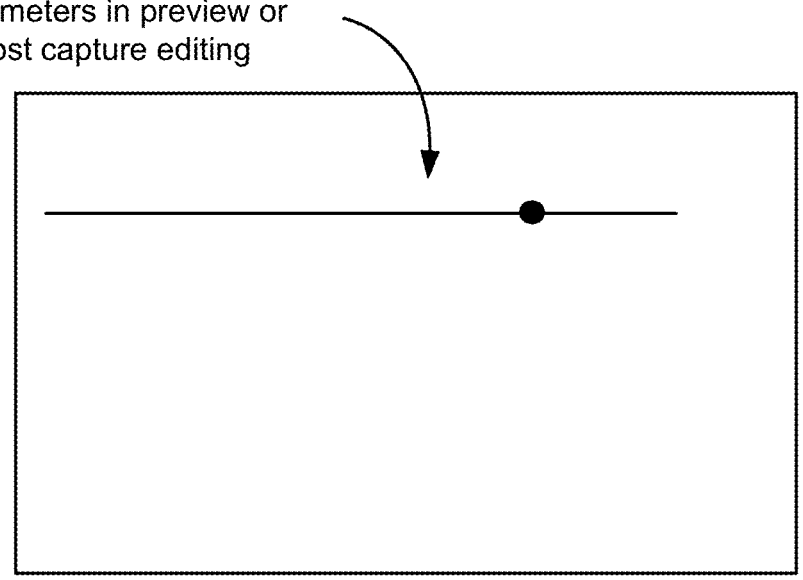

FIGS. 27A-27B schematically illustrate a back view of a digital camera that includes a display screen that shows a level guide that auto appears when the camera is not leveled and disappears when the level is restored in accordance with certain embodiments.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the term "assembly" does not imply that the components or functionality described or claimed as part of the assembly are all configured in a common package. Indeed, any or all of the various components of an assembly, e.g., an optical assembly or a camera assembly may be combined in a single package or separately maintained and may further be manufactured, assembled or distributed at or through multiple locations.

We claim:

1. A digital camera, comprising:
   a digital camera housing;
   an image sensor coupled within the housing;
   an optical assembly including one or more lenses for forming images on the image sensor;
   a display screen coupled to the housing; and
   a viewfinder coupled to the housing including a magnifying lens, wherein the viewfinder is movable between a stowed position and an active position for viewing a subset of display screen pixels with magnification,
   wherein the viewfinder is rotatable between the stowed and active positions.

2. The digital camera of claim 1, wherein the camera housing defines a cutout for receiving the viewfinder in the stowed position.

3. The digital camera of claim 1, wherein a rotation axis of the viewfinder is approximately normal to an optical axis of the optical assembly of the digital camera.

4. The digital camera of claim 3, wherein the stowed position is at the top, side or bottom of the housing non-overlapping the display screen and the active position is at the rear of the housing overlapping said subset of display screen pixels.

5. The digital camera of claim 1, wherein a rotation axis of the viewfinder is approximately parallel to an optical axis of the optical assembly of the digital camera.

6. The digital camera of claim 5, wherein the stowed position is at the rear of the housing non-overlapping the display screen and the active position is also at the rear of the housing overlapping said subset of display screen pixels.

7. The digital camera of claim 1, wherein the viewfinder is translatable between the stowed and active positions.

8. The digital camera of claim 7, wherein the viewfinder includes one or more catching protrusions that fit into one or more respective grooves defined the housing.

9. The digital camera of claim 1, wherein the viewfinder comprises an eyebrow rest.

10. The digital camera of claim 1, wherein the viewfinder comprises a proximity sensor for triggering one or more camera functions based on proximity of the camera user to the viewfinder.

11. The digital camera of claim 10, wherein the camera is programmed to automatically display images on a larger portion of the display screen when the camera user is not proximate to the viewfinder in the active position than when the camera user is proximate to the viewfinder in the active position.

12. The digital camera of claim 10, wherein the camera is programmed to display images on said subset of display screen pixels when the user is proximate to the viewfinder and to display images on a different subset of pixels that are not overlapped by said viewfinder when the viewfinder is in the active position and the user is not proximate to the viewfinder.

13. The digital camera of claim 1, comprising a proximity sensor for triggering one or more camera functions based on proximity of the camera user to the camera.

14. The digital camera of claim 13, wherein the camera is programmed to begin a start-up process when the camera user becomes proximate to the camera or a certain portion of the camera.

15. The digital camera of claim 1, wherein the camera is programmed to display images on a larger portion of the display screen when the viewfinder is in the stowed position than when the viewfinder is in the active position.

16. The digital camera of claim 1, wherein said subset of display screen pixels are overlapped by the viewfinder in the active position and not overlapped by the viewfinder in the stowed position.

17. The digital camera of claim 1, wherein the viewfinder includes a blinder that blocks light from a portion of the display screen from interfering with the viewing of images on the subset of display screen pixels when the viewfinder is in the active position.

18. The digital camera of claim 1, wherein the viewfinder comprises two or more lenses.

19. The digital camera of claim 18, wherein said two or more lenses are configured for viewing images presented at said subset of display screen pixels with anamorphic optical power.

20. The digital camera of claim 1, wherein the viewfinder comprises one or more movable optics for adjusting to an eyesight characteristic of a user.

21. The digital camera of claim 1, wherein an area of the subset of display screen pixels is adjustable.

22. The digital camera of claim 21, wherein the viewfinder comprises one or more movable optics for adjusting to the area of the subset of display screen pixels.

23. The digital camera of claim 1, wherein the resolution of the image provided at the subset of display screen pixels for viewing through the viewfinder is adjustable.

24. The digital camera of claim 1, wherein the camera is configured to automatically provide a viewfinder image at the subset of display screen pixels when the viewfinder is placed in the active position and to automatically provide a full screen image when the viewfinder is stowed.

25. The digital camera of claim 1, wherein the viewfinder comprises a hinge coupling for adjusting between the active and stowed positions.

26. The digital camera of claim 1, wherein the viewfinder comprises an attachment coupling for attaching to the camera housing for use in the active position and for detaching from the camera housing to use the full display screen in the stowed position.

27. The digital camera of claim 26, wherein the camera comprises a hot shoe bracket configured for attaching the viewfinder to the camera housing.

28. The digital camera of claim 1, wherein the viewfinder comprises a cup-shaped and/or flexible eye socket interface.

29. The digital camera of claim 1, wherein the viewfinder has an adjustable magnification.

30. The digital camera of claim 29, wherein the magnification of the viewfinder is adjustable by selecting between use of multiple lenses having different magnifications.

31. The digital camera of claim 29, wherein the magnification of the viewfinder is adjustable by movement of an adjustable optic.

32. A digital camera, comprising:
a digital camera housing;
an image sensor coupled within the housing;
an optical assembly including one or more lenses for forming images on the image sensor;
a display screen coupled to the housing; and
a viewfinder coupled to the housing including a magnifying lens, wherein the viewfinder is movable between a stowed position and an active position for viewing a subset of display screen pixels with magnification, wherein the viewfinder is translatable between the stowed and active positions, and
wherein the viewfinder includes one or more catching protrusions that fit into one or more respective grooves defined the housing.

33. The digital camera of claim 32, wherein the camera housing defines a cutout for receiving the viewfinder in the stowed position.

34. The digital camera of claim 32, wherein the viewfinder is rotatable between the stowed and active positions.

35. The digital camera of claim 34, wherein a rotation axis of the viewfinder is approximately normal to an optical axis of the optical assembly of the digital camera.

36. The digital camera of claim 35, wherein the stowed position is at the top, side or bottom of the housing non-overlapping the display screen and the active position is at the rear of the housing overlapping said subset of display screen pixels.

37. The digital camera of claim 34, wherein a rotation axis of the viewfinder is approximately parallel to an optical axis of the optical assembly of the digital camera.

38. The digital camera of claim 37, wherein the stowed position is at the rear of the housing non-overlapping the display screen and the active position is also at the rear of the housing overlapping said subset of display screen pixels.

39. The digital camera of claim 32, wherein the viewfinder comprises an eyebrow rest.

40. The digital camera of claim 32, wherein the viewfinder comprises a proximity sensor for triggering one or more camera functions based on proximity of the camera user to the viewfinder.

41. The digital camera of claim 40, wherein the camera is programmed to automatically display images on a larger portion of the display screen when the camera user is not proximate to the viewfinder in the active position than when the camera user is proximate to the viewfinder in the active position.

42. The digital camera of claim 40, wherein the camera is programmed to display images on said subset of display screen pixels when the user is proximate to the viewfinder and to display images on a different subset of pixels that are not overlapped by said viewfinder when the viewfinder is in the active position and the user is not proximate to the viewfinder.

43. The digital camera of claim 32, comprising a proximity sensor for triggering one or more camera functions based on proximity of the camera user to the camera.

44. The digital camera of claim 43, wherein the camera is programmed to begin a start-up process when the camera user becomes proximate to the camera or a certain portion of the camera.

45. The digital camera of claim 32, wherein the camera is programmed to display images on a larger portion of the display screen when the viewfinder is in the stowed position than when the viewfinder is in the active position.

46. The digital camera of claim 32, wherein said subset of display screen pixels are overlapped by the viewfinder in the active position and not overlapped by the viewfinder in the stowed position.

47. The digital camera of claim 32, wherein the viewfinder includes a blinder that blocks light from a portion of the display screen from interfering with the viewing of images on the subset of display screen pixels when the viewfinder is in the active position.

48. The digital camera of claim 32, wherein the viewfinder comprises two or more lenses.

49. The digital camera of claim 48, wherein said two or more lenses are configured for viewing images presented at said subset of display screen pixels with anamorphic optical power.

50. The digital camera of claim 32, wherein the viewfinder comprises one or more movable optics for adjusting to an eyesight characteristic of a user.

51. The digital camera of claim 32, wherein an area of the subset of display screen pixels is adjustable.

52. The digital camera of claim 51, wherein the viewfinder comprises one or more movable optics for adjusting to the area of the subset of display screen pixels.

53. The digital camera of claim 32, wherein the resolution of the image provided at the subset of display screen pixels for viewing through the viewfinder is adjustable.

54. The digital camera of claim 32, wherein the camera is configured to automatically provide a viewfinder image at the subset of display screen pixels when the viewfinder is placed in the active position and to automatically provide a full screen image when the viewfinder is stowed.

55. The digital camera of claim 32, wherein the viewfinder comprises a hinge coupling for adjusting between the active and stowed positions.

56. The digital camera of claim 32, wherein the viewfinder comprises an attachment coupling for attaching to the camera housing for use in the active position and for detaching from the camera housing to use the full display screen in the stowed position.

57. The digital camera of claim 56, wherein the camera comprises a hot shoe bracket configured for attaching the viewfinder to the camera housing.

58. The digital camera of claim 32, wherein the viewfinder comprises a cup-shaped and/or flexible eye socket interface.

59. The digital camera of claim 32, wherein the viewfinder has an adjustable magnification.

60. The digital camera of claim 59, wherein the magnification of the viewfinder is adjustable by selecting between use of multiple lenses having different magnifications.

61. The digital camera of claim 59, wherein the magnification of the viewfinder is adjustable by movement of an adjustable optic.

62. A digital camera, comprising:
a digital camera housing;
an image sensor coupled within the housing;
an optical assembly including one or more lenses for forming images on the image sensor;
a display screen coupled to the housing; and
a viewfinder coupled to the housing including a magnifying lens, wherein the viewfinder is movable between a stowed position and an active position for viewing a subset of display screen pixels with magnification,
wherein the camera is programmed to display images on a larger portion of the display screen when the viewfinder is in the stowed position than when the viewfinder is in the active position.

63. The digital camera of claim 62, wherein the camera housing defines a cutout for receiving the viewfinder in the stowed position.

64. The digital camera of claim 63, wherein a rotation axis of the viewfinder is approximately normal to an optical axis of the optical assembly of the digital camera.

65. The digital camera of claim 64, wherein the stowed position is at the top, side or bottom of the housing non-overlapping the display screen and the active position is at the rear of the housing overlapping said subset of display screen pixels.

66. The digital camera of claim 62, wherein the viewfinder is rotatable between the stowed and active positions.

67. The digital camera of claim 62, wherein a rotation axis of the viewfinder is approximately parallel to an optical axis of the optical assembly of the digital camera.

68. The digital camera of claim 67, wherein the stowed position is at the rear of the housing non-overlapping the display screen and the active position is also at the rear of the housing overlapping said subset of display screen pixels.

69. The digital camera of claim 62, wherein the viewfinder is translatable between the stowed and active positions.

70. The digital camera of claim 69, wherein the viewfinder includes one or more catching protrusions that fit into one or more respective grooves defined the housing.

71. The digital camera of claim 62, wherein the viewfinder comprises an eyebrow rest.

72. The digital camera of claim 62, wherein the viewfinder comprises a proximity sensor for triggering one or more camera functions based on proximity of the camera user to the viewfinder.

73. The digital camera of claim 72, wherein the camera is programmed to automatically display images on a larger portion of the display screen when the camera user is not proximate to the viewfinder in the active position than when the camera user is proximate to the viewfinder in the active position.

74. The digital camera of claim 72, wherein the camera is programmed to display images on said subset of display screen pixels when the user is proximate to the viewfinder and to display images on a different subset of pixels that are not overlapped by said viewfinder when the viewfinder is in the active position and the user is not proximate to the viewfinder.

75. The digital camera of claim 62, comprising a proximity sensor for triggering one or more camera functions based on proximity of the camera user to the camera.

76. The digital camera of claim 75, wherein the camera is programmed to begin a start-up process when the camera user becomes proximate to the camera or a certain portion of the camera.

77. The digital camera of claim 62, wherein said subset of display screen pixels are overlapped by the viewfinder in the active position and not overlapped by the viewfinder in the stowed position.

78. The digital camera of claim 62, wherein the viewfinder includes a blinder that blocks light from a portion of the display screen from interfering with the viewing of images on the subset of display screen pixels when the viewfinder is in the active position.

79. The digital camera of claim 62, wherein the viewfinder comprises two or more lenses.

80. The digital camera of claim 79, wherein said two or more lenses are configured for viewing images presented at said subset of display screen pixels with anamorphic optical power.

81. The digital camera of claim 62, wherein the viewfinder comprises one or more movable optics for adjusting to an eyesight characteristic of a user.

82. The digital camera of claim 62, wherein an area of the subset of display screen pixels is adjustable.

83. The digital camera of claim 82, wherein the viewfinder comprises one or more movable optics for adjusting to the area of the subset of display screen pixels.

84. The digital camera of claim 62, wherein the resolution of the image provided at the subset of display screen pixels for viewing through the viewfinder is adjustable.

85. The digital camera of claim 62, wherein the camera is configured to automatically provide a viewfinder image at the subset of display screen pixels when the viewfinder is placed in the active position and to automatically provide a full screen image when the viewfinder is stowed.

86. The digital camera of claim 62, wherein the viewfinder comprises a hinge coupling for adjusting between the active and stowed positions.

87. The digital camera of claim 62, wherein the viewfinder comprises an attachment coupling for attaching to the camera housing for use in the active position and for detaching from the camera housing to use the full display screen in the stowed position.

88. The digital camera of claim 87, wherein the camera comprises a hot shoe bracket configured for attaching the viewfinder to the camera housing.

89. The digital camera of claim 62, wherein the viewfinder comprises a cup-shaped and/or flexible eye socket interface.

90. The digital camera of claim 62, wherein the viewfinder has an adjustable magnification.

91. The digital camera of claim 90, wherein the magnification of the viewfinder is adjustable by selecting between use of multiple lenses having different magnifications.

92. The digital camera of claim 90, wherein the magnification of the viewfinder is adjustable by movement of an adjustable optic.

93. A digital camera, comprising:
a digital camera housing;
an image sensor coupled within the housing;
an optical assembly including one or more lenses for forming images on the image sensor;
a display screen coupled to the housing; and
a viewfinder coupled to the housing including a magnifying lens, wherein the viewfinder is movable between a stowed position and an active position for viewing a subset of display screen pixels with magnification,
wherein the camera is configured to automatically provide a viewfinder image at the subset of display screen pixels when the viewfinder is placed in the active position and to automatically provide a full screen image when the viewfinder is stowed.

94. The digital camera of claim 93, wherein the camera housing defines a cutout for receiving the viewfinder in the stowed position.

95. The digital camera of claim 93, wherein the viewfinder is rotatable between the stowed and active positions.

96. The digital camera of claim 95, wherein a rotation axis of the viewfinder is approximately normal to an optical axis of the optical assembly of the digital camera.

97. The digital camera of claim 96, wherein the stowed position is at the top, side or bottom of the housing non-overlapping the display screen and the active position is at the rear of the housing overlapping said subset of display screen pixels.

98. The digital camera of claim 95, wherein a rotation axis of the viewfinder is approximately parallel to an optical axis of the optical assembly of the digital camera.

99. The digital camera of claim 98, wherein the stowed position is at the rear of the housing non-overlapping the display screen and the active position is also at the rear of the housing overlapping said subset of display screen pixels.

100. The digital camera of claim 93, wherein the viewfinder is translatable between the stowed and active positions.

101. The digital camera of claim 100, wherein the viewfinder includes one or more catching protrusions that fit into one or more respective grooves defined the housing.

102. The digital camera of claim 93, wherein the viewfinder comprises an eyebrow rest.

103. The digital camera of claim 93, wherein the viewfinder comprises a proximity sensor for triggering one or more camera functions based on proximity of the camera user to the viewfinder.

104. The digital camera of claim 103, wherein the camera is programmed to automatically display images on a larger portion of the display screen when the camera user is not proximate to the viewfinder in the active position than when the camera user is proximate to the viewfinder in the active position.

105. The digital camera of claim 103, wherein the camera is programmed to display images on said subset of display screen pixels when the user is proximate to the viewfinder and to display images on a different subset of pixels that are not overlapped by said viewfinder when the viewfinder is in the active position and the user is not proximate to the viewfinder.

106. The digital camera of claim 93, comprising a proximity sensor for triggering one or more camera functions based on proximity of the camera user to the camera.

107. The digital camera of claim 106, wherein the camera is programmed to begin a start-up process when the camera user becomes proximate to the camera or a certain portion of the camera.

108. The digital camera of claim 93, wherein the camera is programmed to display images on a larger portion of the display screen when the viewfinder is in the stowed position than when the viewfinder is in the active position.

109. The digital camera of claim 93, wherein said subset of display screen pixels are overlapped by the viewfinder in the active position and not overlapped by the viewfinder in the stowed position.

110. The digital camera of claim 93, wherein the viewfinder includes a blinder that blocks light from a portion of the display screen from interfering with the viewing of images on the subset of display screen pixels when the viewfinder is in the active position.

111. The digital camera of claim 93, wherein the viewfinder comprises two or more lenses.

112. The digital camera of claim 111, wherein said two or more lenses are configured for viewing images presented at said subset of display screen pixels with anamorphic optical power.

113. The digital camera of claim 93, wherein the viewfinder comprises one or more movable optics for adjusting to an eyesight characteristic of a user.

114. The digital camera of claim 93, wherein an area of the subset of display screen pixels is adjustable.

115. The digital camera of claim 114, wherein the viewfinder comprises one or more movable optics for adjusting to the area of the subset of display screen pixels.

116. The digital camera of claim 93, wherein the resolution of the image provided at the subset of display screen pixels for viewing through the viewfinder is adjustable.

117. The digital camera of claim 93, wherein the viewfinder comprises a hinge coupling for adjusting between the active and stowed positions.

118. The digital camera of claim 93, wherein the viewfinder comprises an attachment coupling for attaching to the camera housing for use in the active position and for detaching from the camera housing to use the full display screen in the stowed position.

119. The digital camera of claim 118, wherein the camera comprises a hot shoe bracket configured for attaching the viewfinder to the camera housing.

120. The digital camera of claim 93, wherein the viewfinder comprises a cup-shaped and/or flexible eye socket interface.

121. The digital camera of claim 93, wherein the viewfinder has an adjustable magnification.

122. The digital camera of claim 121, wherein the magnification of the viewfinder is adjustable by selecting between use of multiple lenses having different magnifications.

123. The digital camera of claim 121, wherein the magnification of the viewfinder is adjustable by movement of an adjustable optics.

124. A digital camera, comprising:
a digital camera housing;
an image sensor coupled within the housing;
an optical assembly including one or more lenses for forming images on the image sensor;
a display screen coupled to the housing; and
a viewfinder coupled to the housing including a magnifying lens, wherein the viewfinder is movable between a stowed position and an active position for viewing a subset of display screen pixels with magnification,
wherein the viewfinder comprises an attachment coupling for attaching to the camera housing for use in the active position and for detaching from the camera housing to use the full display screen in the stowed position.

125. The digital camera of claim 124, wherein the camera housing defines a cutout for receiving the viewfinder in the stowed position.

126. The digital camera of claim 124, wherein the viewfinder is rotatable between the stowed and active positions.

127. The digital camera of claim 126, wherein a rotation axis of the viewfinder is approximately normal to an optical axis of the optical assembly of the digital camera.

128. The digital camera of claim 127, wherein the stowed position is at the top, side or bottom of the housing non-overlapping the display screen and the active position is at the rear of the housing overlapping said subset of display screen pixels.

129. The digital camera of claim 126, wherein a rotation axis of the viewfinder is approximately parallel to an optical axis of the optical assembly of the digital camera.

130. The digital camera of claim 129, wherein the stowed position is at the rear of the housing non-overlapping the display screen and the active position is also at the rear of the housing overlapping said subset of display screen pixels.

131. The digital camera of claim 124, wherein the viewfinder is translatable between the stowed and active positions.

132. The digital camera of claim 131, wherein the viewfinder includes one or more catching protrusions that fit into one or more respective grooves defined the housing.

133. The digital camera of claim 124, wherein the viewfinder comprises an eyebrow rest.

134. The digital camera of claim 124, wherein the viewfinder comprises a proximity sensor for triggering one or more camera functions based on proximity of the camera user to the viewfinder.

135. The digital camera of claim 134, wherein the camera is programmed to automatically display images on a larger portion of the display screen when the camera user is not proximate to the viewfinder in the active position than when the camera user is proximate to the viewfinder in the active position.

136. The digital camera of claim 134, wherein the camera is programmed to display images on said subset of display screen pixels when the user is proximate to the viewfinder and to display images on a different subset of pixels that are not overlapped by said viewfinder when the viewfinder is in the active position and the user is not proximate to the viewfinder.

137. The digital camera of claim 124, comprising a proximity sensor for triggering one or more camera functions based on proximity of the camera user to the camera.

138. The digital camera of claim 137, wherein the camera is programmed to begin a start-up process when the camera user becomes proximate to the camera or a certain portion of the camera.

139. The digital camera of claim 124, wherein the camera is programmed to display images on a larger portion of the display screen when the viewfinder is in the stowed position than when the viewfinder is in the active position.

140. The digital camera of claim 124, wherein said subset of display screen pixels are overlapped by the viewfinder in the active position and not overlapped by the viewfinder in the stowed position.

141. The digital camera of claim 124, wherein the viewfinder includes a blinder that blocks light from a portion of the display screen from interfering with the viewing of images on the subset of display screen pixels when the viewfinder is in the active position.

142. The digital camera of claim 124, wherein the viewfinder comprises two or more lenses.

143. The digital camera of claim 142, wherein said two or more lenses are configured for viewing images presented at said subset of display screen pixels with anamorphic optical power.

144. The digital camera of claim 124, wherein the viewfinder comprises one or more movable optics for adjusting to an eyesight characteristic of a user.

145. The digital camera of claim 124, wherein an area of the subset of display screen pixels is adjustable.

146. The digital camera of claim 145, wherein the viewfinder comprises one or more movable optics for adjusting to the area of the subset of display screen pixels.

147. The digital camera of claim 124, wherein the resolution of the image provided at the subset of display screen pixels for viewing through the viewfinder is adjustable.

148. The digital camera of claim 124, wherein the camera is configured to automatically provide a viewfinder image at the subset of display screen pixels when the viewfinder is placed in the active position and to automatically provide a full screen image when the viewfinder is stowed.

149. The digital camera of claim 124, wherein the viewfinder comprises a hinge coupling for adjusting between the active and stowed positions.

150. The digital camera of claim 124, wherein the camera comprises a hot shoe bracket configured for attaching the viewfinder to the camera housing.

151. The digital camera of claim 124, wherein the viewfinder comprises a cup-shaped and/or flexible eye socket interface.

152. The digital camera of claim 151, wherein the viewfinder has an adjustable magnification.

153. The digital camera of claim 152, wherein the magnification of the viewfinder is adjustable by selecting between use of multiple lenses having different magnifications.

154. The digital camera of claim 151, wherein the magnification of the viewfinder is adjustable by movement of an adjustable optic.

\* \* \* \* \*